(12) United States Patent
Groth et al.

(10) Patent No.: US 11,899,760 B2
(45) Date of Patent: Feb. 13, 2024

(54) SYSTEM AND METHOD FOR ADJUSTING PRIVACY POLICIES

(71) Applicant: Cambrian Designs, Inc., Berkeley, CA (US)

(72) Inventors: Olaf Jonny Groth, Berkeley, CA (US); Mark Jay Nitzberg, Berkeley, CA (US); Manu Kalia, San Francisco, CA (US); Tobias Christopher Straube, Frankfurt (DE); Daniel A Zehr, Austin, TX (US)

(73) Assignee: CAMBRIAN DESIGNS, INC., Berkeley, CA (US)

( * ) Notice: Subject to any disclaimer, the term of this patent is extended or adjusted under 35 U.S.C. 154(b) by 163 days.

(21) Appl. No.: 17/128,069

(22) Filed: Dec. 19, 2020

(65) Prior Publication Data

US 2022/0121779 A1 Apr. 21, 2022

Related U.S. Application Data

(60) Provisional application No. 62/964,428, filed on Jan. 22, 2020, provisional application No. 62/957,885, (Continued)

(51) Int. Cl.
*G06F 21/62* (2013.01)
*G06F 21/16* (2013.01)
(Continued)

(52) U.S. Cl.
CPC .............. *G06F 21/31* (2013.01); *G06F 21/16* (2013.01); *G06F 21/577* (2013.01);
(Continued)

(58) Field of Classification Search
CPC ........ G06F 21/31; G06F 21/16; G06F 21/577; G06F 21/604; G06F 21/6209;
(Continued)

(56) References Cited

U.S. PATENT DOCUMENTS 5,987,440 A 11/1999 O'Neil et al.
6,092,197 A 7/2000 Coueignoux
(Continued)

OTHER PUBLICATIONS

Bhatia, Jaspreet, and Travis D. Breaux (2017):. "Towards an information type lexicon for privacy policies." 2015 IEEE eighth international workshop on requirements engineering and law (RELAW). IEEE, 2015. Hagan, M. (2017) Ontologies for Lawyers. Available: https://medium.com/legal-design-and-innovation/ontologies-for-lawyers-5c3b9fb23439 accessed Aug. 10, 2019.
(Continued)

*Primary Examiner* — Carl G Colin
*Assistant Examiner* — Andrew Suh
(74) *Attorney, Agent, or Firm* — J. Nicholas Gross

(57) ABSTRACT

An automated system tracks digital service providers (DSP) data management agreements, and user behavior, individually and in aggregate, to determine potential changes for a personal/corporate privacy charter. The personal/corporate privacy charter is thus dynamically adaptable to permit users to continue to engage seamlessly in accordance with user/corporate target goals with digital service providers (DSPs) and similar entities.

20 Claims, 28 Drawing Sheets

Related U.S. Application Data filed on Jan. 7, 2020, provisional application No. 62/951,271, filed on Dec. 20, 2019.

(51) Int. Cl.

| | |
|---|---|
| *G06F 21/31* | (2013.01) |
| *G06F 21/57* | (2013.01) |
| *G06F 21/60* | (2013.01) |
| *G06Q 30/0201* | (2023.01) |
| *G06Q 50/18* | (2012.01) |
| *G06N 20/00* | (2019.01) |

(52) U.S. Cl.
CPC ........ *G06F 21/604* (2013.01); *G06F 21/6209* (2013.01); *G06F 21/6245* (2013.01); *G06F 21/6254* (2013.01); *G06F 21/6263* (2013.01); *G06N 20/00* (2019.01); *G06Q 30/0206* (2013.01); *G06Q 50/18* (2013.01); *G06F 2221/034* (2013.01); *G06F 2221/2123* (2013.01); *G06F 2221/2141* (2013.01)

(58) Field of Classification Search
CPC ............. G06F 21/6245; G06F 21/6254; G06F 21/6263; G06F 2221/034; G06F 2221/0737; G06F 2221/2123; G06F 2221/2141; G06Q 30/0206; G06Q 50/18
See application file for complete search history.

(56) References Cited

U.S. PATENT DOCUMENTS

| | | | |
|---|---|---|---|
| 6,904,417 B2 | 6/2005 | Clayton et al. | |
| 6,959,320 B2 | 10/2005 | Mitchell et al. | |
| 8,073,461 B2 | 12/2011 | Altman et al. | |
| 8,316,451 B2* | 11/2012 | Torres | G06F 21/6218 726/1 |
| 8,839,454 B2 | 9/2014 | Krishnamurthy | |
| 8,966,575 B2 | 2/2015 | McQuay et al. | |
| 9,191,352 B2 | 11/2015 | Parmar et al. | |
| 9,411,967 B2 | 8/2016 | Parecki et al. | |
| 9,426,776 B2 | 8/2016 | Bellamkonda et al. | |
| 9,542,564 B2* | 1/2017 | Mattox, Jr. | G06F 21/62 |
| 9,691,090 B1 | 6/2017 | Barday | |
| 9,704,203 B2 | 7/2017 | Grandison et al. | |
| 9,881,407 B1 | 1/2018 | Varley | |
| 9,961,090 B2 | 5/2018 | D'Aveta et al. | |
| 9,977,911 B2 | 5/2018 | Mallozi | |
| 10,069,703 B2 | 9/2018 | Jung et al. | |
| 10,102,533 B2 | 10/2018 | Barday | |
| 10,169,790 B2 | 1/2019 | Barday | |
| 10,176,878 B2 | 1/2019 | Barday et al. | |
| 10,231,084 B2 | 3/2019 | Bachi et al. | |
| 10,218,761 B2 | 6/2019 | Barday et al. | |
| 10,349,207 B2 | 7/2019 | Baca et al. | |
| 10,467,551 B2 | 11/2019 | Gayton et al. | |
| 10,659,841 B2 | 5/2020 | Besehanic | |
| 11,017,688 B1 | 5/2021 | Arazi | |
| 2002/0152134 A1 | 10/2002 | McGlinn | |
| 2002/0188627 A1 | 12/2002 | Bleizeffer et al. | |
| 2003/0028427 A1 | 2/2003 | Dutta et al. | |
| 2004/0054919 A1 | 3/2004 | Duri et al. | |
| 2004/0083243 A1 | 4/2004 | Feng et al. | |
| 2005/0091101 A1 | 4/2005 | Epling et al. | |
| 2005/0193093 A1 | 9/2005 | Mathew et al. | |
| 2006/0095956 A1 | 5/2006 | Ashley et al. | |
| 2009/0044016 A1 | 2/2009 | Vauclair | |
| 2009/0300714 A1* | 12/2009 | Ahn | G06F 21/6263 726/1 |
| 2009/0320091 A1 | 12/2009 | Torres et al. | |
| 2010/0279713 A1 | 11/2010 | Dicke | |
| 2011/0061106 A1 | 3/2011 | Kovacs et al. | |
| 2011/0213688 A1 | 9/2011 | Santos et al. | |
| 2012/0042390 A1 | 2/2012 | Twuchukwu | |
| 2013/0291123 A1 | 10/2013 | Rajkumar et al. | |
| 2014/0162684 A1 | 6/2014 | Shaw | |
| 2015/0143529 A1 | 5/2015 | Gkoukalas-Divanis et al. | |
| 2015/0181016 A1 | 6/2015 | Jain et al. | |
| 2016/0057572 A1 | 2/2016 | Bojorquez Alfaro et al. | |
| 2017/0083931 A1 | 3/2017 | Allinson et al. | |
| 2017/0337397 A1 | 11/2017 | Tang | |
| 2018/0121944 A1 | 5/2018 | Schwartz | |
| 2019/0108353 A1* | 4/2019 | Sadeh | G06F 21/604 |
| 2019/0354709 A1 | 11/2019 | Brinskelle | |
| 2020/0202037 A1 | 6/2020 | Parkinson et al. | |
| 2020/0389495 A1 | 12/2020 | Crabtree et al. | |
| 2021/0279363 A1 | 9/2021 | Jones et al. | |

OTHER PUBLICATIONS

Bommarito, I. I., et al. (2018): "LexNLP: Natural language processing and information extraction for legal and regulatory texts." arXiv preprint arXiv:1806.03688 (2018). https://arxiv.org/pdf/1806.03688.pdf.

Brodie, Carolyn A., Clare-Marie Karat, John Karat (2006):. "An empirical study of natural language parsing of privacy policy rules using the SPARCLE policy workbench." Proceedings of the second symposium on Usable privacy and security. ACM.

Burkhard (2018): The privacy paradox is a privacy dilemma. Mozilla Blog. Available: https://blog.mozilla.org/internetcitizen/2018/08/24/the-privacy-paradox-is-a-privacy-dilemma/.

Carrascal, Riederer, Erramilli, Cherubini, Oliveira (2018): Your Browsing Behavior for a Big Mac: Economics of Personal Information Online. Available: http://jpcarrascal.com/docs/publications/WWW2013-Browsing_behavior_big_mac.pdf.

Cer, Daniel, et al. "Semeval-2017 task 1: Semantic textual similarity-multilingual and cross-lingual focused evaluation." arXiv preprint arXiv:1708.00055 (2017).

Cigi; Ipsos (2019): Share of internet users who are increasingly concerned about their online privacy to due internet companies as of Feb. 2019, by region. Statista. Available: https://www.statista.com/statistics/373460/global-opinion-online-monitoring-selling-information/.

Deloitte (2017): 2017 Global Mobile Consumer Survey: US edition. The dawn of the next era in mobile. Available: https://www2.deloitte.com/content/dam/Deloitte/us/Documents/technology-media-telecommunications/us-tmt-2017-global-mobile-consumer-survey-executive-summary.pdf.

Devlin, Jacob, et al. "BERT: Pre-training of deep bidirectional transformers for language understanding." arXiv preprint arXiv:1810.04805 (2018). https://arxiv.org/pdf/1810.04805.pdf.

Dolan, William B., and Chris Brockett. "Automatically constructing a corpus of sentential paraphrases." Proceedings of the Third International Workshop on Paraphrasing (IWP2005). 2005.

Ember (2016): See That Billboard? It May See You, Too. The New York Times. Available: https://www.nytimes.com/2016/02/29/business/media/see-that-billboard-it-may-see-you-too.html.

European Commission (2019: Special Eurobarometer 487a. Available: https://privacyblogfullservice.huntonwilliamsblogs.com/wp-content/uploads/sites/28/2019/06/ebs487a_en.pdf.

Fjeld, Hilligoss, Achten, Daniel, Feldman, Kagay (2019): Principled Artificial Intelligence. A Map of Ethical and Rights-based approaches. Harvard University. Available: https://ai-hr.cyber.harvard.edu/primp-viz.html.

Greenberg (N.D.): VPN Use and Data Privacy Stats for 2019. VPN Mentor. Available: https://www.vpnmentor.com/blog/vpn-use-data-privacy-stats.

Yang, Dai, Yang, Carbonell, Salakhutdino and Le: XLNet: Generalized Autoregressive Pretraining for Language Understanding 33rd Conference on Neural Information Processing Systems (NEURIPS 2019), Vancouver, Canada.

Hoofnagle, Urban (2014): Alan Westin's Privacy Homo Economicus. Berkeley Law. Berkeley Law Repository. Available: https://scholarship.law.berkeley.edu/cgi/viewcontent.cgi?referer=https://www.google.com/&httpsredir=1&article=3550&context=facpubs.

IEEE (2017): P7006—Standard for Personal Data Artificial Intelligence (AI) Agent. Available: https://standards.ieee.org/project/7006.html.

(56) References Cited

OTHER PUBLICATIONS

Jones, Tonetti (2018), Nonrivalry and the Economics of Data. Stanford Business. Available: https://www.gsb.stanford.edu/faculty-research/working-papers/nonrivalry-economics-data.

Kurth (2017): Massachusetts AG Settles Geofencing Case. Hunton Privacy Blog. Available: https://www.huntonprivacyblog.com/2017/04/13/massachusetts-ag-settles-geofencing-case/.

Lanier, J. (2019): Jaron Lanier fixes the internet. Opinion. New York Times. Produced by Adam Westbrook. Series of Videos Available: https://www.nytimes.com/interactive/2019/09/23/opinion/data-privacy-jaron-lanier.html.

Levesque, Hector, Ernest Davis, and Leora Morgenstern. "The Winograd schema challenge." Thirteenth International Conference on the Principles of Knowledge Representation and Reasoning. 2012.

McNamara, Smith, Murphy-Hill (2018): Does ACM's Code of Ethics Change Ethical Decision Making in Software Development? North Carolina State University. Available: https://people.engr.ncsu.edu/ermurph3/papers/fse18nier.pdf.

Motiwalla, Li (2016): Unveiling consumer's privacy paradox behaviour in an economic exchange. Available: https://www.ncbi.nlm.nih.gov/pmc/articles/PMC5046831/#R50.

Norberg, Horne (2007): The Privacy Paradox: Personal Information Disclosure Intentions versus Behaviors. Journal on Consumer Affairs. Available: https://onlinelibrary.wiley.com/doi/abs/10.1111/j.1745-6606.2006.00070.x.

Oppenheim (2014): Update: Our app still banned from Play and Google won't talk about it. Disconnect. Available: https://disconnect.me/blog/update-android-app-is-still-banned-from-play-and-google-wont-talk-about-it.

Oltramari, Alessandro, et al. (2018): "PrivOnto: A semantic framework for the analysis of privacy policies." Semantic Web 9.2. p. 185-203.

Panchendrarajan, Rrubaa, and Aravindh Amaresan. "Bidirectional LSTM-CRF for Named Entity Recognition." Proceedings of the 32nd Pacific Asia Conference on Language, Information and Computation. 2018. https://www.aclweb.org/anthology/Y18-1061.

Peters, Matthew E., et al. "Deep contextualized word representations." arXiv preprint arXiv:1802.05365 (2018). https://arxiv.org/pdf/1802.05365.pdf.

Pew (2016): The state of privacy in post-Snowden America. Available: https://www.pewresearch.org/fact-tank/2016/09/21/the-state-of-privacy-in-america/.

Pingitore, Rao, Cavallaro, Dwivedi (2017): To share or not to share. What consumers really think about sharing their personal information. DEloitte. Available: https://www2.deloitte.com/content/dam/insights/us/articles/4020_To-share-or-not-to-share/DUP_To-share-or-not-to-share.pdf.

Radford, Alec, et al. "Improving language understanding by generative pre-training." URL https://s3-us-west-2.amazonaws.com/openai-assets/researchcovers/languageunsupervised/language understanding paper.pdf (2018). https://www.cs.ubc.ca/~amuham01/LING530/papers/radford2018improving.pdf.

Rajpurkar, Pranav, et al. "Squad: 100,000+ questions for machine comprehension of text." arXiv preprint arXiv:1606.05250 (2016).

Ramanath, Rohan, et al (2014): "Unsupervised alignment of privacy policies using hidden markov models." Proceedings of the 52nd Annual Meeting of the Association for Computational Linguistics (vol. 2: Short Papers).

Reinzel, Gantz, Rydning (2018): The Digitization of the World From Edge to Core. IDC. Available: https://www.seagate.com/files/www-content/our-story/trends/files/idc-seagate-dataage-whitepaper.pdf.

Shepard (2019): Weather Apps Under Fire for Collecting, Selling User Data. Security Today. Available: https://securitytoday.com/articles/2019/01/08/weather-apps-under-fire-for-collecting-selling-user-data.aspx.

Smith (2018): Public Attitudes Toward Technology Companies. Pew. Available: https://www.pewinternet.org/2018/06/28/public-attitudes-toward-technology-companies/.

Socher, Richard, et al. "Recursive deep models for semantic compositionality over a sentiment treebank." Proceedings of the 2013 conference on empirical methods in natural language processing. 2013.

Wycislik-Wilson, Fadilpašić, Turner (2019): Best free privacy software of 2019. Techradar. Available: https://www.techradar.com/best/best-free-privacy-software.

Steel, Locke, Cadman, Freese (2018): How much is your personal data worth? Financial Times. Available: https://ig.ft.com/how-much-is-your-personal-data-worth/#faxzz2z2agBB6R.

Stevens (2019): Top 4 Privacy Trends to Watch in 2019. MacMurray & Shuster. Available: https://mslawgroup.com/top-4-privacy-trends-to-watch-in-2019/.

Şulea, Octavia-Maria, et al. (2017): "Exploring the Use of Text Classification in the Legal Domain."

Thomas, Li, Zand, Barrett, Ranieri, Invernizzi, Markov, Comanescu, Eranti, Moscicki, Margolis, Paxson, Bursztein (2017): Data breaches, phishing, or malware? Understanding the risks of stolen credentials. Google Publications. Available: https://ai.google/research/pubs/pub46437.

Thompson (2019): Will Artificial Intelligence enhance humanity? Wired. Available: https://www.wired.com/story/will-artificial-intelligence-enhance-hack-humanity/.

Trustarc (2016): 2016 TRUSTe/NCSA Consumer Privacy Infographic—US Edition. Available: https://www.trustarc.com/resources/privacy-research/ncsa-consumer-privacy-index-us/.

Wang, Alex, et al. "Glue: A multi-task benchmark and analysis platform for natural language understanding." arXiv preprint arXiv:1804.07461 (2018). https://openreview.net/pdf?id=rJ4km2R5t7.

Warstadt, Alex, Amanpreet Singh, and Samuel R. Bowman. "Neural network acceptability judgments." arXiv preprint arXiv:1805.12471 (2018).

Williams, Adina, Nikita Nangia, and Samuel R. Bowman. "A broad-coverage challenge corpus for sentence understanding through inference." arXiv preprint arXiv:1704.05426 (2017).

* cited by examiner

PRIVACY CHARTER MATRIX

| Level \ Area | Personal | Social | Business | Consumer | Health | Mobililty | Other |
|---|---|---|---|---|---|---|---|
| Strict | X | X | | | | X | |
| Typical | | | | X | | | X |
| Lax | | 312 | X | | | | |
| Deal-breaker | | | | | X | | |

CORPORATE & PERSONAL PRIVACY CHARTERS

341

340

350

CORPORATE FIREWALL/SERVER CONFIGURATION

PRIOR ART - FACEBOOK

PRIOR ART - WINDOWS

PRIOR ART – MAC OS

PRIOR ART – CHROME BROWSER

PRIOR ART – ALEXA SMARTSPEAKER

FIG. 11F

PRIOR ART – NEST

Works with Nest
Nest would like to do the following:

Not you?

See your Nest Protect's smoke, carbon monoxide, and battery info.
FTL Lights turn red during an emergency.

Set Home and Away.
FTL Lights turn off when the room is empty.

See your camera's settings, turn it on or off, show images or video when it sends you an alert or detects a familiar face, and share your video stream if it's public.
FTL Lights turn on when a sound or motion event occurs.

See that you're enrolled in Rush Hour Rewards and see Rush Hour start and end times.
FTL Lights can save you money during peak periods.

By selecting Allow, you allow Nest and Nest to use the information above in accordance with their respective terms of service and privacy policies. If you want to stop working with Nest at any time, go to Home settings in the Nest app.

Allow

SYSTEM AND METHOD FOR ADJUSTING PRIVACY POLICIES

RELATED APPLICATION DATA

The present application claims the benefit under 35 U.S.C. 119(e) of the priority date of Provisional Application Ser. No. 62/951,271 filed Dec. 20, 2019; and 62/957,885 filed Jan. 7, 2020; and 62/964,428 filed Jan. 22, 2020, all of which are hereby incorporated by reference. The present application is also related to the following applications, all of which are filed on this same date and incorporated by reference herein:
System & Method for Analyzing Privacy Policies; Ser. No. 17/128,062
System & Method for Implementing A Privacy Policy; Ser. No. 17/128,066
System & Method for Effectuating User Access Controls; Ser. No. 17/128,068
System & Method for Implementing User Watermarks; Ser. No. 17/128,078
System & Method for Recommending Alternative Service Providers; Ser. No. 17/128,081
System & Method for Effectuating Data Countermeasures; Ser. No. 17/128,082
System & Method for Implementing a Digital Data Marketplace; Ser. No. 17/128,085

FIELD OF THE INVENTION

The present invention generally relates to the field(s) of automating review and adjustments of data privacy policies for individuals and companies/employees. More specifically, embodiments of the present invention pertain to computer-implemented systems and methods which analyze user behavior as they engage with providers, apps, social networks, etc. to identify and accommodate deviations from a target data protection policy.

BACKGROUND OF THE INVENTION

Employees and customers of enterprises face a lack of transparency, privacy and agency as they move and transact online, getting tracked along the way, prompting heightened concerns about commercial use of privacy data. Roughly three of every four internet users in the U.S. and Europe say they worry about their online privacy, with almost half of them saying their concerns have grown year-on-year (CIGI, Ipsos, 2019). Enterprises don't know who tracks their employees, nor do they know what data is harvested, where it's sold and at what price. The same applies to their customers, whether they are other companies or consumers. In the next 5 years, companies risk losing an estimated US$5.2tr in value creation from the digital economy to cyber attacks (Accenture, 2019). The value at stake for companies between taking a responsible approach to workforce data, and failing to do so, equals 12% in future revenue growth (WEF, 2019). Increasingly social engineering is added to technical engineering in these cyber attacks, as data analytics companies tease out digital footprints to triangulate movements of individuals and companies through the digital work, trying to gain insights into impending decisions and strategic moves.

For all of these reasons, more people are starting to question the exchange of personal information for free access to products and services as they leave the safe confines of firewalls and corporate protections. A survey found that 79% of consumers said they want compensation when their data is shared, and 72% said they would feel more comfortable sharing personal data if they received an incentive in exchange (Insight Network, 2018). Recent estimates suggest that a small family could gain much as $20,000 a year if they didn't give away data for free (Lanier, Weyl, 2019). Companies, meanwhile, are struggling to design privacy respecting and trusted products and services, to position their brands in an era of "privacy computing," and to mitigate fines for non-compliance consumer-focused legislation, such as the EU's General Data Protection Regulation (GDPR). Corporations would like to create more customer intimacy and more tightly personalized services. The only way to square this apparent contradiction is to grant more privacy control to the individual, generating more trust in the corporation, and thereby creating more privacy-assured spaces for that intimacy. Hence, enterprises, their employees and consumers need a solution that addresses data privacy issues and, in so doing, renews trust between them.

The problem is exacerbated because consumers employ a wide variety of devices, which capture their personal data. Digital systems have reached a point of complete integration into the personal and professional lives of billions of people, so that individuals have minute-to-minute interactions with connected devices. Connected digital devices include computers, mobile "phones" (each with billions of transistors, more powerful than the supercomputers of the 1990's), wearables such as "smartwatches" (wrist-worn computers), "smart speakers", tablet computers, smart home thermostats, smart TVs, smart lighting, smart refrigerators, smart rings, etc. Digitally connected interactions are also increasingly integral to all types of devices and machinery, including the control of buildings, traffic, shipping containers, HVAC systems, garden irrigation, and in all kinds of vehicles. These connected devices share several properties: they are connected to cloud-based computers providing services over the Internet and airwaves, and they are under the shared control of the "device owners" (the registered owner of a phone, home thermostat, warehouse alarm system) and the "cloud service providers" (a health care provider that stores patient data, a smart speaker service provider such as Apple Siri or Amazon Alexa, etc.).

Typically, the systems are under shared control. For example, a connected vehicle (e.g., a car that receives over-the-air software updates from its maker) may be controlled both by the vehicle's driver, to adjust the seat and drive the car, as well as direct the car not to share location data with the car maker, and also controlled by the car's maker to limit travel speed. In addition the data created by or captured by a connected digital device are often valuable for commercial purposes. For example, it may be valuable to a carmaker to collect all its sensor data anytime there is a near-collision, so that future software versions enable proper navigation in similar near-collision settings in all similar model cars. While this example shows a commercial benefit both to consumers and vendors, because a car that avoids crashes will sell better than one that does not avoid crashes, there are many settings in which commercial applications of collected data benefit the vendors disproportionately. This is also the case where data may be exploited for political purposes: to promote a particular candidate or a political agenda.

In addition, typically data created by or captured by a connected digital device is largely stored under the control of the vendor or service provider, with end-user access and control provided in a secondary manner, e.g., under the control of the vendor or others in the value chain. The complexity of the typical user experience in establishing the privacy-related preferences with the many vendors involved in providing services via connected digital devices can be seen in a variety of prior art environments, including operating systems such as Microsoft Windows and MacOS, as well as mobile operating systems such as Android and iOS; edge and cloud services include search engines, photo storage services, email and calendar services, news content delivery, thermostats in homes, route-planning and navigation apps on mobile devices, social network systems, text-chat and video chat apps, ride-sharing apps, file storage apps, and video-based baby monitor services: the list is long, and growing daily. As a result, it takes 900 pages and 34 hours to read the terms and conditions of popular apps just on one average smartphone (Lützow-Holm Myrstad, 2018). Each such digital system is subject to varied and changing regulation regarding privacy, for the storage, sharing, retention, and exploitation based on the preferences of the end users generating and providing data.

For example, FIG. 11A illustrates the many different privacy settings associated with a typical social networking site such as operated by Facebook. The number and variety of settings can be overwhelming for a typical user to appreciate, let alone review and configure. Other examples are shown in FIG. 11B to for the Windows→Operating System, including for browser options. Similar configuration options for the Apple MacOS→are shown in FIG. 11C Excerpts from the Google Chrome Browser and other internet-connected devices such as Nest and Alexa are also shown in FIGS. 11D, 11E and 11F.

In addition, there are often overlapping privacy setting conflicts and interplay that are invisible to the user. A single device such as an iPad mobile computing tablet enables services from millions of vendors such as Amazon, each of which may itself provide a platform like Alexa that enables millions of vendors like ride-hailing company Uber to provide their services so that a user might call a ride-hailing service like Uber using Alexa on an iPad. At each level there are privacy settings: the device's operating system like iOS will have privacy settings in general and application-by-application; the application Alexa provided by Amazon that is itself a platform will have privacy settings, and the vendor Uber, which the user beckons via Alexa on the iPad, will have privacy settings—so that at every level, "user settings" capture privacy-related preferences in different ways.

As seen above, current privacy tools are e.g. browser specific, stifle the quality of digital services or take the form of "user privacy settings" in operating systems, browsers, apps, websites and other digital services. These general-purpose solutions cannot accommodate the very subjective notions of individual privacy concerns. Neither do they help to negotiate the terms, conditions and value for which data is shared across digital applications. Likewise, cyber security firms typically target businesses with data management solutions that can't be individualized, either. Browser plug-in block tracking, but they don't provide transparency into what happens with user content once it is collected.

Finally, it should be appreciated that each enterprise and consumer/user places different value and importance to his or her data, depending on the type of data, the context, etc. While some items of data may be considered universally valuable/critical (credit card numbers, social security numbers, etc. others may be the subject of considerable subjective variations in treatment (images, posts, browsing history, etc.). Some users may not ever want their location to be tracked with their cellphones, while others may be willing to do so under selected controlled scenarios.

There is a need therefore for a comprehensive, unified solution that addresses both top-down legislative initiatives and the vague corporate AI ethics frameworks that companies are increasingly developing. What is needed is a scalable, bottom-up solution that enterprises can use for their employees and customers to develop, curate and enforce their own individualized demand for privacy through their respective "Personalized Privacy Charters (PPC)," embedded and nestled inside an overall Corporate Privacy Charter (CPC) While an enterprise employee can only work within the settings of the enterprise charter for work-relevant limits, he/she can extend their PPC for DSPs not covered by the corporate policy. This way the value of the privacy charters is a holistic approach to all of a user's settings while in compliance with their work. This provides the customization that regulatory regimes lack, as well as the enforceability that self-regulated corporate AI ethics policies lack, while providing negotiation power to employees, consumers and enterprises alike. By giving users more insight into and control over their data, the PA allows enterprises and end-users to balance their privacy concerns against the economic gains that come from selling data to all interested parties—a capability that, according to Stanford researchers, leads to allocations that are closer to optimal. In other words: When users transfer the rights over their data to digital service providers, they may not only overuse it and not adequately respect consumer privacy but also find themselves reluctant to share it with other parties because of concerns over creative destruction. There is a growing need for tools which give property rights to enterprises and end-users which allow them to negotiate the terms for sharing the data and make it accessible for more than one or a few entities, allowing greater value creation in the digital economy.

While some prior art exists for implementing privacy charters—see e.g. U.S. Pat. No. 6,959,320 (Mitchell et. al.): US Pub. No. 2005/0091101 (Epling et al): U.S. Pat. No. 8,966,575 (McQuay et al.); U.S. Pat. No. 9,961,090 (Barday) which are incorporated by reference herein—no existing tools allow users to 1) set up their own privacy terms and conditions for engaging with digital service providers; 2) dynamically manage data tracking; 3) start to negotiate terms regarding usage; 4) make recommendations for similar sites with less tracking and to end-users to evolve their privacy charters as they browse; 5) control the flow of data collected and shared with companies outside these services' immediate ecosystems; and 6) build the foundation for an equitable and efficient data marketplace that balances the bargaining power of data creators and buyers.

This "Discussion of the Background" section is provided for background information only. The statements in this "Discussion of the Background" are not an admission that any particular subject matter disclosed in this "Discussion of the Background" section constitutes prior art to the present disclosure, and except for those portions specifically identified as prior art no part of this "Discussion of the Background" section may be used as an admission that any part of this application, including this "Discussion of the Background" section, constitutes prior art to the present disclosure.

SUMMARY OF THE INVENTION

An aspect of the present disclosure therefore is to provide systems and methods which address the limitations in the prior art noted above.

The present disclosure therefore offers a number of embodiments that provides an intrinsically user-centric alternative to the tedious, user-unfriendly and piecemeal "user privacy settings" in operating systems, browsers, apps, and other websites and services. Currently, users who want to understand and effectively manage their privacy settings must work through about 900 pages and 34 hours to read all the terms and conditions of popular apps on an average phone (2018). By contrast, a "Personalized Privacy Charter" as set forth herein provides a master control panel for privacy management, allowing users to set their own preferences and needs. This simplifies privacy for users, but it also begins to establish degrees of scarcity for different types of data in different combinations while also insuring those data sets against repossession and litigation before they get traded A first aspect of the disclosure therefore concerns a method of analyzing and classifying data processing agreements (DPAs) from digital service providers (DSP) applicable to user data to generate a policy analysis model with a computing system. The method generally performs the following steps: a) creating a first aggregated set of electronic DSP data policies from a corpus of text extracted from a plurality of separate DSPs with associated separate DPAs; b) generating a set of tokens corresponding to individual constituent text snippets of each policy in such policies with a natural language engine associated with the computing system; c) mapping each token in the set of tokens to a corresponding representative vector having a vector value with the natural language engine; d) processing the set of tokens to form a set of reference clusters for an initial policy analysis model characterized by respective similar vector values; e) processing the reference clusters to assign an associated user privacy data related category for each cluster in the initial policy analysis model. The user privacy data related category in the policy analysis model includes at least two options, including a privacy-benign or a privacy-violative designation.

In some embodiments additional steps are performed, including one or more of: calculating an overall weighted average score for an individual DPA based on an individual user privacy data charter, which includes user-defined weightings for different categories of data and/or different DSPs; evaluating the initial policy analysis model for predictive performance; evaluating the initial policy analysis model for computational requirements; fitting the initial policy analysis model based on a second additional set of electronic DSP data policies from a second corpus of text; and altering the initial policy analysis model based on results of the fitting.

Another method of analyzing and classifying a data processing agreement (DPA) from a digital service provider (DSP) site applicable to user data comprises the steps: collecting and aggregating a set of DSP data policies for a set of DSP sites; separately generating a corresponding set of topics and clauses for the set of DPAs with a machine learning engine by processing text documents associated with the of DPAs; labeling the set of topics and clauses with an impact rating on a user data privacy protection scale; and using the set of labeled topics and clauses to train a machine learning algorithm to derive a set of classification models for the set of DPAs.

The DPA specifies a set of allowable uses of the user data. In some embodiments the machine-learning engine uses a supervised algorithm. The impact rating is preferably specified as a binary value of benign or harmful.

A system for analyzing and classifying data processing agreements (DPAs) from digital service providers (DSP) applicable to user data to generate a policy analysis model comprises a computing system including one or more executable software modules adapted to perform any or all of the functions noted above.

Another aspect of the disclosure concerns a method of creating a customized user privacy protection charter (PPC) for controlling online interactions between the user and a digital services provider (DSP) comprising the steps: defining a set of user data categories associated with data exchanged by the user with a first set of DSPs; defining a set of user data sensitivity ratings available for each of the user data categories; automatically mapping a set of user data sensitivity ratings adopted by the user to the set of user data categories to specify privacy ratings as a category-sensitivity rating pair within a privacy rating protection field for the user; creating the user PPC based on the privacy ratings; as generated the PPC is adapted to be used by a software agent configured for privacy management within a web browser executing on a first computing device and/or an application interface executing on a second phone based computing device for engagements with DSPs.

In some embodiments of this aspect of the disclosure, the user PPC is compared to privacy related settings in a digital provider agreement (DPA) for the DSP before selected privacy data is exchanged with such DSP. The graphical interface can include an option for providing descriptive text explanations for each of the data categories and data sensitivity ratings. Furthermore, the PPC is computed automatically for the user based on identifying user behavior, and is offered to the user to accept, reject, or modify. The first set of DSPs is selected from sites that the user engages with actively. The user selected PPC is compared to user behavior to identify discrepancies in category-sensitivity ratings, and is automatically modified to accommodate the discrepancies. The discrepancies can be identified and calculated based on comparing the privacy ratings against DSP ratings determined by a natural language system rating based on analyzing a digital provider agreement (DPA). In some applications an inventory and assessment is automatically performed to identify user devices and activities before presenting the user PPC. To assist the user, he/she can be provided with one or more predefined persona types for populating the PPC, which persona type(s) is/are associated with specific preferences and behaviors for one or more representative users. The predefined persona type(s) can be selected based on calculating privacy ratings for DSPs with which the user interacts. In some applications the PPC is initially configured based on correlating a profile of the user to profiles of other users with PPCs.

A related method of creating a customized privacy protection charter (PPC) for a user for controlling online interactions with a digital services provider comprises the steps of: defining a set of user data categories; defining a set of user data sensitivity ratings; providing a graphical interface adapted to permit a user to specify privacy ratings for a category-sensitivity rating pair within a privacy rating protection field; and creating the PPC based on the privacy ratings; in this way the PPC is adapted to be used by a software agent configured for privacy management within a web browser executing on a first computing device and/or an application interface executing on a second phone based computing device.

In some embodiments the graphical interface includes an option for providing descriptive text explanations for each of the data categories and data sensitivity ratings. The PPC is preferably implemented for the user across both web-based and application based interactions with digital service providers.

A system for creating a customized user privacy protection charter (PPC) for controlling online interactions between the user and a digital services provider (DSP) comprises a computing system including one or more executable software modules adapted to perform the functions and steps identified in the preceding paragraphs.

Another aspect of the disclosure concerns a method of implementing privacy protection for a user with an automated security agent controlling online interactions through a user computing device with a digital services provider comprising the steps: processing a first digital service provider (DSP) data policy to determine a set of DSP privacy related parameters associated with accessing DSP content; processing a privacy charter (PC) for the user to determine a set of user privacy related parameters to be effectuated by the automated security agent for selected user privacy data when accessing the DSP content; generating a compatibility assessment based on a comparison between the set of DSP privacy related parameters and the set of user privacy related parameters; and controlling a data session between the user and the DSP with the automated security agent based on the compatibility assessment and the user privacy related parameters, such that: when enabled by a user notification option in the PC the automated security agent notifies the user of any incompatibilities between the set of DSP privacy related parameters and the set of user privacy related parameters; and when enabled by a user blocking option in the PC the automated security agent automatically blocks access by the DSP to the selected user privacy data based on the compatibility assessment.

Preferably the automated security agent implements the PPC uniformly across multiple devices used by the user to control data sessions on the devices with DSPs; the automated security agent is configured to generate a coded message in an interface of the user computing device; and the coded message includes color indicators to denote congruencies and inconsistencies with different DSP data policies while browsing a DSP site. The privacy charter (PC) is implemented on behalf of an individual as a personal privacy charter (PPC) or on behalf of a corporation as a corporate privacy charter (CPC).

A related aspect of the disclosure concerns a method of implementing privacy protection for a user with an automated security agent controlling online interactions with a digital services provider comprising the steps: processing a first digital service provider (DSP) data policy to determine a set of DSP privacy related parameters associated with accessing DSP content; processing a privacy charter (PC) to determine a set of user privacy related parameters to be effectuated by the automated security agent for selected user privacy data when accessing the DSP content; the privacy charter (PC) is implemented for a computing device on behalf of an individual as a personal privacy charter (PPC) or on behalf of a corporation as a corporate privacy charter (CPC); generating a compatibility assessment based on a comparison between the set of DSP privacy related parameters and the set of user privacy related parameters; and controlling a data session between the computing device and the DSP with the automated security agent based on the compatibility assessment and the user privacy related parameters, such that: when enabled by a user tracking option in the CPC/PPC, the automated security agent tags the selected user privacy data communicated to the DSP with a tracking code prior to or during the data session; and when enabled by a user notification option in the CPC/PPC the automated security agent notifies both the user and the DSP of any incompatibilities between the set of DSP privacy related parameters and the set of user privacy related parameters; and when enabled by a user blocking option in the PPC the automated security agent automatically blocks access by the DSP to the selected user privacy data based on the compatibility assessment; and when enabled by a user negotiation option in the CPC/PPC the automated security agent automatically negotiates between the user and the DSP for access to the selected user privacy data in accordance with a user data license; monitoring the DSP and generating a compliance assessment by the DSP with the user data license; generating recommendations with an automated recommendation engine to the user including at least: a first list of items identifying alternative DSPs having a higher compatibility assessment and/or compliance assessment; and a second list of items identifying proposed modifications to the CPC/PPC and/or control options for the automated security agent; under certain circumstances the second list of items can be implemented automatically for the user when enabled by a user recommendation option.

The PPC preferably includes both a set of different categories and an associated privacy rating, and is implemented and enforced across multiple devices used by the user. Furthermore the automated security agent is configured to monitor the user's actions and infer modifications to the CPC/PPC based on observed differences in the actions and the CPC/PPC, and to propose adjustments to the PPC to the user along with accompanying explanations for such adjustments.

The agent can also condition access rights to the selected user privacy data on an agreement by the DSP to embed the tracking code in any of such privacy data. A value of the selected user privacy data can be calculated and negotiated with the DSP prior to providing the same to such DSP. To protect the user, additional steps of generating multiple intentionally altered false items of selected user privacy data, and providing the same along with correct user privacy data to the DSP are performed.

Systems for implementing privacy protection with an automated security agent controlling online interactions with a digital services provider comprise computing system including one or more executable software routines adapted to perform the agent functions noted identified in the preceding paragraphs.

Yet another aspect of the invention concerns a method of creating an adaptable customized privacy protection charter (PPC) for a user computing device and for controlling online interactions with a digital services provider (DSP) comprising the steps: defining an initial PPC based on a set of user data categories, a set of user data sensitivity ratings, and privacy ratings for a category-sensitivity rating pair within a privacy rating protection field; in this manner the initial PPC is adapted to be used by a software agent configured for privacy management executing on a computing device configured to engage with a DSP on behalf of the user; and monitoring the user's interactions with the software agent during data sessions with the DSP to identify dynamic user privacy preferences that differ from the initial PPC; identifying proposed changes to the initial PPC based on the dynamic user privacy preferences; presenting the proposed changes the user; and creating an adapted PPC based on modifying the initial PPC in accordance with user feedback to the proposed changes.

In related embodiments, additional steps can be used with the adaptable customized PPC, including one or more of:

monitoring other users' interactions with DSPs to identify potential privacy changes to the initial PPC; creating users clusters based on clustering behavior of other users to identify relationships between behavioral variables; developing a plurality of models based on the clusters; and assigning the user to one of the plurality of models. In some embodiments: the proposed changes are automatically implemented into the adapted PPC without further user approval; the user interactions are journaled and selectively replayed during step (d) to explain the proposed changes; the user is initially assigned a first behavioral model which is overwritten by the adapted PPC.

Systems for creating adaptable customized privacy protection charter (PPC) for a user computing device and for controlling online interactions with a digital services provider (DSP) comprise a computing system including one or more executable software routines adapted to perform the PPC creation functions noted identified in the preceding paragraphs.

Still another aspect of the disclosure relates to a method of implementing privacy protection for user data during online interactions with a digital services provider (DSP) comprising the steps: monitoring a user's interaction with the DSP during a data session, to determine if selected user data falling within data restriction rules is to be communicated to the DSP; determining a data type and a data restriction parameter for the selected user data; and modifying any such selected user data to include watermarking information in accordance with the data type and data restriction parameter, to permit later identification of the selected user data in other contexts after it is communicated by the user to the DSP.

Preferably, the watermarking information is adapted to be undetectable by the DSP and or a human, and when the data type includes: an image formatted data, the watermarking information is based on altering one or more pixel states and/or appending redundant information; an audio formatted data, the watermarking information is based on appending redundant information and/or altering acoustic volumes; an image formatted data, the watermarking information is based on altering one or more pixel states and/or appending redundant information; video formatted data, the watermarking information is based on altering one or more pixel states and/or acoustic data; text formatted data, the watermarking information is based on altering and/or exchanging character codes for text characters or appending extraneous text characters.

A related method of implementing privacy protection for user data during online interactions with a digital services provider (DSP) comprises the steps of: defining a personal privacy charger (PPC) based on a set of user usage restrictions for user data, such that the initial PPC is adapted to be used by a computing device configured for privacy management in interactions with the DSP; monitoring the user's interaction with the DSP during a data session, to determine if selected user data falling within the PPC is to be communicated to the DSP; and modifying any such selected user data to include embedded tracking information configured to permit later identification of the selected user data in other contexts after it is communicated by the user to the DSP.

Preferably the software agent conditions communication of the selected user data based on a confirmation by the DSP to comply with the initial PPC and inclusion of the user tracking codes. In certain applications the PPC is based on a set of user data categories, a set of user data sensitivity ratings, and privacy ratings for a category-sensitivity rating pair within a privacy rating protection field. Depending on the application, the tracking information can include codes steganographically embedded in the selected user data, adapted for a data or file type associated with the selected user data, and uniquely configured to be detected only by the software agent. In some instances the tracking information is identified, selected and embedded by the DSP on behalf of the user.

Systems for implementing privacy protection for user data during online interactions with a digital services provider (DSP comprise a computing system including one or more executable software routines adapted to perform the watermarking/content modification operations noted in the preceding paragraphs.

Another aspect of the disclosure pertains to methods of recommending privacy-friendly data service provider (DSP) sites to a user accessing DSP content using an automated security agent for controlling online interactions comprising the steps: evaluating a set of DSP sites to map them to respective categories of content associated such sites; processing a personal privacy charter (PPC) for the user such that the PPC is adapted to be used by the software agent when such agent negotiates privacy requirements of a proposed data exchange between the user and a DSP, including user access of content at the DSP; identifying a first weighted privacy score and a first category of service for a first DSP which the user engages with; calculating a second weighted privacy score for at least one second DSP which is also associated with the first category of service; presenting the second DSP as an alternative to the user when the second weighted privacy score is better than the first weighted privacy score for the user.

In some embodiments: the evaluating and mapping in step (a) is performed by a machine learning algorithm based on tokenizing and classifying content at such sites; and the weighted privacy score is based on user-specific settings for different types of user data in different service categories. For some embodiments additional steps are performed including assessing a plurality of second DSPs in step (d) and ranking each of them for suitability as an alternative site; and generating a notification to sale first DSP site when the user PPC is not compatible with the user PPC.

A related method of recommending privacy-friendly data service provider (DSP) sites to a user accessing DSP content using an automated security agent for controlling online interactions comprises the steps: processing a personal privacy charter (PPC) for the user such that the PPC is adapted to be used by the software agent while such agent is negotiating privacy requirements of a proposed data exchange between the user and a DSP, including user access of content at the DSP; monitoring the user's interaction with a first DSP during a data session to access first content, to determine if the user PPC is compatible with DSP user data policies at the first DSP site, and such that when the user PPC is not compatible with the user data policies, recommending an alternative site for the first content and/or second content related to the first content. The alternative site is determined by calculating a compatibility of one or more secondary sites with the PPC and selecting one of such secondary sites based on the calculation.

In some embodiments additional steps are performed including: assessing a set of DSP sites to determine selected sites compatible with the PPC, and controlling the software agent to only use the selected sites for the user; and generating a notification to sale first DSP site when the user PPC is not compatible with the user PPC.

A system for recommending privacy-friendly data service provider (DSP) sites to a user accessing DSP content using an automated security agent for controlling online interactions comprises a computing system including one or more executable software routines adapted to perform the functions in the preceding paragraphs.

Another aspect of the disclosure relates to a method of implementing privacy protection for a user with an automated security agent controlling online interactions with a digital services provider (DSP) comprising the steps: determining with the automated security agent whether a first digital service provider (DSP) is designated as a white listed entity by a user privacy charter; when the first DSP is not a white list entity, causing the automated security agent to generate a set of decoy requests configured for a protocol and format employed by the first DSP; presenting both an accurate request containing the user data and one or more decoy requests containing artificial data to the DSP for the user device with the automated security agent; and processing a first response from the DSP for the accurate request and one or more second responses from the DSP for the one or more decoy requests; and communicating at least the first response to the user device; in this manner the user data is intermingled with the artificial data to reduce data tracking and assignability of the user data to the user.

In various embodiments the decoy requests: are formatted to represent artificial data for the user; include aggregated accurate requests for other users disguised as requests from the user; include location based routings made to different GPS services; include obscured IP addresses or IP paths for the user; are selectable on a geographic region basis, or an address basis; are formatted to represent artificial search requests for the user; and/or are formatted to represent artificial content requests for the user.

Additional steps that can be employed include: preparing a set of disguised requests and logging a corresponding set of responses by the first DSP as part of identifying an optimal masking of user data for the first DS; determining a maximum user data obfuscation or privacy value available at a zero cost disruption with the first DSP; employing a model based on the determination for engagements by the user with the first DSP; and generating multiple decoy requests with the automated security agent to determine a threshold limit of requests which a DSP computing system will accept from a user device.

A related method for implementing privacy protection for a user with an automated security agent controlling online interactions with a digital services provider comprises the steps: processing a personal privacy charter (PPC for the user to determine a set of user privacy related parameters to be effectuated by the automated security agent for user data originating from a user device when engaging with a third party digital service provider (DSP) through an online website and/or a mobile application; controlling a data session between the user and the DSP with the automated security agent based on the user privacy related parameters, such that when enabled by a user privacy countermeasure option in the PPC, the automated security agent generates both an accurate request containing the user data and one or more decoy requests containing artificial data to the DSP for the user device; and processing a first response from the DSP for the accurate request and one or more second responses from the DSP for the one or more decoy requests; and communicating the first response to the user device; in such process the user data is intermingled with the artificial data to reduce data tracking and assignability of the user data to the user.

A system for implementing privacy protection for a user with an automated security agent controlling online interactions with a digital services provider (DSP) comprises a computing system including one or more executable software routines adapted to perform the operations noted in the preceding paragraphs.

Another aspect of the disclosure concerns a method of implementing an automated online data marketplace with a computing system comprising the steps: processing creator data with the computing system to assemble a set of alienable data units characterized by at least a data type and a data price for each of the alienable data units; tagging the alienable data units with traceable identifiers with the computing system; generating market metadata with the computing system identifying the data type, the data price, data restrictions, and creator identification for each of the data units; generating a license agreement with the computing system based on market metadata specifying a transaction requirement for the alienable data units, including an associated price and associated permissible uses; providing the alienable data units to an electronic data market controlled by the computing system and which can be accessed by third parties in accordance with specified data access rules; generating an electronic record of a transaction by a data buyer to the alienable data units with the computing system in accordance with the transaction requirement. In some embodiments the computing system is configured to match supply and demand for the alienable data units, including by adjusting a data price and/or availability of such units within a predetermined time period.

A related method of implementing an automated online data marketplace with a computing system comprises the steps: processing a user privacy charter (PC) with the computing system to determine a set of user usage parameters to be effectuated by an automated security agent for transacting selected user market data; wherein the usage parameters include at least an offer price for the selected user market data; presenting the selected user market data within the automated online data marketplace in accordance with the user usage parameters; processing a dataset request for user market data from a data buyer with the computing system, which dataset request specifies at least a target type of user market data, including a target type of content and a target bid price for such content; determining a transaction requirement with the computing system, including a transaction price and transaction use restrictions for the selected user market data based on the offer price, the target bid price and the set of user usage parameters; providing access to the selected user market data with the computing system as part of responding to the dataset request based on a determination that the data request satisfies the transaction requirement; and generating an electronic record of the access by the data buyer to the selected user market data with the computing system in accordance with the transaction requirement.

In some embodiments the transaction price is determined in part by an automated auction model and/or a price prediction engine. A market intermediary separate from the user and the data buyer can control a transaction computing system. The transaction computing system can be configured to automatically solicit user market data to compile aggregated user data across from different users across different online platforms, and solicit dataset requests from potential data buyers. An automated security agent preferably tags the selected user market data communicated with a tracking code and monitors the data buyer for compliance with the transaction requirement. The usage parameters can further include a time restriction and a scope of use restriction.

In other embodiments the method includes a further step: generating multiple false items of selected user privacy data, and providing the same along with correct user privacy data to the DSP. To satisfy the user data requirement, a transaction request further specifies one of at least: a) temporal features; b) demographic characteristics of a user; c) a unit size and volume; d) a demand value for the market data within the dataset.

A system for implementing an automated online data marketplace comprises a computing system including one or more executable software routines adapted to perform the functions set out in the preceding paragraphs.

DESCRIPTION OF THE DRAWINGS

FIGS. 11A, 11B, 11C, 11D, 11E-11F show examples of prior art commercial privacy policy configuration options across different sites, devices, and operating systems.

DETAILED DESCRIPTION

Figure 1A:
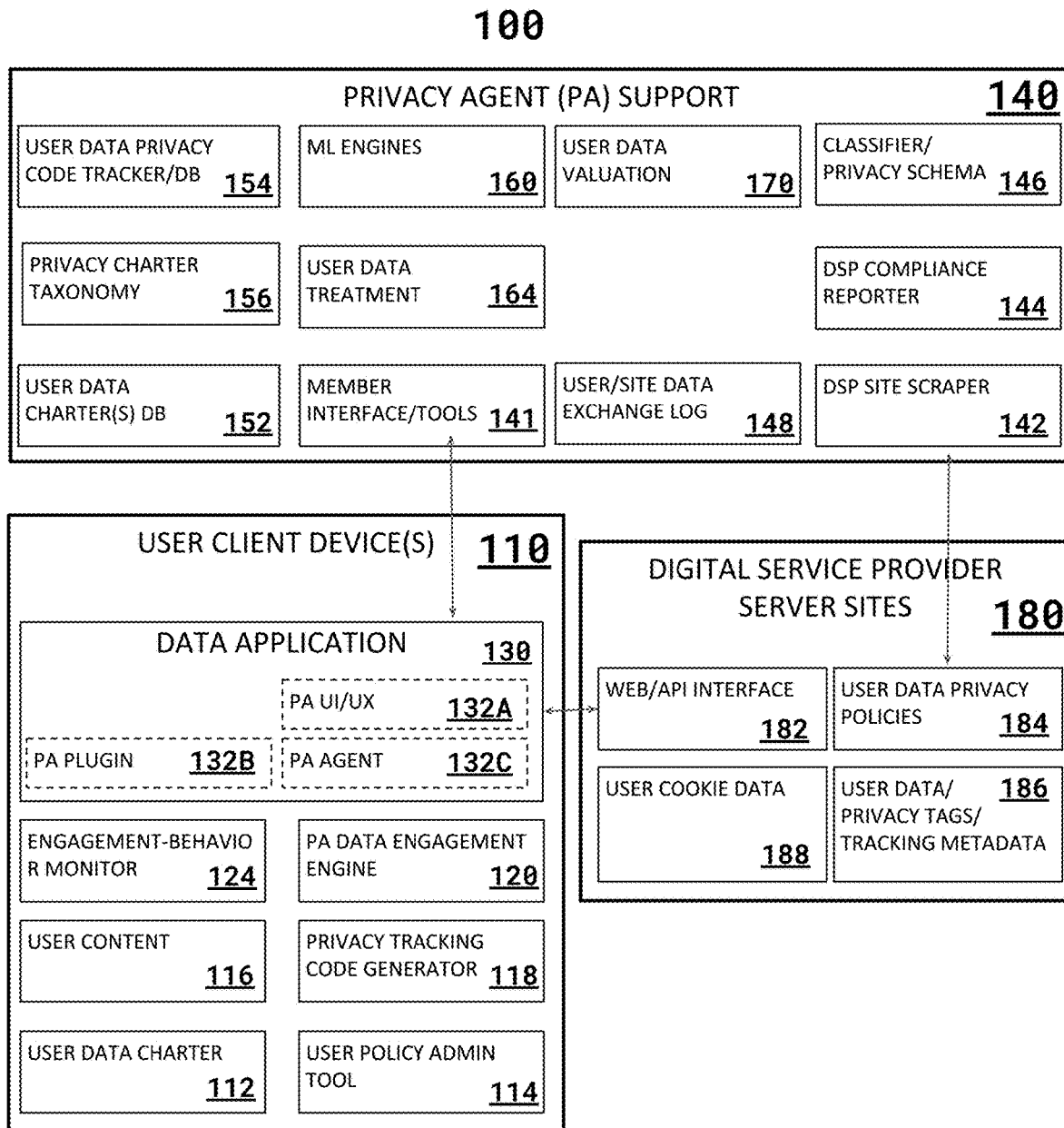
FIG. 1A shows a preferred embodiment of a privacy management system which employs a customizable automated privacy protection agent.

Reference will now be made in detail to various embodiments of the disclosure, examples of which are illustrated in the accompanying drawings. While the disclosure will be described in conjunction with the following preferred embodiments, it will be understood that the descriptions are not intended to limit the disclosure to these embodiments. On the contrary, the disclosure is intended to cover alternatives, modifications and equivalents reasonably understood by persons of ordinary skill in the art to be included within the spirit and scope of the invention. Furthermore, in the following detailed description, numerous specific details are set forth in order to provide a thorough understanding of the present disclosure. However, it will be readily apparent to one skilled in the art that the present invention may be practiced without these specific details. In other instances, well-known methods, procedures and components have not been described in detail so as not to unnecessarily obscure aspects of the present disclosure. Furthermore, it should be understood that the possible permutations and combinations described herein are not meant to limit the invention. Specifically, it will be understood by those skilled in the art that variations that are not inconsistent may be mixed and matched as desired.

Privacy Protection Considerations

An initial condition for a digital agent that ensures data privacy on behalf of users during their consumption of online services is an understanding of their individual privacy concerns and sensitivities. Privacy protection is not a one-size-fits-all proposition, and a privacy protection agent will need certain user preference inputs (at least once at the start of service) to provide the best possible protection of user privacy without interfering too much with the user's online experience.

At the same time, this solicitation of user inputs should not fall into the all-too-common trap of being so onerous and time-consuming as to discourage its widespread adoption. One aspect of the current disclosure pertains to a system and method for soliciting meaningful input from a user as to preferences and attitudes about data privacy in a low-friction manner, and using that input to map out individualized settings in a Personal Privacy Charter ("PPC"), which is used in a number of other ways to configure and control an intelligent, adaptive privacy management agent that adapts and works on behalf of a user as they navigate their daily online digital life.

As a derivative of the PPC, the Corporate Privacy Charter (CPC) applies the same method and principles as the PPC, but allows a company's Chief Information, Data, or Privacy Officer to set the privacy preferences for their organization overall, as if it were a person. The discussion below refers to both the personal and corporate privacy charter (PPC/CPC).

Overview of Approach Taken in Present Embodiments

To solve and address the prior art problems, in order to capture an individual's essential privacy preferences for use with these varied digital systems, and to assist in determining "settings" or "preferences" in wide-ranging digital systems, a number of unique structures and processes are described herein. First and foremost is a user-friendly master privacy charter, and flexible tools for assisting the user to define his/her privacy interests and concerns. To protect enterprises and people, an AI-powered Privacy Agent (hereafter referred to as PA) increases data transparency and agency while providing them new leverage for data transactions with Digital Service Providers (DSPs). The PA enables enterprises, their employees and customers (end-users), to understand, trace, control and negotiate the distribution and value of their data, based on a personalized privacy master control panel that derives from their individual privacy charter.

The PA elegantly and quickly designs a dynamically evolving Personalized Privacy Charter (PPC), which, in the case of employees as users, is embedded in a Corporate Privacy Charter (CPC) that each user expects (and at times requires) DSPs to respect as part of an interactive online session or engagement. Users interact with and shape their privacy charter preferably through a user-friendly and user-centric master control panel, with which they can adjust privacy settings throughout the digital realm. As services change over time, and user behavior evolves because of life events (such as marriage, children, etc.), the PA also recommends appropriate changes to the PPC (and, if needed, to the CPC), based on how other similar users tend to set their charter parameters. Alternative services are also recommended (via an ML-based recommendation engine) in cases where a user's PPC, embedded in the CPC (in the case of employees as users), is not in alignment with a service they like to use. The PPC preferably provides a benchmark against which the PA compares legal privacy agreements of DSPs and automatically recognizes privacy-sensitive digital interactions by the user. In the most common scenario, a privacy-relevant interaction is in the form of trackers on websites and the transfer of user data usage rights to the DSP through such engagements. Based on an analysis of the DSP site, the PA preferably makes specific recommendations to users about which trackers to block and which charter-compliant websites to consider as alternatives. The PA can be configured preferably so that it temporarily blocks access or, when desired, checks with the user to change settings prior to engaging with a DSP site (or app). To ensure DSP compliance with the PPC, the PA preferably tags all data originating from the user with a unique ID embedded into the files or metadata, allowing it to also track replications (e.g. screenshots or scans). The PA also optionally assigns a data usage license to user specific content and logs the transaction in a distributed cloud ledger such as a blockchain. Hence, the PA gives users quick, easy and elegant control over the flow of data they create, as well as the power to negotiate value exchange.

Overview of Architecture of Disclosed Embodiments

Figure 10:
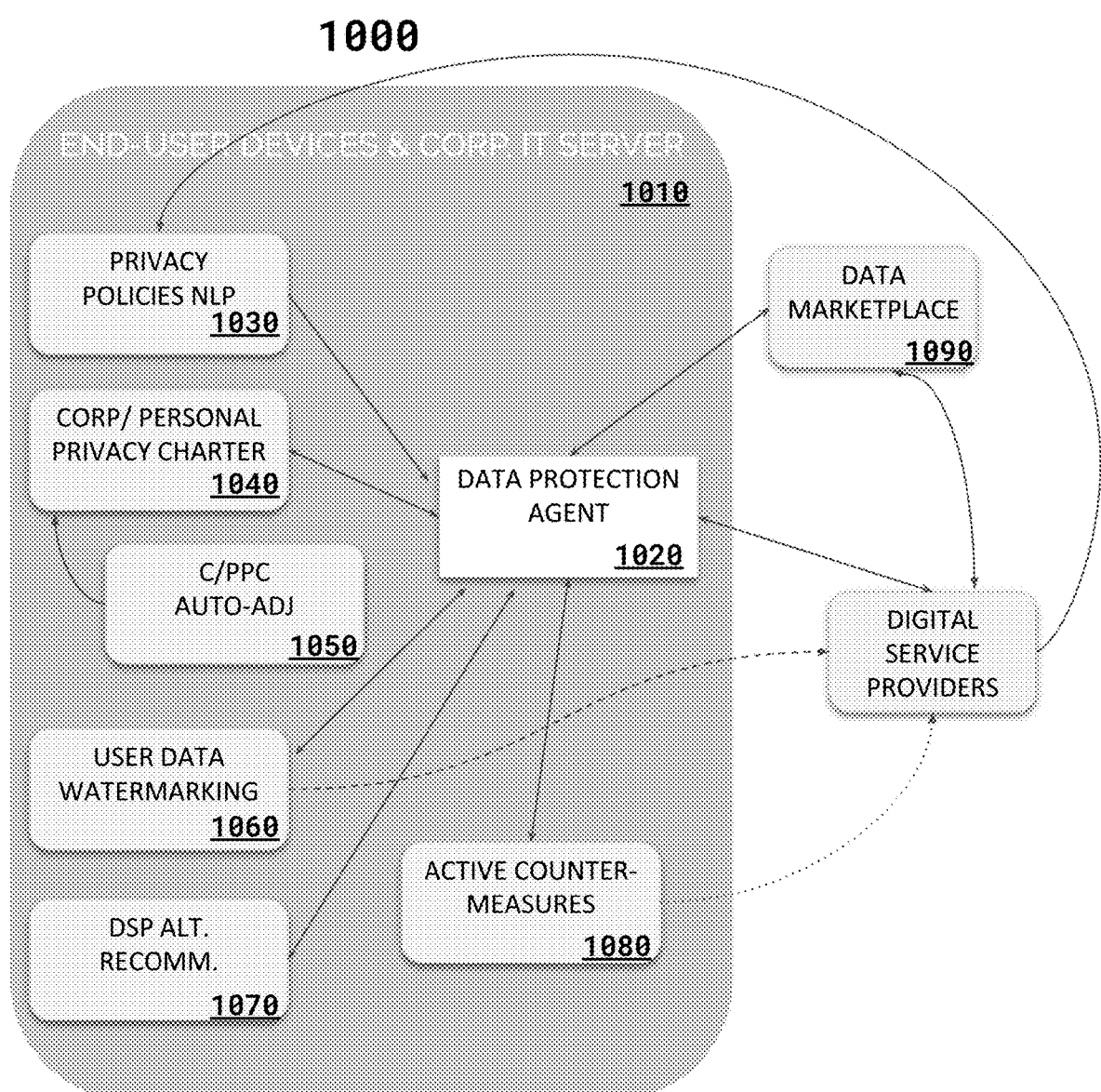
FIG. 10 shows a preferred embodiment of a privacy management system which employs a customizable automated privacy protection agent with countermeasure capability and provisions for a digital marketplace.
Figure 11A:
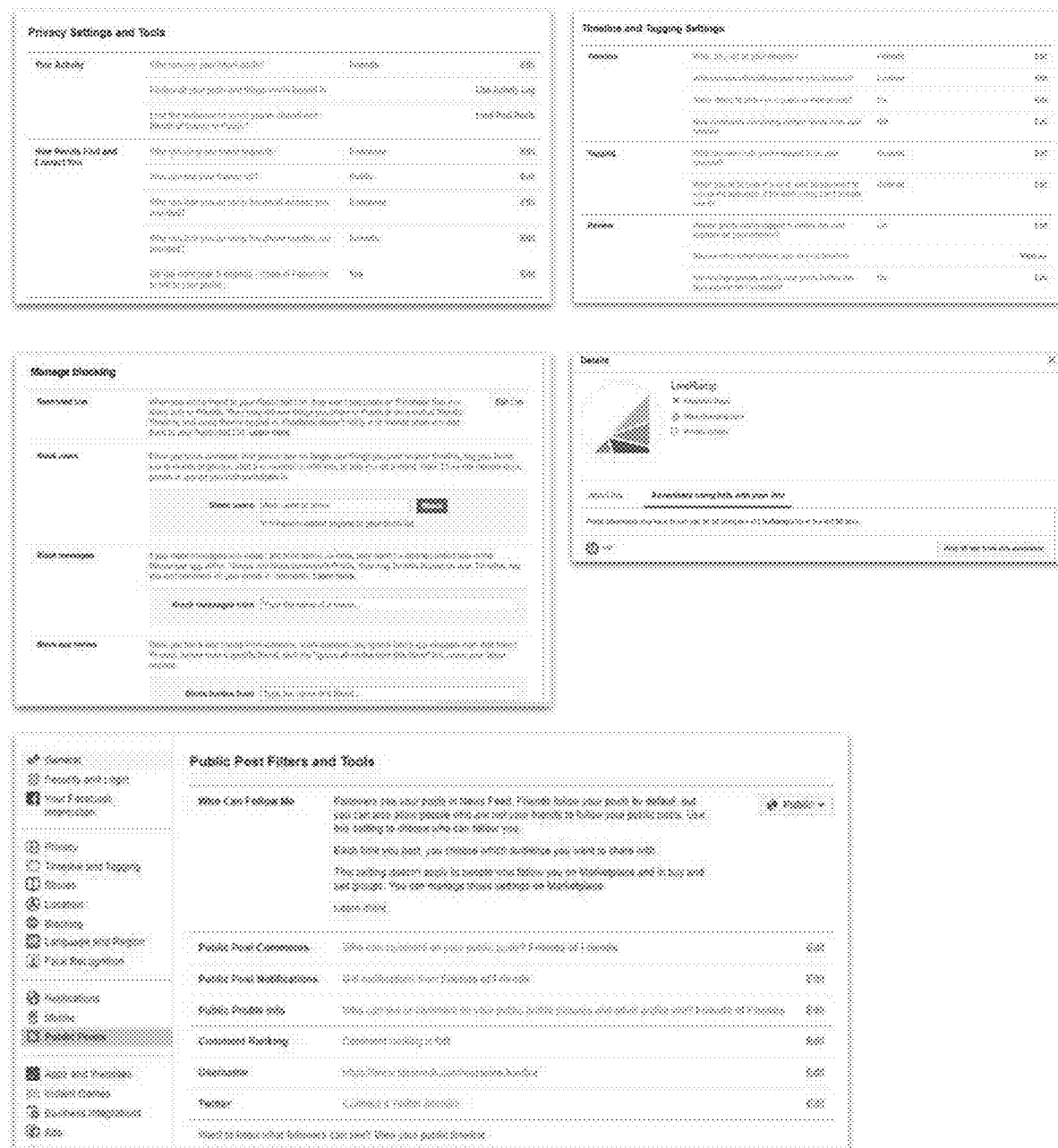
Figure 11B:
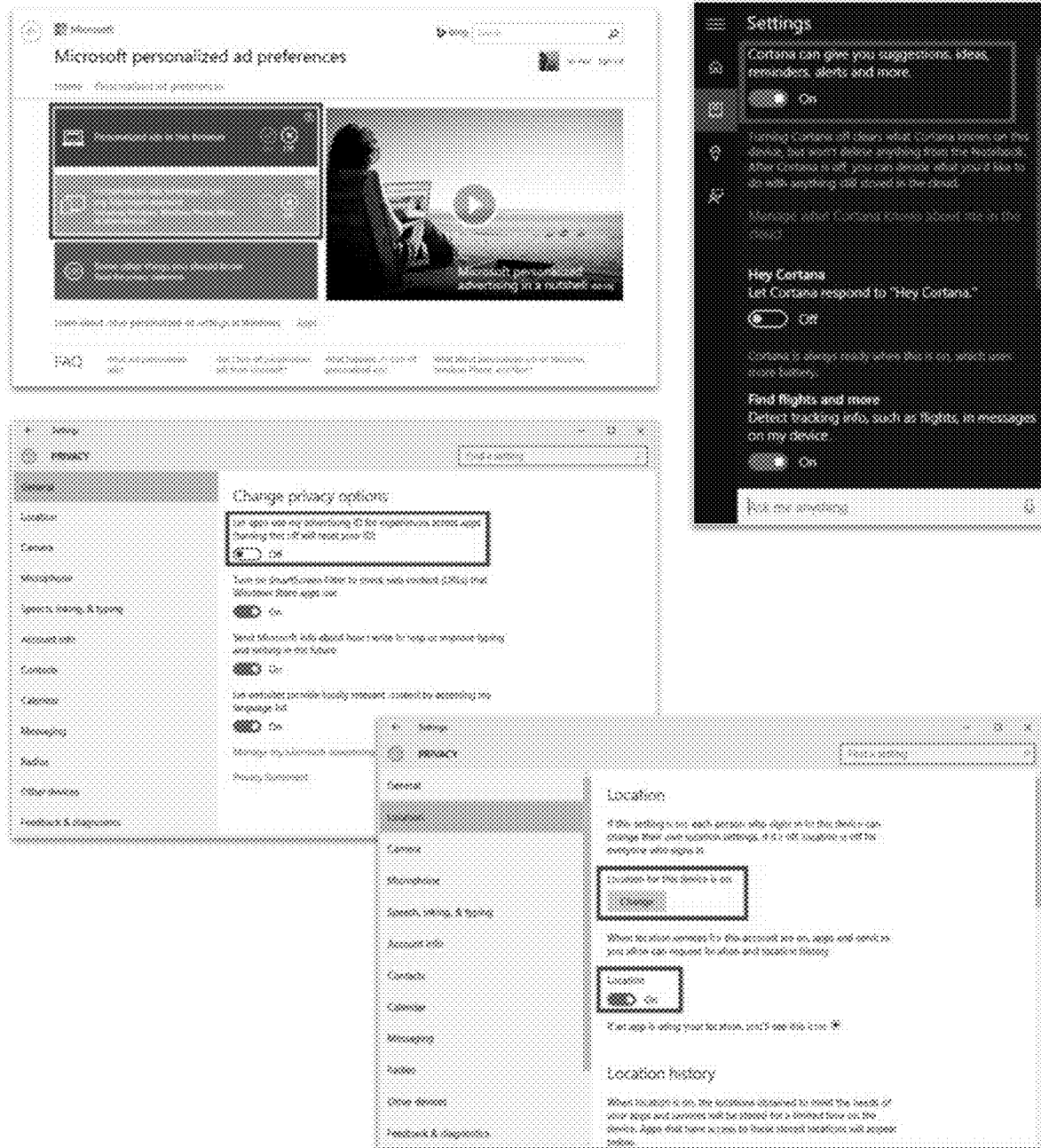
Figure 11C:
Figure 11C:
Figure 11D:
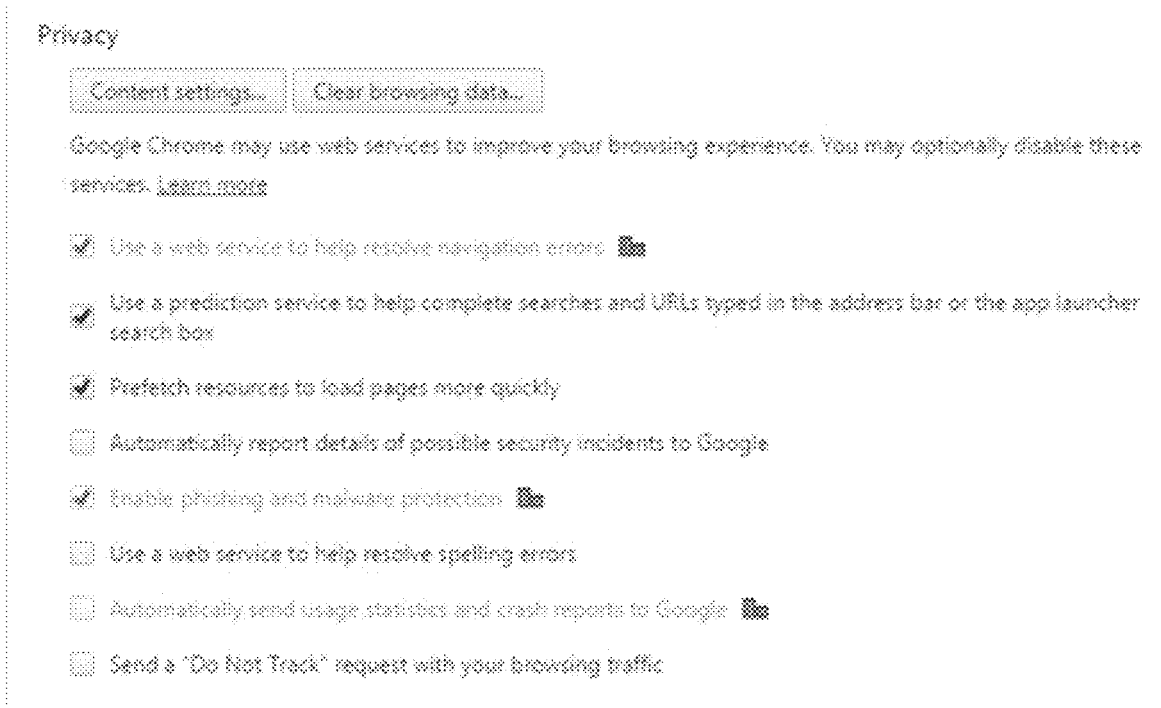
Figure 11E:
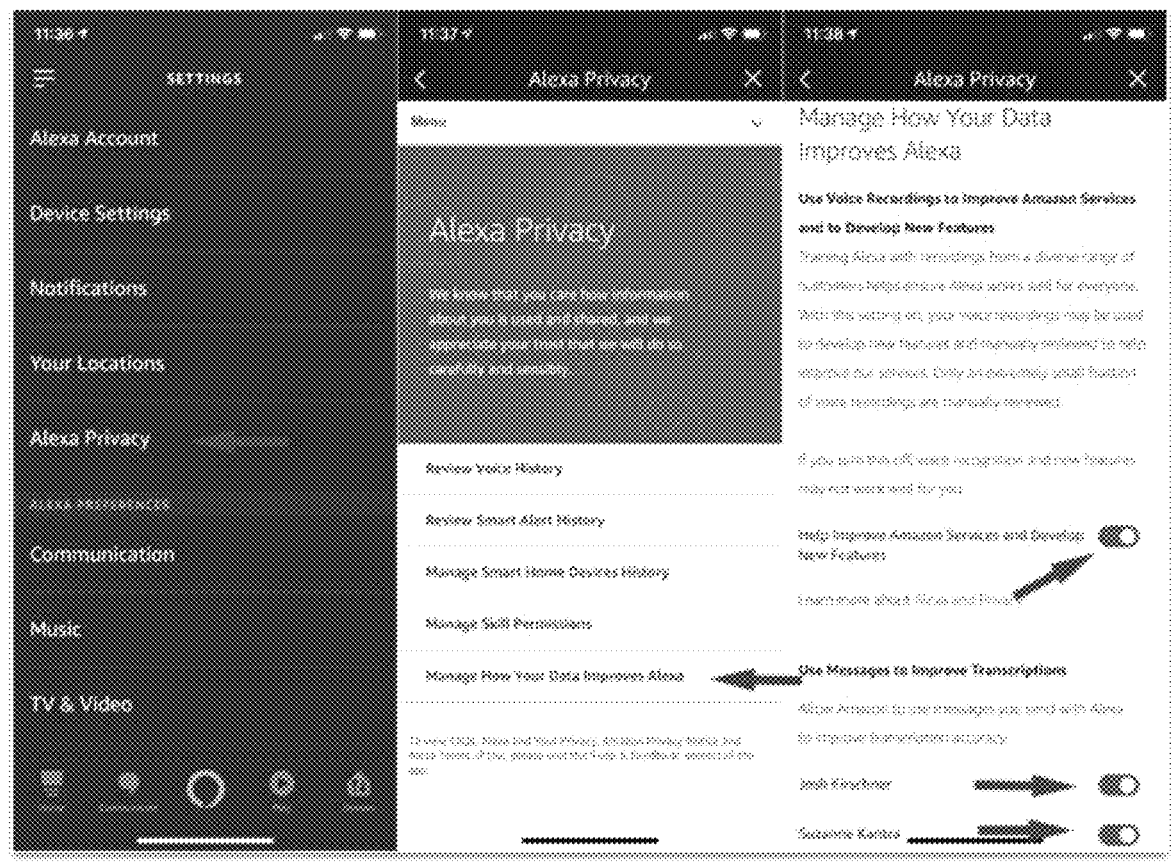

A high level diagram of an overall preferred architecture 1000 which embodies aspects of the disclosures described herein is shown in FIG. 10. A set of device 1010 (which may be personal or corporate based machines) are protected by a semi-autonomous digital protection or monitoring agent 1020 (see Section III below) when exchanging data with one or more DSPs 1015 based on a set of processed DSP privacy policies (see Section I below) and a personal/corporate privacy charter 1040 (see Section II below). The C/PPC can be adjusted automatically based on insights of an observation tool 1050 (see Section IV below). To further protect users, a watermarking tool/process 1060 (see Section V below) and countermeasures 1080 (see Section VII below) can be employed as well. To maintain a user's preferences a recommendation engine (see Section VI) can assist in finding and suggesting appropriate data sites. Finally, a digital data marketplace 10190 for transacting selected user data is implemented by another aspect of the disclosure as described in Section VIII.

A more detailed perspective of preferred privacy management portions 100 of the architecture of system 1000 is shown in FIG. 1A. This management system 100 employs an automated privacy protection (Privacy Agent) agent. The main interacting components preferably include a user's client device 110, a third party (DSP) site 180, and a PA support system 140. A client device 110 may comprise any computing platform and form factor usable directly or indirectly by a human and capable of exchanging data with online services, including but not limited to a desktop, laptop, tablet, wearable, IOT device, and/or smartphone. Device 110 typically includes a number of distinct hardware components (not shown) including customized CPU for executing applications, memory (which may take different forms, including volatile DRAM/SRAM and non-volatile EEPROM), different types of sensors (camera, microphone, touch, motion to name a few) for capturing different physical stimuli, communications cards for communicating over a cellular channel (such as a carrier network), Bluetooth/GPS and WiFi communication circuits or any other means of connectivity allowing the device to exchange information with another device or DSP, and various I/O circuits, including display, speakers, etc. Device 110 further typically includes a number of firmware and software components (again not show), including an Operating System (OS) (e.g., Android, IOS), a network software interface for establishing communication channels over an IP network (e.g. Internet) and one or more software applications executing on the device and enabling different functions I/O and computational functions such as web browsers or use-case specific applications.

Figure 2A:
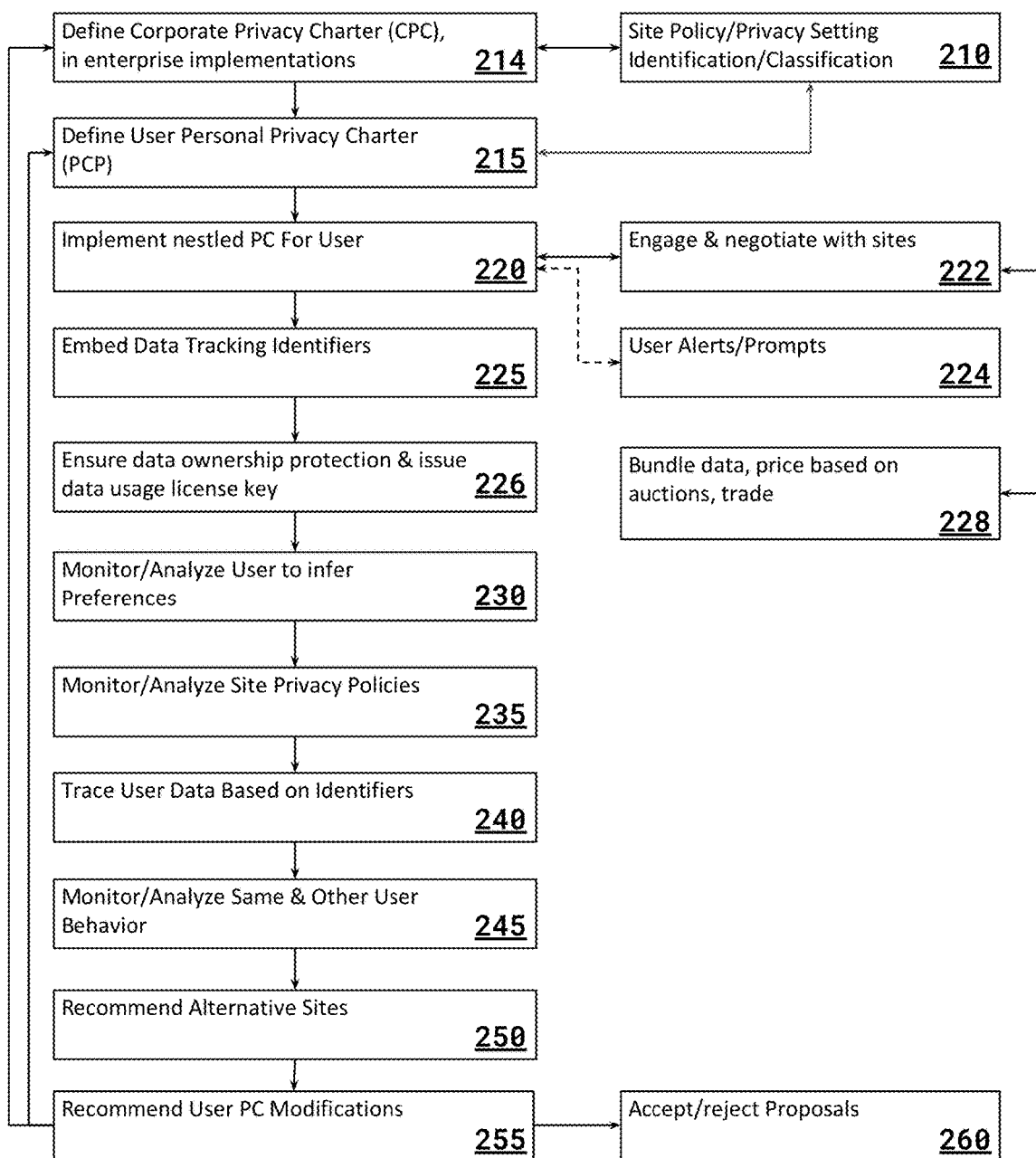
FIGS. 2A and 2B illustrate a preferred embodiment of an operation of privacy management system based on an automated software agent.
Figure 2B:
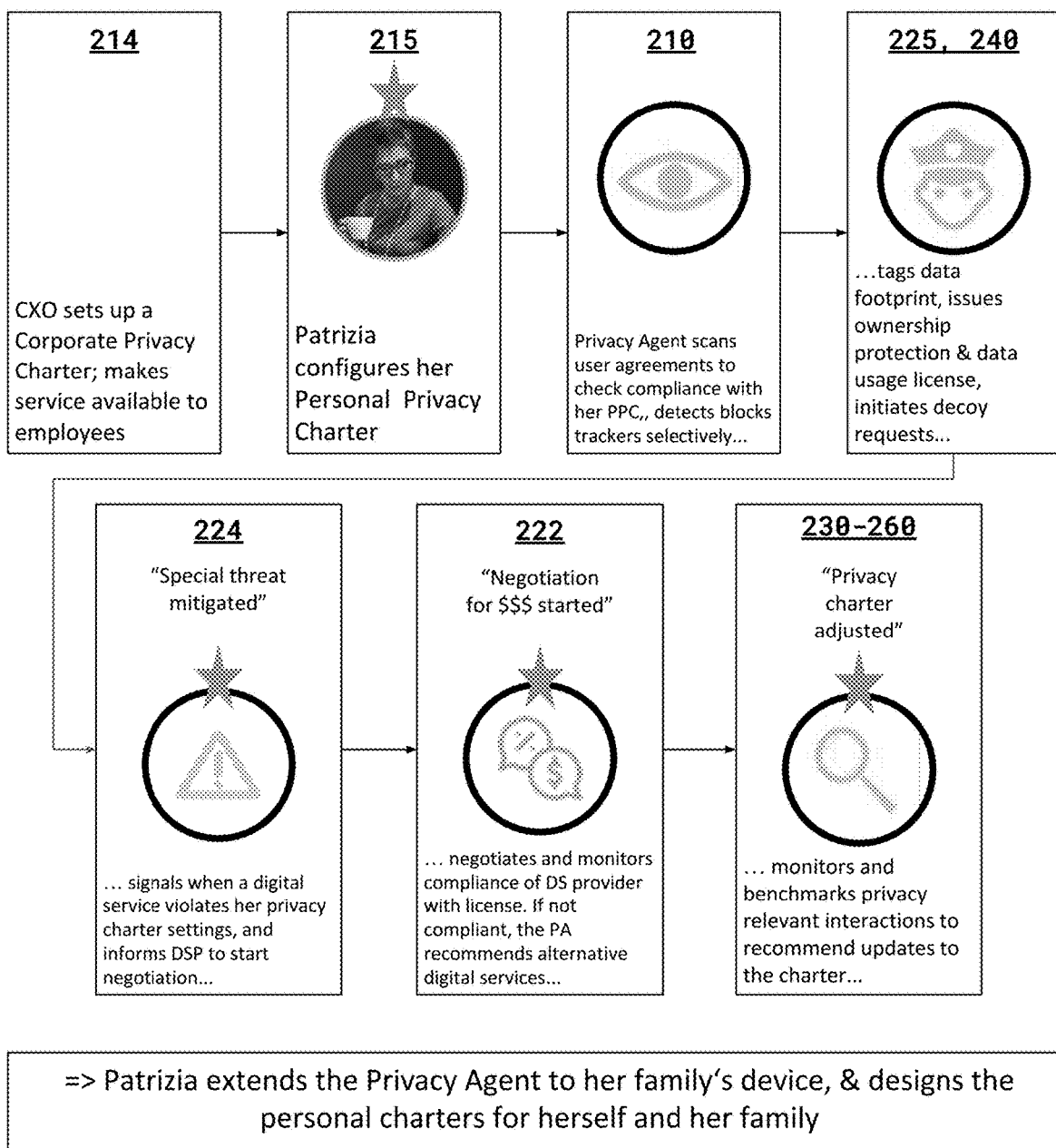

The preferred operations of PA agent 132C are depicted in FIGS. 2A-2B below. User Policy Admin Tool 114 presents a variety of preferred interfaces and configuration options perceivable on a client device 110 to permit an operator to specify his/her own privacy preferences as shown below in FIGS. 3B to 3F. This module may also employ various active countermeasures to obscure and mask a user's data footprint when dealing with DSPs 180. A PA data engagement engine 120 preferably provides instruction and control to the PA 132C, which may be implemented as a plug-in 132B to an application 130 generating or receiving data traffic 130, or in the form of an agent with or without a user interface component 132A and with access to data traffic generated and received of an end-user's platform. An additional routine 124 preferably monitors an engagement and behavior of the user, including compliance with or deviations from a specified PPC 300. Any or all of the routines operating on device 110 may be implemented as standalone applications, or incorporated as part of an operating system in some instances using programming techniques, code and structures known in the art but which are customized based on the present teachings.

A digital service provider site 180 interacts with a user's client device 110 preferably over a network through a data interface 182 used via a general purpose web browser or application-specific software, to permit engagement with any manner of devices. In some applications, the user device 110 accesses and engages site(s) 180 through PA support system 140. Again, most germane to the present disclosure are the DSP privacy data policies 184, which preferably specify the terms of engagement with users, including usage of the latter's data, third party use of user data, tracking of user behavior on/off site 180, etc. User site data, including with embedded tracking codes, is preferably stored in a data file 186. User cookies, including user identification data, third party data, etc. are preferably stored in data file 188. A user's client device may provide further means of storing data that is identifiable to the user in a protected storage specific to the device implementation.

A PA support system 140 comprises a number of software components executing preferably on a cloud-based computing system. The cloud computing function may be implemented using a service model such as software as a service (SaaS) and be hosted in co-located or distributed topologies. Some or all of the data may be accessed by authorized users, but is protected from access by unauthorized users. FIG. 1A depicts only those components of system 100 critical to understanding the present teachings. Moreover, other components and software modules may be employed in system 100 consistent with the present teachings.

A user-facing interface 141 preferably interacts with members and handles their requests, as well as management of the respective PAs 132C. In a preferred approach, PA 132C periodically checks in with system 140 to review data from a monitoring component 124, tracking codes from routine 118, and update aspects of the client device 110 configuration, including the user's PPC 300, and/or to alter/augment aspects of the client side modules. PA 132C may also provide an interface for system 140 to trigger such data review via a push notification.

A compliance reporter 144 preferably corresponds on behalf of PA users with a DSP site 180 to indicate privacy congruencies, inconsistencies or issues. By aggregating user demands the PA system 140 can better apply pressure and effectuate changes in DSP privacy policy behavior. A classifier 146 preferably uses natural language processing (see below FIG. 1B) to parse, analyze and classify relevant text snippets of a DSP privacy policy in accordance with a preferred schema. To understand and assist PA users, a user/site data exchange log 148 is preferably maintained to selectively record and store relevant data from user interactions with sites 180. For example, user acceptances, rejections of DSP site policies 184 are preferably maintained to derive a profile and rating for user behavior, site desirability, etc.

On the user support side of the system 140, a database of user personal privacy charters 152 (as defined in FIGS. 3B, 3D below) is preferably maintained for DSP site negotiations and user-user comparison operations. User privacy-related data, including with embedded codes, is also preferably maintained in a database 154 to assist in compliance operations as described below in connection with FIG. 7. The user privacy charters are preferably maintained in accordance with a privacy charter taxonomy, which is derived from synthesizing and harmonizing a combination of user goals in particular contexts with their privacy data against a set of data policies. For users operating out of or on behalf of an organization (e.g. their employer) the user's privacy charter may be merged with the organizations guidelines on privacy enforcement. A user's policy may be constrained for specific DPSs based on the organizations overarching policy guidelines, and additionally may contain user-defined policy rules for DSPs about which the organization is agnostic. In a preferred implementation of the policy setting user interface an organization may indicate the DSP-scope of its policy and the constraints per DSP to visualize the settings a user can choose from. The user data charters 112 are preferably used by machine learning engines 160 (see FIGS. 5 and 7 below) to provide suggestions on the privacy charter matrix 300, the basis for PPC 340 and CPC 341 modifications, alternative DSP sites, etc. by a recommender engine 164. In some embodiments a user data valuation engine 170 is preferably employed to determine the value and pricing of each item of user data, in accordance with a set of use parameters, such as type, purpose and duration. This information can be used by the PA data engagement engine 120, for example, for purposes of negotiating and permitting a DSP 180 to access and e.g. use a user's DSP access history for a limited purpose (i.e., notifying social media friends of your birthday) or more expansive purposes (i.e., allowing third party commercial providers to target the user for insurance policies based on age). Any or all of the routines operating on system 140 may be implemented as standalone routines or shared modules using programming techniques, code and structures known in the art but which are customized based on the present teachings. In addition, while components in system 100 are shown either as part of a PA cloud computing system 140, or incorporated within device 110, it will be appreciated by those skilled in the art that some or all portions of such modules, databases, interfaces, etc. can be relocated or distributed to achieve any desired system goals or functional requirements.

I. Tools and Methods of Analyzing DSP Privacy Policies/Agreements 1100

When seeking to protect the data privacy of an internet user, the natural place to begin is to parse, understand, and categorize the legal clauses of the online privacy policy agreements that confront them when they use a digital (online) service. Employing computers, software, and data science algorithms in this fashion is the preferred basis of the method described in this application for intellectual property protection.

The privacy policies and agreements (including data protection and privacy policies, terms of use, and cookie policies) established by nearly every digital service place an unavoidable demand to which users must acquiesce. These privacy policies, or Data Privacy Agreements (hereafter referred to as "DPAs"), are generally lengthy and regularly revised legal contracts that protect the interests of the Digital Service Provider (DSP), including its ability to make use of any information it is able to collect about the user. Signing and managing the DPAs across multiple digital services and devices, rather than on a central control panel, further increases the barrier for users to effectively manage their privacy. Users typically have no alternatives available (if they wish to utilize the DSPs service or application), nor do they have access to any mechanism by which they can selectively object to particular provisions or clauses in the DPA. Additionally, there are usually no mechanisms through which the user can negotiate exceptions or alterations to this lengthy contract. The result is an exercise of unequal market power on a massive scale that infringes on the privacy expectations and sensitivities of users. Hence, existing process and techniques are not only cumbersome and user-unfriendly, but in fact undignifying and untenable for users.

As alluded to above, because of the de facto practices employed by nearly every DSP, the vast majority of internet users have resigned themselves to acceptance of any proffered DPA without protest, and almost invariably without even reading its text. Because each DPA is slightly different and can employ a variety of organizational structures, the ability to parse and categorize the legal clauses of an online privacy policy agreement is critical to establish appropriate user privacy responses, which is the subject of embodiments of the present disclosure and the objective of the technology described herein.

The aim of analyzing privacy policies preferably is to identify privacy relevant features in the legal text and translate those policy features into logical statements. Analyzing privacy policies not only requires analyzing what features are reflected in a given policy but also which ones are not. Furthermore, as privacy policies change, the application needs to be able to automatically review and adjust the understanding of a given policy. In preferred embodiments of the disclosure, a dual process path is used to construct policy models, using a combination of human assisted natural language processing to derive a taxonomy of privacy policy elements, a separate machine learning based algorithm for classifying specific sentences of every analyzed policy as to their "benign" or "potentially harmful" nature as well as a crowdsourcing approach (e.g. like a Yelp of DSP user-friendliness).

Figure 1B:
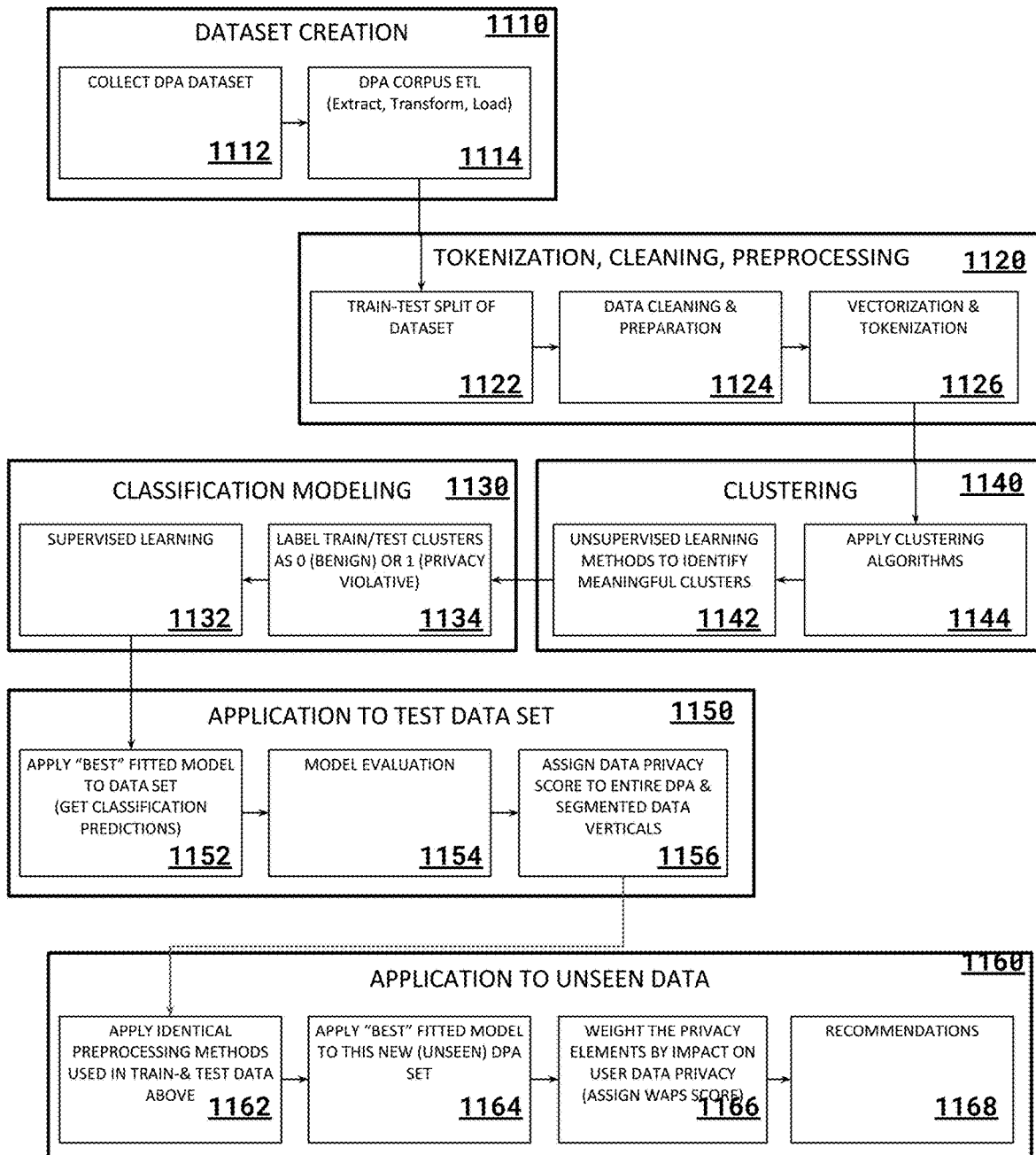
FIG. 1B shows a preferred embodiment of a process for identifying, analyzing and classifying privacy policies associated with digital services provider (DSP) sites and applications.

This aspect of the disclosure pertains to the strategy, design and preferred implementation of tools that allow for modeling and understanding privacy policies of digital service providers (i.e. data exchange interface owners and operators) in order to fine-grain assess their compliance/non-compliance with the user's (enterprise employee or customer) personal privacy charter. One of the main technical hurdles in this task is the determination and development of a taxonomy for the various components of privacy policies, and the logic of a natural language processing (NLP) technique that can effectively extract such policies from raw text. The overall preferred process 1100, including natural language analysis of DSP policy data, is shown in FIG. 1B.

The high-level sequence of steps in the preferred process is as follows:
1. Dataset creation (training set and test set) 1110
2. Tokenization, preprocessing, and vectorization 1120
3. Clustering 1140
4. Classification 1130
5. Applying "fitted" models to test data for algorithm evaluation 1150
6. Applying best fitted model to "unseen" (i.e. new) DPAs 1160

Each of these steps/operations is explained in further detail below. The operations are preferably performed by an automated data collection system using a computing system configured as seen in FIG. 1A.

1. Dataset Creation 1110

The preferred approach implemented in the present embodiments utilizing data science/NLP techniques to understand and process privacy policies (also known as DPAs, or "data processing agreements"), is to assemble a large and relevant collection of useful domain related words (called a "corpus" in NLP). From this corpus the system makes inferences, insights, groups blocks of text into topics, and/or classifies blocks of text according to criteria (for example, whether or not a clause is "privacy-violating"). While there might be an unmanageably large number of DSPs, each with their own Privacy Policy documents, assembling a corpus of privacy policies from a finite subset of the most-trafficked DSPs as well as the standard provisions proposed by privacy policy generators as termify.io, getterms.io or privacypolicies.com will encompass a substantial fraction of public networked-service usage. In a preferred approach, approximately 1,000 privacy policies are collected by an automated collection system 1000 (FIG. 10) from the most commonly-used online services as the corpus, upon which NLP techniques are applied. It will be understood that the minimum or optimal number of policies to be reviewed will be a function of a target coverage required or desired for any particular application.

The type of data preferably collected and/or shared by the DSP is also identified in order to preferably allow a more granular privacy management and to inform future functionalities of the BB autonomous agent (i.e. protecting data with GPL, tagging and tracing data in order to enforce the privacy charter).

Photo/Video/Sound/Text/GPS

Personal information (age, address, health, employment information, etc.)

Browsing data (e.g. from shopping, movie pages or cross-page surfing)

Sentiment data

Aggregation of said privacy policies is preferably performed at step 1112 by first identifying and collecting reasonable lists of the 1,000 "most commonly used" digital services (either from published automated statistics or manual selection), and then downloading .pdf (or other text extractable) files from each individual DSP site. The individual content from each of the corpus-related sites are then preferably extracted, transformed and loaded at step 1114 into an appropriately structured database 142 (FIG. 1A). Lists of such high-usage digital services are researched and published with some regularity, including from such publishers and content-providers as Forbes, ahrefs.com, alexa.com, Wikipedia, moz.com, statista.com, and many others.

2. Tokenization, Preprocessing & Vectorization 1120

Once a nominal corpus of DPAs has been collected, the data set preferably is split into two different components at step 1122, a training set and a test set, preferably with a 70/30 split or some other reasonable metric. At 1124 inspection, error-checking, cleaning, and preparation of the data for application of NLP algorithms and analysis is preferably performed by the automated collection system. At 1126 tokenization is normally the preferred starting point, followed by cleaning, preprocessing, and vectorization. Tokenization is the process of breaking up the corpus into its most useful, workable atomic constituent parts. In most NLP implementations, this means preferably separating a corpus preferably into its individual words, although variations are also attempted, such as sub-words and n-grams (strings of sequential words, as in bi-trams, tri-grams, etc.). Variations on the definition of a minimum "token" and "document" can also be employed when analyzing a corpus privacy policies. A sentence, paragraph, or consecutive set of N words can be selected as the base document to be examined and classified.

Preferred implementations of automated cleaning and preprocessing may include (among others): lower-casing, punctuation and numerical digits removal, stemming/lemmatization, applying stop word lists, etc. These cleaning and preprocessing steps are all aimed at preferably removing the elements of unstructured (natural) language text that introduce variations that are extraneous, or don't necessarily enhance the statistical analysis used in NLP. These text elements include capitalization (removed by lower-casing), plurals/tenses/conjugations (addressed by stemming/lemmatization), proper names, and common terms-of-art that don't enrich the correlations that algorithms seek out (addressed by "stop words" removal). Those skilled in the art will appreciate that this is not an exhaustive list of preprocessing techniques, but indicative of the types of tools that are (or can be) brought to bear on the corpus of DPAs.

Word-embeddings or word vectorization is a methodology in NLP to map words, tokens, and phrases from a text-based vocabulary to a corresponding vector of real numbers, which is used to find word predictions and word similarities/semantics. The process of converting words into numbers (usually into matrices in high-dimensional mathematical space) is called Vectorization.

Vectorization is preferably employed as part of the NLP workflow for a number of objectives:
Compute similar words/tokens
Text classifications
Document clustering/grouping
Feature extraction for text classifications The specific vectorizations and embedding techniques that can be employed include (but are not limited to): count vectorization, TF-iDF, Word2Vec, Doc2Vec, Fasttext, and Glove. To perform this task LexNLP, an open-source Python package of NLP and ML tools for legal and regulatory text is preferably employed. This tool can (a) segment documents, (b) identify titles, section headings and the like, (c) extract structured information such as distances and dates, (d) extract named entities such as companies and geopolitical entities, (e) transform text into features for model training, and, most importantly for the purposes of privacy-policy parsing, (f) build unsupervised and supervised models such as word embedding or tagging models.

Once tokenization, cleaning, pre-processing, and vectorization has been completed, statistical methodologies can be employed to the numerical (i.e. vectorized) version of the corpus. PCA can also be optionally employed for dimensionality reduction.

3. Clustering and Topic Modeling 1140

The first type of analysis performed on the tokenized/vectorized dataset of DPAs is preferably clustering and topic modeling at step 1144. If the dataset is not yet labeled, a type of unsupervised machine learning is preferably performed at step 1142. Clustering in data science refers generally to the use of a mathematical measure to aggregate, or cluster, elements together to form a meaningful group. In the case of DPA analysis, clustering is preferably employed to extract a useful and reasonable set of clauses or legal provisions that tend to be common across a set of DPAs. This process preferably results in a representative or target set of data privacy elements used to score all data privacy policies. While all clusters are considered for their utility, some clusters may not be meaningful for this purpose. For example, one of the more useful and valuable clusters that emerges from conventional DPAs is "sale or disclosure of user information to third parties" in sites that collect user personal data.

Matrix factorization, K-means and DBScan clustering, LDA, and Latent Semantic Indexing (LSI) are the preferred techniques employed during this step on the training data set. Each technique brings its own benefits, contributions and limitations, as well as its own evaluation metrics (e.g. "silhouette" scores). Human evaluation of the clusters or topics is preferably employed as be the determining element as to which methodology is ultimately adopted. The clusters created that are meaningful to a human interpretation constitute the "legal provisions" that form the constituent privacy elements assumed and assigned for all DPAs. The models may also consider segmentation based on data verticals associated with each DPA.

4. Classification Modeling 1130

After "standard" legal provisions are identified from the clustering/topic modeling exercise, every legal provision in the training corpus (or subset, depending on the size) is then preferably labeled as either privacy-benign (e.g. assigned or labeled as a "0" value) or privacy-violative (labeled as a "1" value) at step 1134. A human operator can preferably label each of the identified clauses with this binary classification or with some other useful nomenclature, to indicate a privacy impact. While some of this process can be automated with a predictive algorithm, the labeling process preferably incorporates human review, and therefore can be both time- and labor-intensive. Gamification and crowd-sourcing methods, as well as low-cost "gig" mechanisms can be employed to keep costs and time for data labeling to an acceptable level. Additionally, a subset of the train-test corpus that is smaller than 1,000 DPAs may need to be employed for this classification-modeling phase.

Once there is a benign-violative classification field used to identify and discriminate individual provisions, the classification modeling can proceed at step 1132. A variety of machine-learning based algorithms can preferably fit to the training dataset, including (but not limited to):
logistic regression, Naive-Bayes, decision trees
ensemble methods (random forest, extra trees, etc.)
bagging or bootstrapped aggregation methods (e.g. sampling with replacement)
boosted algorithms (ADAboost, LogitBoost, xgboost, etc.)
support vector machines
deep neural networks and Feed-forward neural networks
convolutional and recursive neural networks (CNN, RNN, bi-RNN)

As each algorithm or technique is "fitted" to the training data, it is evaluated for predictive performance and computational requirements. Predictive strength of a classification algorithm relies on metrics such as the F-statistic, "confusion matrix," and AUC/ROC curves. Each algorithm also has several performance outcomes based on input "hyperparameter" settings. A variety of hyperparameter variations for each modeling algorithm are evaluated. Ultimately a "best" ML algorithm (with attendant hyperparameters) is selected preferably based on the predicted performance and computational requirements of such model exceeding preselected target thresholds.

At this point, a trained/fitted model 1136 is preferably generated as an output that categorizes the clusters (legal provisions) of DPAs into privacy-benign or privacy-violative categories. A final preferred step is to calculate a weighted average privacy score (WAPS) for a complete DPA.

Because not all legal provisions are equally meaningful to users' concerns about data privacy, a mechanism to weight the importance of potential impact is preferable. In other words, the perceived privacy requirements are different for a teenager than for an adult with a child. As described below, a "Privacy Charter" (FIG. 3A) a preferred tool or method employed herein to map users' personal preferences into a weighting system for violative legal provisions. The mean of those weight-adjusted violation counts yields a weighted average privacy score (WAPS).

5. Apply Fitted Models to Test Set 1150

After a preferred machine learning algorithm has been selected (based on predictive performance/computation requirement) and "tuned" for an optimal set of hyperparameter values, the fitted model 1136 is then applied at step 1152 on the test data identified earlier (the roughly 30% of the DPA corpus that was cleaned, tokenized, vectorized, and preprocessed, but not previously exposed to the machine-learning algorithms). Fitting the trained model on test data is an important step to guard against "overfitting." Overfitting is the phenomenon, particularly occurring in classification models, whereby machine learning algorithms evolve overly-complex behaviors that work very well on the training data but do NOT extrapolate to or perform well on new data (i.e. the test data set). When this occurs the algorithm has "overfit" to the training data, and does not generalize well to new situations and is therefore not useful for those new cases. To evaluate the model, step 1154 preferably considers one or more tools, including a confusion matrix, sensitivity and specificity assessments, AUC/ROC and similar comparisons to identify how well the model performs against true/reference classifications in the training set.

If a selected model fit to the training dataset shows overfitting behavior, one of the other models previously evaluated may be adopted instead. Additionally, some hyperparameters might need to be adjusted, "regularizing" strategies might need to be adopted, neural network training units or epochs might need to be dropped (dropout), or the entire classification modeling might need to be reiterated (after eliminating features). Ultimately, the best predictive classification model that is also generalizable to unseen data is preferably selected.

Once a final model has been chosen, a WAPS (weighted average privacy score) is then preferably calculated at step 1156 for every DPA in the training and test data sets, and preferably segmented into different data verticals.

6. Apply Optimized Model to Unseen Data 1160

The selected optimized model 1158, or another DSP-specific model is then used on an on-going basis for all new (unseen) user DPAs that confront users when they sign in to use a digital service in a process 1160. Each new DPA is preferably cleaned and vectorized at step 1162 (as with step 1124/1126) and applied at step 1164, during which the model classifies all the legal provisions in the DPA as either "benign" (i.e. a "0") or violative (i.e. a "1"). The category value is then preferably multiplied at step 1166 by the user-defined weight (see discussion below relating to the— Privacy Charter), and summed to yield a WAPS (weighted average privacy score) for each DPA. Based on this WAPS score, recommendations can be provided preferably to the user at step 1168, along with indications of user-specific privacy violations, site alternatives, etc. a discussed below in the sections pertaining to the Privacy Enforcement Agent and Recommending Privacy-benign Alternatives.

In other embodiments, process 1100 preferably parses the user agreement presented by a loadable application on a mobile device, e.g., a social network app for personal pictures, images, posts, etc., including for key privacy policy elements. Preferably, this analysis is done ahead of time, so that apps are classified according to user privacy rating features before a user downloads the same to his/her device. In other words, an app store may contain not only reviews, ratings, etc., for substance, but also independent assessments and ratings for their privacy policies. An indicator may also be included preferably with each app, to identify it as corresponding to a particular category, and adhering to particular user rating (i.e., strict, moderate, lax). This allows for greater control of user engagement before they begin using an app, only to discover later on that it has already shared their information in ways they did not intend or desire. Such indicator may also be used to indicate the policy differences between a free and a premium version of an application to extend a freemium business model into privacy data. In embodiments in which the PA has underlying operating system control, it can moderate and curtail the behavior of loaded apps, or, at least, detect their presence, and alert the user that their data is potentially being compromised by a particular app in violation of their stated PPC.

II. Privacy Charter Tools/Methods 300

Figure 3A:
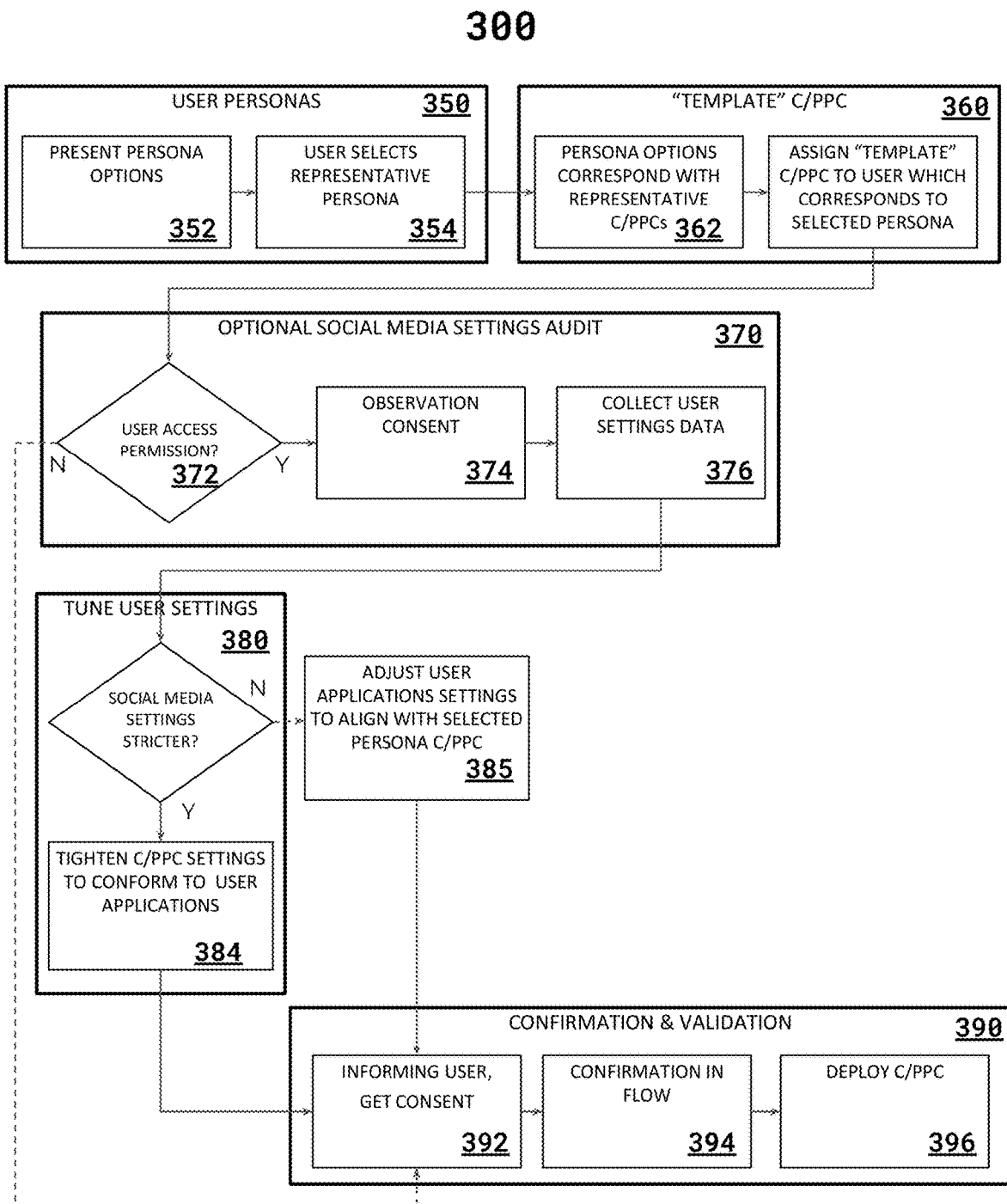
FIG. 3A illustrates a preferred embodiment of a privacy charter creation-management system.

FIG. 3A depicts the preferred sequence of steps employed by embodiments of the present disclosure to implement a PPC/CPC 310 (FIG. 36). The high-level sequence of steps is as follows:

1. Onboarding via user persona selection 350
2. Mapping to legal provisions 360
3. Social media privacy settings audit (optional) 370
4. C/PPC & social media settings fine-tuning (optional) 380
5. Confirmation, validation, & deployment of PPC/CPC 390

1. User Personas 350

In order to lower the "friction" of on-boarding, the user is asked for their personal preferences and attitudes on privacy during step 350 preferably by selecting a "user persona" from a set of preferably 3 (or more) representative options. Other variations are of course possible to accommodate different persona types. The user is asked to click on the persona that they believe is most similar to themselves in terms of approaches to privacy and security levels.

Three examples of user personas preferably presented at step 352:

"Jane" has multiple online devices, including a home computer, work computer, personal smartphone used for work, and home control using a 3rd party "hub" (Alexa, Nest, etc.). Jane uses some social networks like FaceBook, but restricts photos to her "friends" only. Jane uses navigation apps to get around town, find stores & restaurants, etc. She does banking and fills her prescriptions online. She gets most of her news online from specific sources (news publishers).

"Dave" has a personal laptop and smartphone. He is an active user of multiple social media platforms, and likes to publish photos, blogs, and tweets for anyone, including the public, to see. He moves fairly often, and conducts all transactions online. Dave also relies on navigation apps heavily. All news and entertainment consumption is done online.

"James" has many devices: multiple home and work computers, tablet, work and personal smartphones, and a fitness watch. He uses VPNs and private browsers. He does not accept any cookies on his devices, and the only social media platform he uses is LinkedIn, where he restricts all posts to his network only. He consumes media and entertainment on his Tor (anonymous) browser only. James also trades cryptocurrencies (using both "hot" and "cold" wallets), and conducts transactions online only in encrypted settings.

It will be understood that other personas could be presented, and that the users could be queried by a simple selection survey to inventory/determine their devices, usage behavior, online interests, etc. to provide them with suggested persona mappings. The hypothetical PPC/CPC that corresponds to each of these archetypal personas provides users a simple and quick way to select their initial PPC/CPC settings when they sign up for data privacy protection. At any time after selecting a persona at step 354, from the start of service onward, a transparent and easy-to-use settings page allows users to quickly adjust and refine their privacy settings and charter.

Figure 3C:
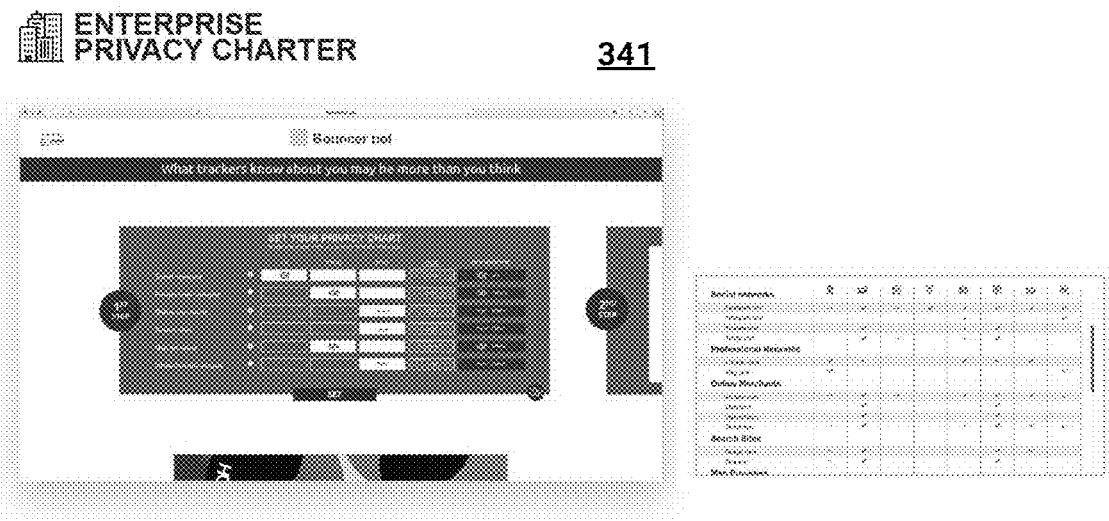
FIGS. 3B/3C show a preferred embodiment of a Corporate Privacy Charter (EPC)/Personal Privacy Charter (PPC)
FIG. 3D is a visual diagram illustrating a preferred method for mapping a user's PPC Social related preferences to specific privacy settings at a typical social network site.
FIG. 3E shows an example of auto-configuration applications of the PPC, illustrating the unifying principle of the disclosure across multiple disparate user platforms.
FIG. 3F shows an example of an initial mapping of a PPC, illustrating the unifying principle of the disclosure across multiple disparate user platforms.
FIG. 3G shows an example of an exemplary corporate firewall server configuration implemented in accordance with the present teachings.
Figure 3C:
Figure 3C:
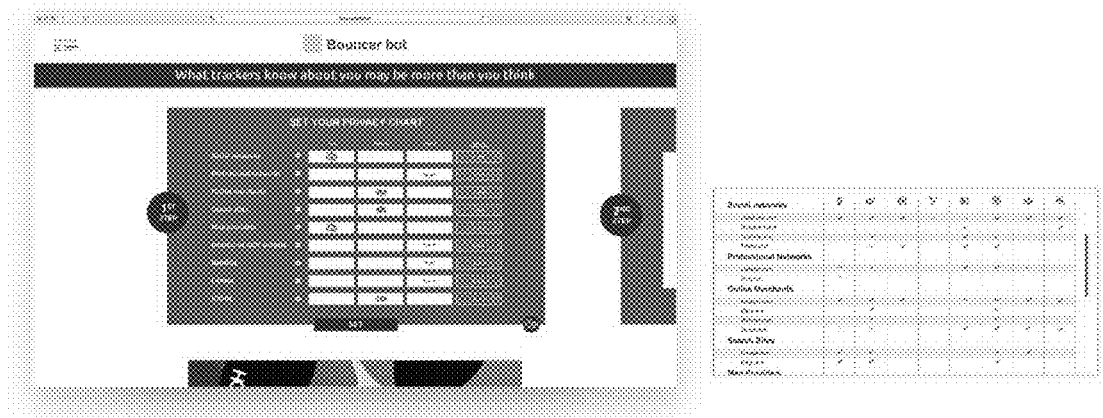

A preferred embodiment of Personal Privacy Charter (PPC) or Corporate Privacy Charter (CPC) 310 is shown in FIG. 3B. The charter, shown in the form of a table, preferably includes a series of rows 305 and columns 314, corresponding to user selectable settings 312 for a desired user control option (strict, typical, lax) for a particular type of data (personal, social, etc.). As seen in FIG. 3C, enterprises making use of the PA preferably have the chance to pre-configure a CPC at step 214 to enable and bind a PPC 300 for each of their employees to set minimum privacy requirements 340, thereby adding an additional layer to private PPC of enterprise customers 341. In preferred approaches the CPC/PPC 300 are each presented within a graphical interface to permit a CXO and end-users to quickly assign their preferences for privacy protection and control across all their device platforms. The PPC 300 is adapted to be intuitive to users, and easily mapped to conventional privacy-related settings of a cloud provider as seen in FIG. 3C.

Depending on the device and interface, the types of data under each category 314 may be preferably presented in a popup or mouseover 320, or any other convenient visual medium to make it easier for a user to understand. Further arenas of data privacy concerns are identified in separate columns and preferably include—with variances with regard to CPC/PPC set forth by enterprises for their employees and customers establishing the PPC themselves—it will be understood that other data types can be identified and presented to users based on system requirements, user interest, etc.

The set of configuration choices in a PPC/CPC preferably should also map to importance weightings for the legal provisions arrived at for the NLP privacy provisions determined herein. Said another way, the legal provisions arising from the unsupervised learning exercise are preferably categorized into one of the grid columns listed above, and the rows selected for the user in question determines the weight (i.e. importance) that is used to calculate the "WAPS" (Weighted Average Privacy Score) described herein as well.

As seen in FIG. 3B PPC 310 enables an enterprise, its employees and customers, to preferably specify a privacy level (strict, typical, lax) to each of a plurality of privacy data types (e.g., personal, social network, business network, consumer, health, finance, mobility, etc) in line with a taxonomy 156. The aim is to capture preferences about privacy related to interactions with digital systems in a simple, intuitive way that can then be translated into settings—or software-enforced preferences—on edge systems such as the operating system or applications in the connected devices, as well as cloud provider settings. This includes aggregating or proxy-performing edge entities such as—but not limited to—edge data caches, ad-hoc peer-to-peer network extensions, edge data replicators or CDN nodes, etc. The plurality of arenas in which privacy concerns are differentiated according to type, such that for example, a first column for "Personal" data may include personally identifiable information such as a person's name, address, birth date, birth place, social security number, fingerprint, DNA, physical appearance such as face and attributes such as eye color, gait, typing style, etc. as well as personal preferences such as foods (birthday party ice cream flavors, beer, etc.), but also—in the enterprise context—job title, function, group/team membership, reporting lines, information and data access privileges, office location and number, etc. As machines and personal digital devices such as wearables and smart phones increasingly capture finer-grained data via video, audio, and motion capture with very high time resolution, the unique rhythm of an arm-swing, heartbeat, walking and running gait, and so forth can become personally identifiable information unique to each person. Other types of personal data will be apparent to those skilled in the art.

2. Categorization/Mapping 360

The behavioral elements described in each user persona described above represent settings for an individual's PPC/CPC. This handful of behaviors, which imply human preferences and attitudes, should reasonably correspond with the different configurations possible for a PPC/CPC. The different segments of the user's privacy settings are segmented into the various categories 314 noted in FIG. 3B (personal, social, business, consumer, health, mobility) etc. at step 362 in FIG. 3A.

Expert input from specialists in the fields of behavioral economics, psychology and marketing are preferably used to translate and categorize the archetypal user persona characteristics to their corresponding PPC/CPCs. A number of advanced available techniques can be used to ascertain deep user attitudes toward privacy and how those attitudes manifest in a concise, descriptive persona. The techniques for gaining these insights include conjoint analysis, deep attitude questionnaires, and guided focus groups.

In step 360 in FIG. 3A, the new user's CPC/PPC is populated with initial values that correspond to the "representative" persona that the user selected as most like themselves. These CPC/PPC settings are those that the fictional, representative persona would have set, based on the type of individual and online service user they are.

3. Social Media Settings Audit 370 (Optional)

The user can also be prompted at step 372 to give permission to access user settings on their major social media sites, such as Facebook, LinkedIn, Instagram, TikTok, and Twitter. These services were chosen because they are currently the only major online services that offer user variations in privacy settings. Most other services only offer a binary choice: either agree to the offered Terms of Service (DPA) and enjoy the service, or decline the DPA and be denied the service.

In addition, or in the alternative, the user can also provide read/write access to their social media account at step 374 to determine their prior behavior, in terms of sharing/accessing content.

If the user chooses to decline access, then this social media settings audit is skipped at step 376, but the user is preferably able to visit the account settings page at a later time to tweak any and all settings in the PPC/CPC.

The social media privacy settings audit preferably shows whether the user's social media privacy settings are MORE or LESS strict than the settings indicated by the user's choice of representative persona, and, if so what the extent of any deviations is with concrete indicators.

Figure 3D:
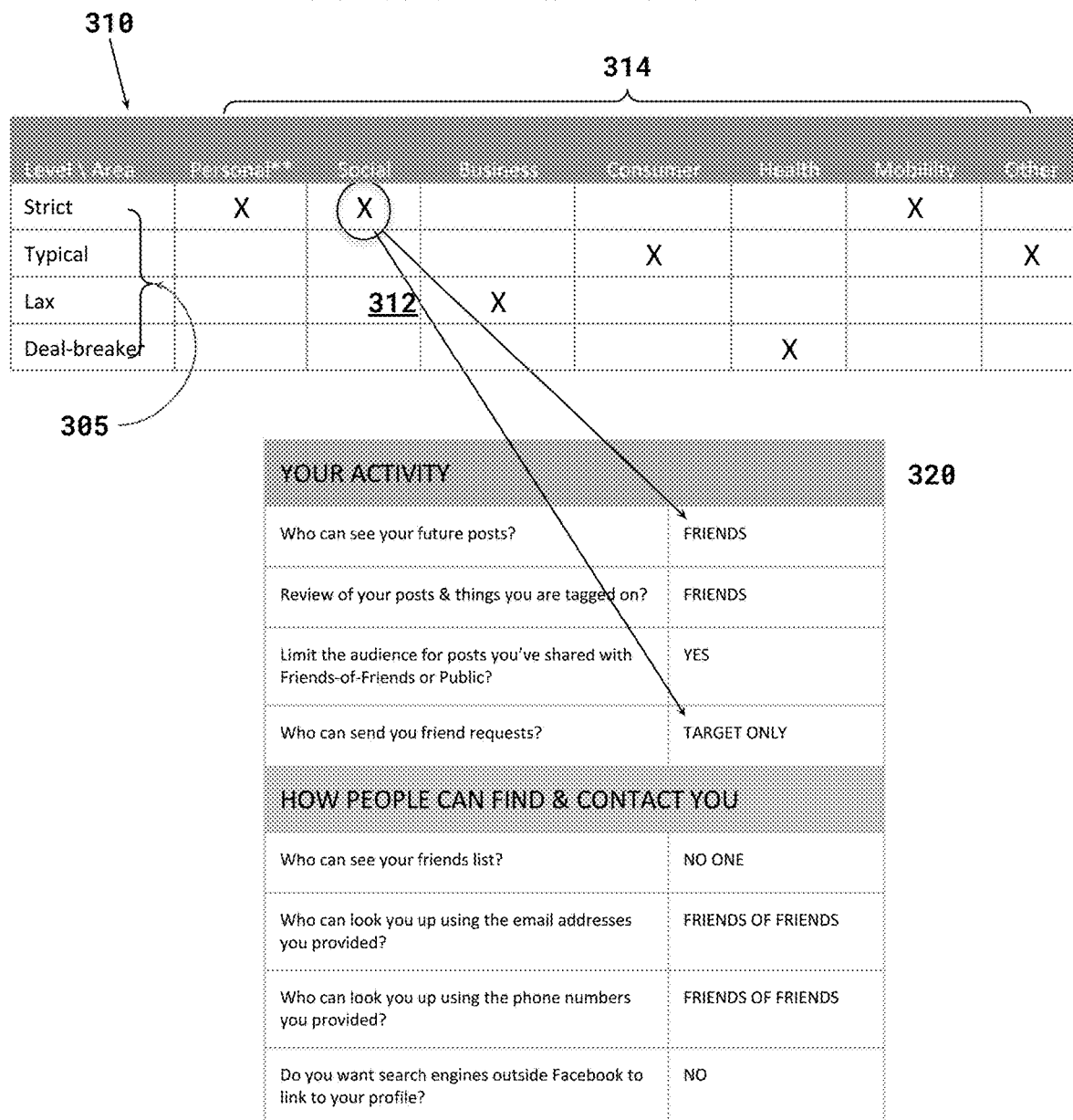

FIG. 3D is a visual diagram illustrating a preferred method for mapping a user's PPC social related preferences to specific privacy settings at a social network site such as offered, for example, by Facebook. As seen in FIG. 3D, the PA preferably auto-configures a user's social network site privacy options 320 with particular values or settings 322 in accordance with the schema provided by the user in their PPC. Thus, in the instance of a user selecting "Strict" policy for their "Social" data, the PA would preferably configure a Post Activity setting to only permit the narrowest segment of a social network site (in this case, friends of the user) to see the user's postings. Similarly, a user can lock down their colleagues and friends list to make it invisible to anyone who does not have permission. Comparable settings would be used preferably in the other target preferences for Typical, Lax and Deal Breaker. It will be understood that other settings might need to be configured depending on the site in question. In any event, a typical user does not have to bother with configuring the one of several dozen privacy settings by hand, or change default values, because the PA preferably performs this task for them in accordance with their PPC 300.

4. PPC/CPC & Social Media Settings Fine-Tuning 380 (Optional)

If as determined at step 382 the Terms of Service (DPA) offer a stricter set of social media privacy settings than the user indicated via the persona selection process, the agent preferably can recommend additional adjustments to the PPC/CPC at step 384 so that it confirms better to their existing status and behavior. Preferably the user is free to either accept the recommended adjustments, directly make changes to the PPC/CPC via the account settings, or allow the agent to automatically adjust settings on the user's behalf. For example, a user searching medical websites for advice on a personal condition might want to share their personal information with a research organization. If their settings on social media are such that third parties cannot receive that data, then the system preferably makes a recommendation to revisit and revise the permissions, relax the settings, or make a one-time exception for a particular DSP only. In the case of a less strict set of social media privacy settings, preferably the user is asked for permission to automatically adjust the settings on their respective various social media accounts at step 385.

5. Confirmation & Validation of PPC/CPC 390

Whether the social media settings audit was performed or not, and whether or not the audit resulted in any changes to the PPC/CPC, the next step 392 preferably confirms the settings with the user and implements the PPC/CPC on their behalf. As the user goes about their normal digital services activities on their electronic devices, they are preferably informed the FIRST time (step 394) that the PPC/CPC generates a recommendation about their privacy-related actions (such as accepting or declining a DSP DPA). Along with that notification, the user is also preferably given the option to adjust the settings of the PPC/CPC at step 396, in the event that the recommendation is not in accord with the user's attitudes and preferences around privacy.

6. Corporate Firewall/Corporate IT Server Deployment

Figure 3E:
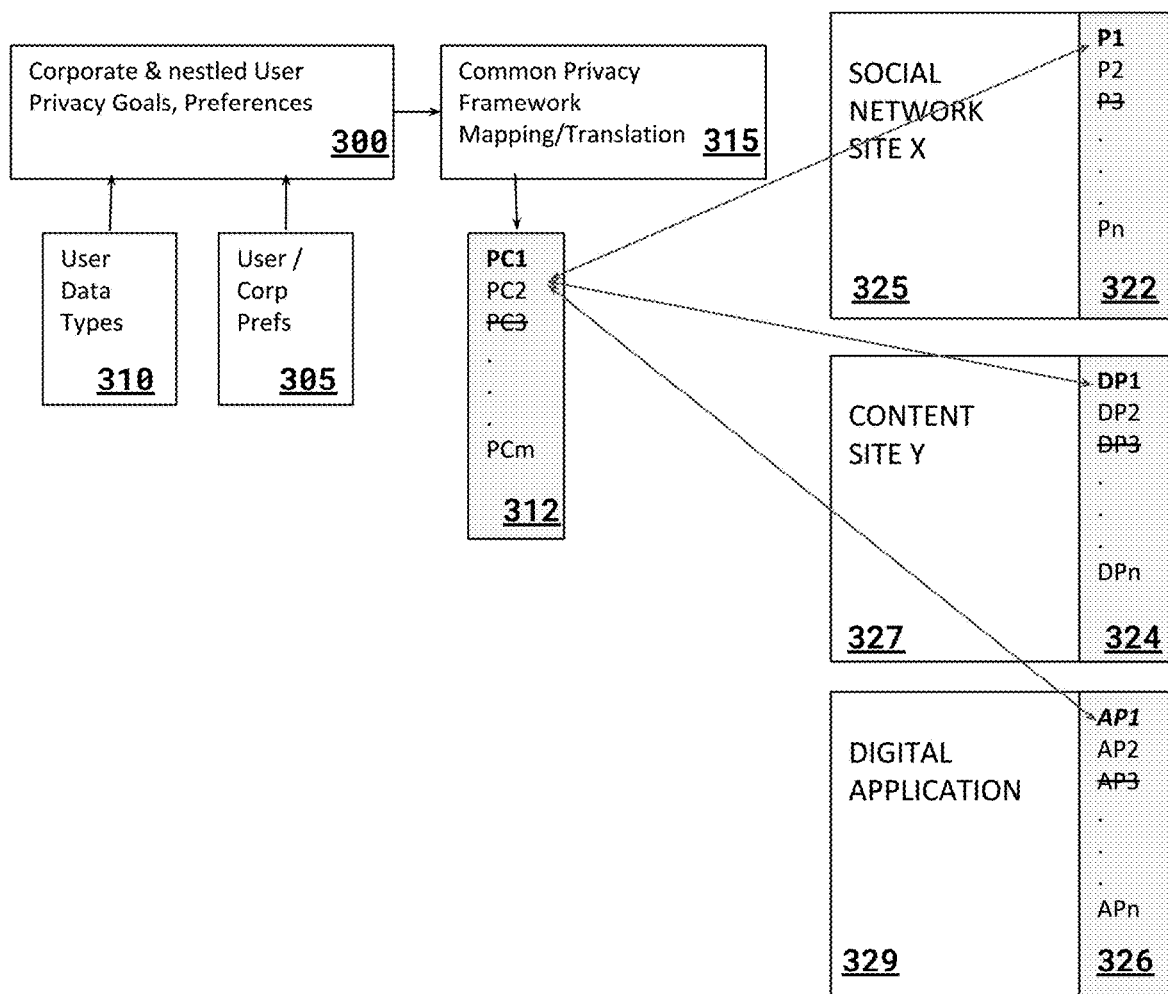
Figure 3F:
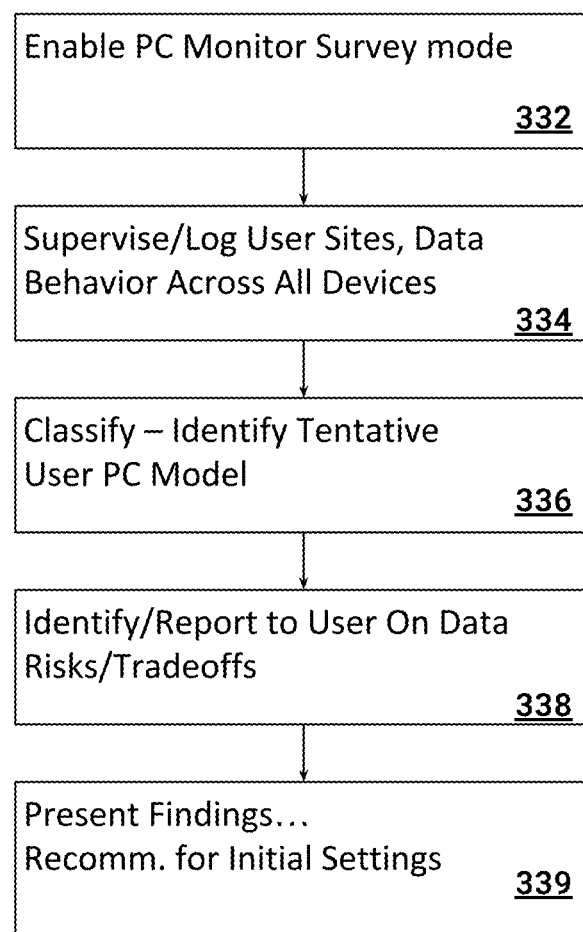
Figure 3G:
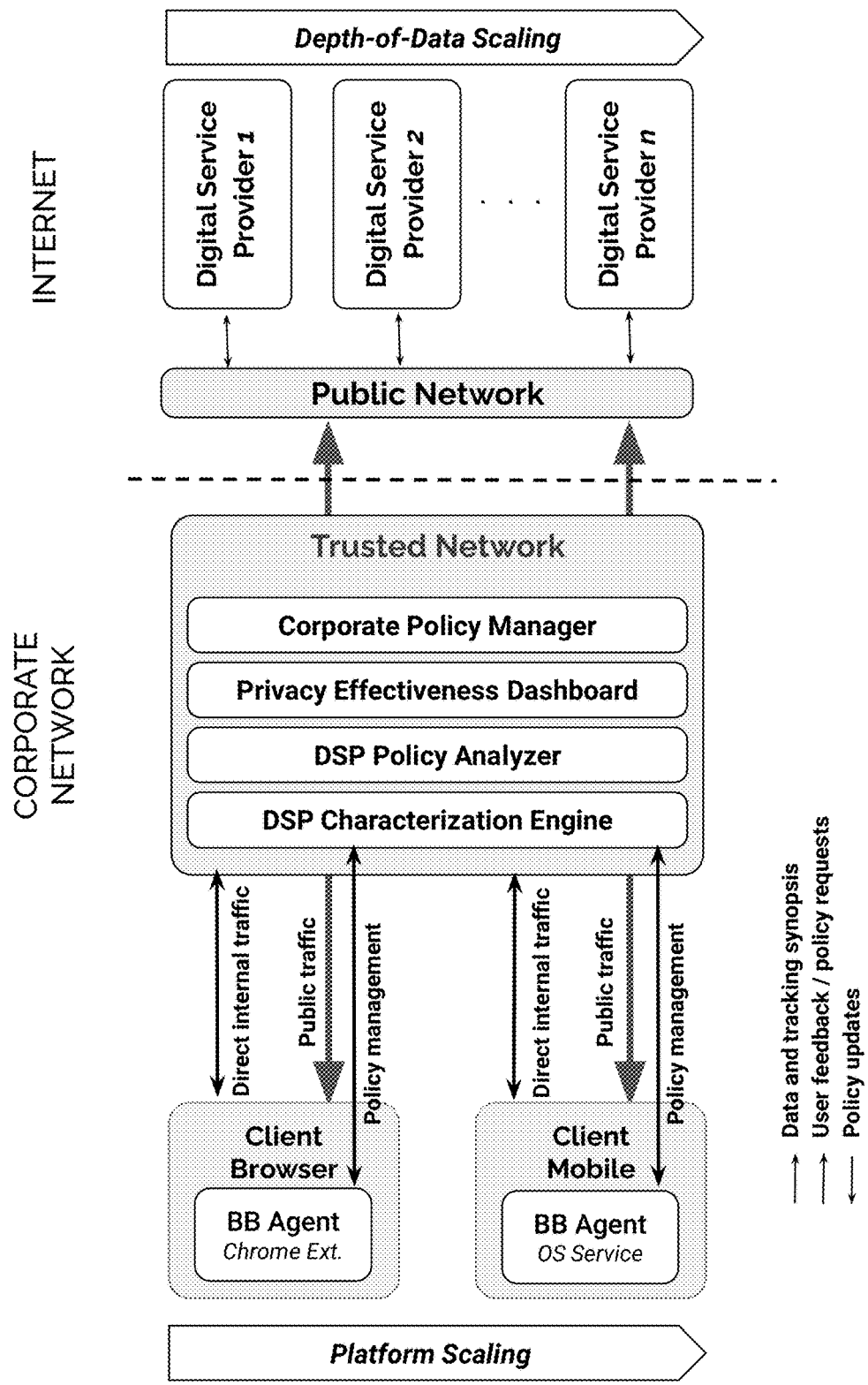

As seen in FIG. 3G, if there is a corporate deployment of the technology, then there will be an "umbrella" Corporate Privacy Policy created for all the employees of the corporation. The CPC settings are decided upon by a corporate officer, such as a Chief Information Officer, or Chief Privacy Officer. The charter settings, and interaction with DSPs happens at the point of interface between the corporation's IT network, and the outside, public Internet. Users still have Personal Privacy Charters (PPCs) that they configure as described here, but their settings must always be equal to, or more strict, than the Corporate Privacy Charter (CPC) settings.

7. Umbrella Coverage By PPC

Other auto-configuration applications of the PPC 300 are shown in FIG. 3E, which illustrates a unifying principle of the disclosure across multiple disparate platforms. The user's PPC 300, based on their preferences 305 expressed for data types 310, are preferably captured in settings 312, which are preferably mapped by a common Privacy Framework Mapping table 315 to corresponding privacy settings or values at various social networks 325, content sites 327, or applications 329 (including as may be installed on a smartphone for example). Each personalized privacy charter setting (PPC) 312 is thus preferably mapped to a privacy setting (PN) 322, compared to a digital privacy provision (DP) 324, application privacy provision or setting (AP) 326, and an application tracking capability which may vary based on the type of user device the application is executing on. During an engagement or transaction, a user's PC settings are preferably compared against privacy settings P1, P2, 322 of a social network site 325 to determine conformance or inconsistencies. The same technique is preferably used for a content site 327, so that, for example, a DP setting DP3 can be compared and detected to violate a Corporate or Personal Privacy code setting PC3. By automatically analyzing each privacy related value associated with the third party entity, the PA preferably can at least identify inconsistencies and alert users to potential conflicts, allowing the user to abort or continue a transaction as they deem appropriate. Preferably the PA is implemented both on a browser side of a user's computing device, as well as an app on any smartphone device, so that an integrated, uniform and unified privacy experience is effectuated across all digital transactions.

8. Private Mobility Data Use Case

One new area of privacy concerns arises when billions of individuals can be tracked by the devices on their wrists or in their pockets. This might be referred to as private mobility data. Consider a contemporary assessment of the criticality of such data from most- to least-sensitive.

1. Access codes for location service providers (e.g., a person's login to Google would potentially enable access to their current location, location history, travel habits, etc, and so all the below)
2. Knowledge of incidental or regular visits near controversial locations
3. Places of work, shopping, leisure—profiling the person via mobility data
4. Driving habits—e.g., speed and route preferences Other types of data which can be captured from sensors on a mobile device will be apparent from these examples. At the moment, so-called "differential privacy" mechanisms are evolving to enable digital service providers (DSP) to give real-time route information while preserving personal privacy. For example, location data from an individual user may be combined with nearby user data in groups, and the individual account information deleted at the provider so that at any given time, only aggregate user locations are known (number of users, location, speed). In other instances a user can designate particular sites or locations as "off-limits" to particular apps, on a case-by-case basis. For example, a user may not want tracking to be active while they are visiting a doctor's office, or some other sensitive area through the means of geofencing their device's tracking capabilities. The PA configuration options preferably can allow users (through the mobility category 314) to identify particular addresses, buildings or localized geographical areas for which tracking is preferably shut off so that they can be free of tracking. This control, too, can be specified either on a global basis, or an app-by-app basis, so that a navigation app may be allowed to use the user's location, but a social networking app (e.g. Facebook) cannot.

9. Private Health Data

Another well-established arena of privacy concern is health data. Consider the levels of criticality from high to low in this arena.

1. Access codes to systems storing personal health data. Such codes enable access to systems containing all the information below, and so are highest criticality.

2. A person's DNA markers and resulting predispositions.
3. Legally-protected or questionable health issues about a patient. Treatment for ethically controversial health activity such as addiction, AIDS, abortion, underage pregnancy.
4. Mobility information that imply above information—e.g., proximity to certain clinics on a regular basis
5. General health records regarding a person's general condition, or the fact of suffering from diseases or conditions
6. Having searched online for information regarding a disease or condition All of these subcategories could be separately selected within the "Health" field of privacy charter 300 (FIG. 3B field 314).

10. Private Financial Data

Another well-established arena of privacy concerns financial data. Consider the levels of criticality from high to low in this arena.
1. Access codes (PINs) to financial accounts that allow a holder of such codes to initiate transfers of currency, stocks, bonds or ownership interests.
2. Access codes to systems storing personal financial data. Such codes enable access to systems containing all the information below, and so are superior in criticality.
3. Financial activity information that reveals controversial personal behaviors
4. Financial activity information that could reveal personal habits and preferences
5. Credit ratings
6. Single event information about buying, selling, or borrowing
7. Browsing or using a merchant app to find reviews of or purchase goods and services that allow for inferences on discretionary income or net worth All of these subcategories could be separately selected within the "Business" field of privacy charter 300 (FIG. 3B field 314).

In embodiments of the present disclosure, these data types/levels preferably can be individually configured, or enabled and disabled on a mobile device to ensure compliance with a PPC 300. For instance, setting the "mobile" field to "typical" could enable access for a service provider to data types 2) through 4) above on a mobile device. In other embodiments these individual data choices can be set out separately for the user so that they can identify data treatment on a type basis (financial, mobile, health, etc.), on a service provider (in this case merchant) level, and on a level-by-level basis.

III. Privacy Agent

As noted above an aspect of the present disclosure focuses on monitoring data flows to and from the user, and protecting the user's data privacy as she or he navigates the Internet and uses a variety of digital services. As seen in FIG. 10 a data Protection Agent 1020 analyzes Privacy Policies (see section I) from a set of DSPs 1015 that participate in a Digital Marketplace (see section VIII). The agent 1020 engages with the DSPs on behalf of the user based on the latter's Personal Privacy Charter (see section II) to ensure compliance with a user's privacy goals. The user's PPC can be automatically adjusted on his/her behalf (see section IV). The user's data can be protected using various forms of watermarking (see section V) as well to enhance compliance. To further assist the user, a recommendation engine can provide specific suggestions on alternative sites (see section VI) that have more congruent privacy policies.

Additional countermeasures can be implemented (see section VII) to discourage, disincentivize DSP misuse of user data.

The high-level elements/processes discussed herein for a Data Privacy System 1000 as implemented can also go be grouped or conceptualized as follows:
1. new user onboarding/initiating data privacy protection service (Sections I, II)
2. Ongoing monitoring—reevaluation of all user settings, incorporating service or preference changes (Sections III, IV, V)
3. Watermarking identification and protection of the data footprint of the user (Section V)
4. Active countermeasures to mask user's online footprint (Section VII)
5. Participation in a data marketplace (see Section VIII)

These processes and functions are discussed below with reference to FIG. 10, and then more specifically with reference to FIGS. 2A, 2B and 4A—4C. Additional details on each of the various interactions and functions is provided herein with reference to Sections I, II and IV-VIII.

1. New User Onboarding 1030, 1040

Again with reference to FIG. 10 the data protection service preferably begins with the agent's onboarding process of every new user to set initial settings and preferences. The onboarding process preferably relies upon the system and method described herein (Sections I, II) which analyzes privacy policies using Natural Language Processing to parse DSP privacy and data use contracts (DPAs), and to categorize their legal provisions as "privacy risks" or "privacy benign." All of the digital services used by the user, as well as their DPAs, are subject to the privacy policies NLP workflow, preferably resulting in an unweighted privacy score for each service. The score preferably is initially unweighted, since the weights assigned to each legal provision can be tailored specifically based on corporate and individual preferences and attitudes, which are incorporated below, via the auto adjustment features of C/PPC (section IV).

In order to obtain a personalized Weighted Average Privacy Score (WAPS), the system and method described in section II is preferably used. The system preferably offers a set of representative personas from which a corporate IT administrator selects in order to initialize a Corporate Privacy Charter (CPC). Similarly, an individual user can select from a short list of predefined personas to initialize a Personal Privacy Charter (PPC). Taken together, these settings comprise a C/PPC, and this in turn preferably produces the settings used to calculate a WAPS for all the online services to which the user subscribes.

Whether and how the CPC and PPC overlap or restrict each other (in instances where the PPC owner is an employee of the corporation) can be configured through a constellation of options at hand in any given case, including with consideration to the user's and corporation's privacy and security policies. In these cases, the goal of the agent preferably is to identify and maximize benign collaboration spaces for employees outside corporate firewalls.

With the user's permission, the system can also collect social media and other relevant service configuration settings that relate to data privacy and which can inform the fine-tuning of the C/PPC settings. Recommendations for adjustments to the C/PPC (if any) are preferably presented to the user, which can be enabled or declined at their discretion to complete initializing the C/PPC.

Preferably the user is also able, at all times (through settings accessible to the user in a settings page) to review any alternative service recommendations (see section VI below) for known service categories that are superior to each subscribed service, with regard to WAPS score. Another aspect of the system and method described herein is that the agent preferably sends each subscribed DSP a boilerplate legal letter (in electronic and/or physical form), informing the DSP that the user does not relinquish any and all rights to private browsing, personal, and behavioral data, regardless of any user selected agreement. The user is thus preferably given an opportunity to preserve and assert claims to all usage data ownership through an electronic paper trail. To further this claim of ownership and to establish a discoverable ownership trail, the system also preferably prepares and embeds watermarks, wherever possible, in user data files obtained by a DSP.

The user proceeds with online usage and normal service interactions, with all taggable data going to DSPs with watermarks embedded as discussed in Section V. In instances for which watermarking is not feasible, countermeasures such as decoys may be deployed (see Section VII).

2. Periodic Reevaluation and Service Changes 1050

At intervals set by an operator of data privacy protection system 1000, all user settings and service alternatives are preferably reevaluated, as described below. Service offerings might change over time, user behaviors in aggregate might change relative to one another, and/or the individual user's life circumstances might change. Any or all of these changes could result in data privacy attitude shifts that call for adjustment(s) to a C/PPC, as discussed in more detail in Section IV.

Reevaluation intervals preferably are initially set to a nominal period by the data privacy protection provider, but may be modified by corporate IT administrators or end users. Intervals are measured, for each user, from the time of the last reevaluation cycle. As explained herein, reevaluation of individual user settings (relative to its same-cluster neighbors) can be set to occur more frequently than the reevaluation of all users globally.

New additions or deletions to the set of services employed by the user preferably trigger a reevaluation similar to the above discussion, as does any change to the privacy-related settings for the user's social media services. Both of these types of service configuration changes can signal a change in the user's life circumstances and attitudes toward data privacy, so it is natural to revisit the data privacy agent settings at these moments of change. This aspect of the disclosure is discussed in Sections IV and VI herein in more detail.

3. Data Protection Countermeasures 1080

If/when available from the data privacy protection provider and selected by the user, some or all of user services behaviors preferably may be "masked" from the DSP, per the techniques described in Section VII. The system described herein preferably first establishes that, either: 1) the user has elected to mask his or her digital footprint (the user may choose to mask ALL services or only specific ones); or 2) the DSP has fulfilled all the conditions required to obtain the requested user data (including payments made in any "data marketplace" transaction as described below). The system may employ automated, dummy requests embedded in real requests (to search or recommendation systems) to mask user interests and activities with third party sites. Any webpages, information, images, video, or sound delivered to the user in response to such "dummy" requests from the system are preferably ignored/discarded, and only the "true" information is presented to the user. For example, if multiple false search requests are transmitted to a search engine to obfuscate a user's search, then the results of the false requests are ignored/discarded, and only the true search results are presented to the user. No system resources are wasted in capturing or processing the results of misdirection requests from the system. This aspect of the disclosure is discussed in Section VII herein in more detail.

4. Data Marketplace 1090

As acceptance among DSPs and users reaches a critical mass, users creating online data may enter into transactions with the DSPs who would like to use that data for commercial purposes. The user preferably creates a profile of the desired transactions that she or he is willing to enter with regard to private data. The user controls which categories of data information they are willing to "license," the price they will accept, and whether third party dissemination is allowed. This data preferably is then either "sold" as raw data, as information (aggregated data batches of multiple data creators) or as insights (analyzed data).

If a transaction is entered into that meets all the sale criteria and payment is properly verified, then the system described herein preferably signals that the Digital Privacy Agent enables or re-enables data transmission to the DSP in question (or stop employing countermeasures to mask the user's online footprint for this DSP). This aspect of the disclosure is discussed in Section VIII herein in more detail.

5. Operation of DPA 1020

A more detailed explanation of a preferred embodiment of an operation of privacy management system 100 based on an automated software agent (the Privacy Agent, PA) is depicted in FIGS. 2A and 2B. The agent preferably runs as a set of background processes on an end-user device, a corporate web server plug-in which scrapes and keeps an eye on web content (especially content typed by a user such as an email client), etc. The agent offers a novel balance between convenience and automation on one hand and increased agency and leverage for the user on the other. The agent features an easy-to-understand interface at each junction of interaction with the user by automating the analysis of privacy-relevant sections of user agreements, which—as research has shown—users do not tend to read or understand.

Websites are analyzed at step 210 preferably using NLP techniques to identify and classify privacy related provisions and values. The process for performing such analysis is described further below with reference to Section I.

An enterprise Chief Information, Privacy, Digital Transformation or Data Officer preferably sets an enterprise or enterprise Corporate Privacy Charter (CPC), which defines the generally permissible minimum privacy safeguards for the organizations, as determined by the organization's needs to protect its overall privacy and security, or harness engagement opportunities with the context or the customer through the employees.

Nestled in the CPC 214, a user can then define his/her own personal privacy charter (PPC) at step 215, based on explicit and implicit characteristics, the latter which can include observations made of the user in his/her own interactions on the web, with apps, etc. The user's personal privacy charter may also extend the scope to DSPs the organization deems non-relevant, allowing the user to have a single holistic definition of privacy rules for work and personal life. Examples of embodiments of privacy charters are described in FIGS. 3B-3E.

With reference again to FIG. 2A, after defining the PPC based on the CPC (in the case of employees as users), the Privacy Agent is preferably enabled or activated at step 220 to assist and manage the user's engagements at step 222 with sites in accordance with their privacy preferences. When such interactions result in incompatibilities with the PPC in place, at step 224 the user preferably can be notified or alerted to abort, continue or modify their interaction with a particular site. An activatable overlay preferably allows a user to hover over the offending/highlighted portion and see an explanation by the PA on the reasons why the language is problematic. Additional statistics can be displayed as well, such as "this language is found in X % of sites and is accepted/rejected by Y % of users" and so on.

Figure 4A:
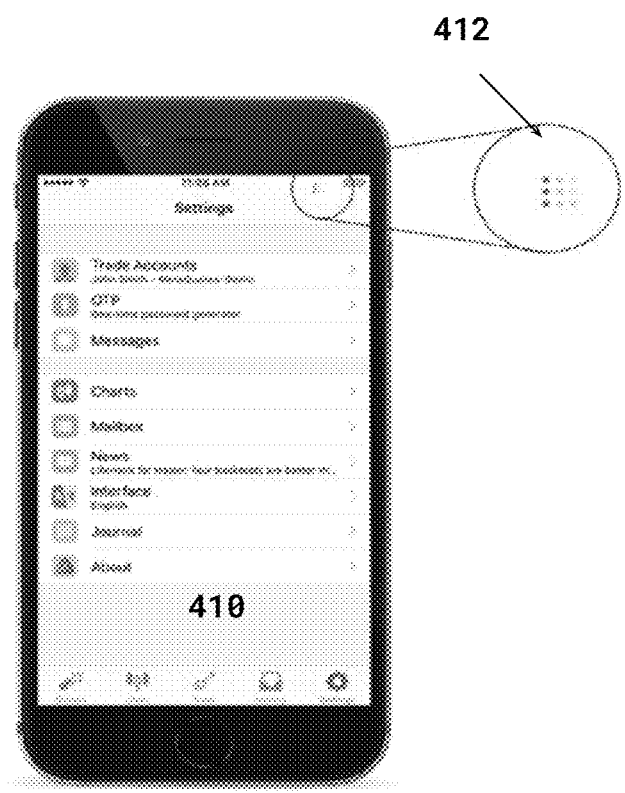
FIGS. 4A, 4B and 4C depict a typical user experience, as presented on a mobile device, or a conventional browser, when implementing a privacy oriented automated software agent.
Figure 4B:
Figure 4C:
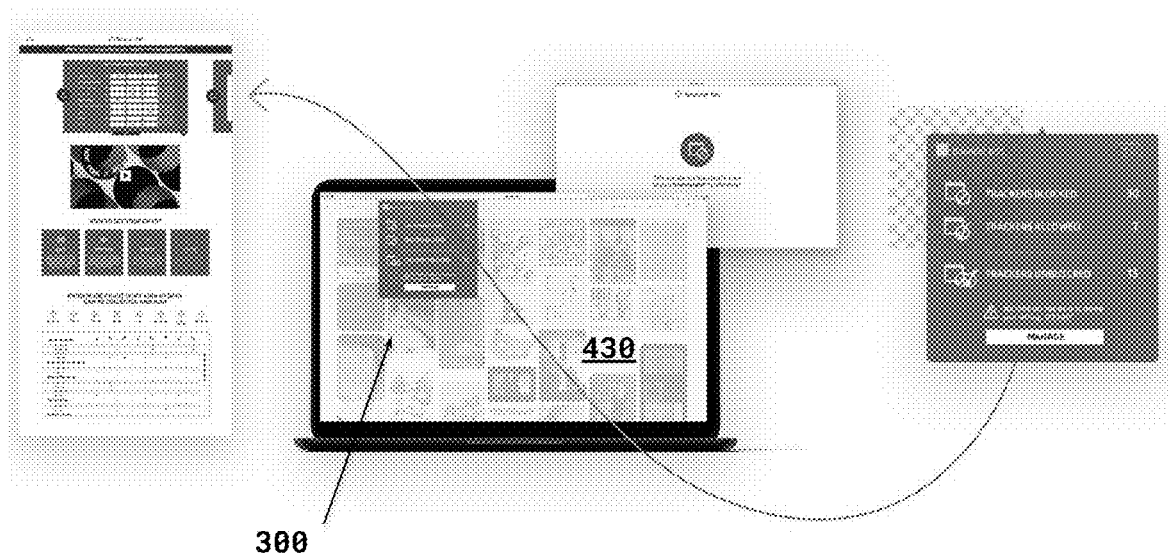

In other embodiments the agent also preferably generates a notification to a site operator to inform them of an undesirable privacy provision that is restricting or curtailing user engagement with a site's content. Through coordinated, crowd-sourced cooperation, a community of PA users can effectively act as virtual neighborhood watches of bad DSP behavior. The PA preferably logs inconsistencies between the PPC and the user agreements, in order to block unwanted trackers on a given website that are allowed by the website's user agreement but not the CPC or PPC. The enterprise CXO and/or end-user can opt to view and audit the agent's decisions at any given point in time, but does not have to manually intervene, unless he/she wishes to tweak the agent's decision patterns. As such, this both creates transparency in a manner that has immediate relevance to the user's privacy sensitivities, as well as timesavings and convenience amidst an otherwise overloaded day of digital transactions. Examples of a preferred notification mechanism are depicted in FIGS. 4A—4C.

Returning to FIG. 2A, as part of step 222 the agent preferably can send messages to website owners as well indicating either the intent, to block trackers or to negotiate better commercial terms in exchange for unblocking the trackers in question. The agent may group multiple users at step 228 with materially similar interests together into a group representation for the purpose of negotiating such commercial terms, either under the control of a representative of the relevant users, or by an automated policy requirement matching algorithm. The agent can then preferably collect offers and store them in a digital wallet or a digital deal-vault to be flagged to and/or viewed by the user. The transactions are preferably stored in a blockchain like ledger by the agent. In some embodiments, while a user may insist/condition through the agent at step 222 that as part of an engagement with a DSP site, the latter preferably should accept certain embedded user codes (or other conditions) to permit tracking and discovery of unauthorized leakage of the user's data.

As the user creates data in engagements, it preferably can be tagged with personalized tracking codes, identifiers, watermarks, etc. at step 225. Once a company's or user's data tagged, the PA secures the protection of ownership of data, information, or derived insights based on Copyright, database law (Europe) or case law (U.S.) and issues data usage license 226, which is the foundation for later enforcement. This creates leverage for users to negotiate the terms and conditions 222 under which their data is shared. The preferred system and processes for generating these user data fingerprints are provided below with reference to Section V and FIG. 6A. Returning to FIG. 2A, during step 230, the PA preferably monitors the user's behavior and identifies/processes their actions to see if it conforms or deviates to their respective privacy charter. In some embodiments, a user's actions are preferably journaled, so that they can be played back later, if desired, to understand how/why a particular behavior was flagged. This can make it easier for enterprise CXOs and end-users to understand how/why their actions are potentially leading to compromised uses of their selected privacy data. Such journal entries may record actual data exchanged, meta-data, or hashed information that collects representative classifications without revealing the user's identity or exact transactions. Changes in individual website policies, provisions, etc. are also preferably monitored at step 235 through programmed and predetermined data scraping to ensure the PA is up to date. The preferred tools and processes for performing this analysis are provided below with reference to Section IV and FIG. 5.

As seen in FIG. 2A, the user's data can also be preferably traced as desired at step 240 to identify unauthorized uses, leaks, etc. by third parties. To give the user the benefit of insights gleaned by other members in the privacy community, the behavior of other PA users is also preferably collectively analyzed and aggregated at step 245. From these observations the system 100 preferably can provide recommendations at step 250 to the user for alternative DSPs who are more privacy-friendly or compatible with their CPC/PPC, as well as suggestions for changes to their charter at step 255 based on observing and comparing the user's actions to their charter, to charters of other members, etc. Preferred systems and methods for performing this recommendation analysis are provided below with reference to FIG. 7.

Returning to FIG. 2A preferably the user can than accept or reject any proposed changes at step 260, so that modifications can be implemented in their charter. In some instances the user can delegate responsibility to the agent to automatically make suitable changes to site selections, charter settings, etc. As an example, when the user searches for "news about international policy" the PA preferably may flag some of the query result sites as more or less compatible with a CPC/PPC.

Corresponding aspects of the PA operation 200 are shown in pictorial, descriptive form in FIG. 2B to better illustrate a typical use case for the enforcement agent (based on a user story of an enterprise employee). It will be understood that like reference numbers in FIG. 2B are intended to correspond to counterparts in FIG. 2A. Patricia (a typical user) installs the PA and configures her privacy charter 215 based on minimum requirements 214 set forth by her employer. The PA system preferably scans privacy agreements at 210 to check compliance with her charter when she browses, detects and custom blocks trackers selectively. Along the way, the PA preferably tags her data footprint at 225, and optionally issues a copyright and data usage license. In other instances, as noted below, the PA can also preferably initiate decoy requests at 240 or utilize randomized meta-data to mask her activities from third party trackers. The PA also preferably signals/alerts her at 224 when a digital service provider (DSP) does not respect her privacy charter and informs them that she would like to negotiate access rights to her data. At this point 222 the PA preferably negotiates and monitors compliance of the DSP provider with the license proffered and agreed to. If this is not feasible, the PA preferably recommends other services according to her wishes. As note earlier, the PA preferably monitors and benchmarks privacy relevant interactions and recommends updates to the charter, the user's preferred content/social network sites, etc. pursuant to steps 230-260. As seen in FIG. 2B, Patricia, and/or her corporate CXO (depending on deployment), preferably can extend the PA capability and configurations across a family of devices to ensure uniform treatment of their privacy related data.

As seen in process 200, the agent minimizes tedious analysis and repetitive choices for the user, and provides increased engagement on points of negotiation with a given website that matter much more to the user, or the corporate CXO, such as increased spikes in activity by certain types of trackers in the user's daily roaming of the internet by the user him/herself or the user's trusted circle of friends or other users that are similar to the user. In so doing, the agent not only flags potential need for heightened attention by and protection of the user, but also flags opportunities for increased leverage, as the user has become an attractive target for trackers, or as the user has come across a website that is particularly interested in him/her. In brief, by employing the PA the user receives benefits on multiple fronts:

(a) Transparency about tracking and sometimes the inferred intent behind trackers
(b) Agency for switching off or keeping active certain trackers
(c) Protection from unwanted tracking and triangulation
(d) Leverage toward future revenue, i.e. monetization of user's own data footprint.
(e) Creation of safe collaboration spaces for interaction or even new service design with and for other employees and customers.

6. Privacy Agent Components/Operation—FIGS. 4A-4C

A preferred end-user experience, as presented on a mobile device, or a conventional browser, is depicted in FIGS. 4A, 4B and 4C. To navigate the right balance between automation of tedious or cognitively challenging tasks on one hand and satisfying engagement of users on the other, the agent preferably employs an experience strategy that communicates either threat or opportunity in clear and easy to understand ways for a layman user. The exact mode of interaction is also subject to settings defined by the CXO in alignment with enterprise culture and visual display conventions, but could be set differently for the end-user's companion instantiation on their home device. To that end, in a preferred embodiment, the technical and emotional benefits of the PA are identified in visually adequate and impactful ways through the use of the appropriate color schemes, icons and typography. As noted earlier, the agent communicates via various levels of detail with the user, e.g. during most data interactions an icon in an application title bar or in the OS system tray may be used to indicate status of allowed and blocked operations. Hovering over such icon may show a pop-up with summary statistics, which clicking or tapping on the icon may reveal a dialog with detailed information.

As seen in FIGS. 4A and 4B, preferably once the agent has identified a new critical threat or opportunity information to communicate, its corresponding user interface 410 element changes color. Once the user clicks on the colored symbol 412 (or 422 FIG. 4B), a small pop-up window preferably appears, communicating the information in 3-6 words for user cognition in less than three (3) seconds. The user can see that the Agent categorized trackers into three buckets that correspond with same labels used in the PPC 300:

Lax (green): Trackers which the agent accepts based on personalized privacy charter and ongoing user behavior pattern analysis.
Typical (yellow): Trackers which the presence of which the agent can detect, based on script found, but cannot identify in terms of ownership or intent.
Strict (red): Trackers which the agent identified as non-compliant with the user's privacy charter and blocked as a result.
"Red flags": Trackers which the agent identified as non-compliant with the user's privacy charter and was unable to block, based on website settings and user agreements.

The symbols are preferably allocated for rapid cognition as seen in FIG. 4C in the example of conventional browser 430 and a tracker alert 432. For example tracker names are preferably visually depicted with a symbol relaying a negative implication, such as a circle containing a single yellow question mark, an orange exclamation mark or a red double or triple exclamation mark. For trackers that can be identified as an opportunity the agent preferably depicts a monetary symbol.

The messaging to user and the website provided in FIG. 2A (steps 222, 224) can be based on a variety of preferred classifications; for example:

(1) For data sharing or tracking which the agent has identified to be in line with category "strict", it preferably automatically blocks and logs them in the tracker log window without notifying the user, unless the user has specified preferences in favor of periodic messaging.
(2) For data sharing or tracking which the agent has identified with "red flags", the agent preferably provides an automatic pop up message to the user stating non-compliance that cannot be readily mitigated, requiring negotiation with the website owner. Concurrently, the agent sends a message to this effect to the website owner, requesting that such trackers be blocked for the user.
(3) For data sharing and tracking the agent has identified to be in line with category "typical", it preferably informs the user that unidentified trackers are present and that a message has concurrently been sent to the website owner to identify tracker identity and intent. If a response is received from the website owners within 72 hours, the tracker preferably re-classifies the trackers as either category "lax" or "strict". For newly classified "strict" trackers which the website owner does not intend to block for the user, the user is preferably informed by the agent that a negotiation about "typical" trackers for compensation by the website has been initiated with the website owner. The agent preferably does so only once for a given kind of tracker, so as to minimize interaction with the user for the sake of convenience. Once user preferences have been established, for each subsequent decision point, the agent starts negotiations autonomously.

If no response is received from the website owner within 72 hours, the trackers in line with classification "typical" in question are preferably automatically deemed by the agent as non-compliant (see category "strict") with the user privacy charter. In this case, the user is preferably informed by the agent about the non-communication by the website owner and a suggestion of an alternative website that might be a better fit for the user's privacy preferences. The agent preferably includes a recommendation of alternative websites. Concurrently, the agent preferably sends a message to the website owner that a recommendation for use of alternative websites has been made to the user and that user may leave or discontinue use of the original website based on non-responsiveness to user privacy preferences.

IV. Self Adapting Privacy Charter Tool

Another aspect of the disclosure focuses on the system and method to adapt the user's C/PPC by applying data science methodologies to check for changes in a user's behavior, which in turn implies adjustments to the C/PPC.

Figure 5:
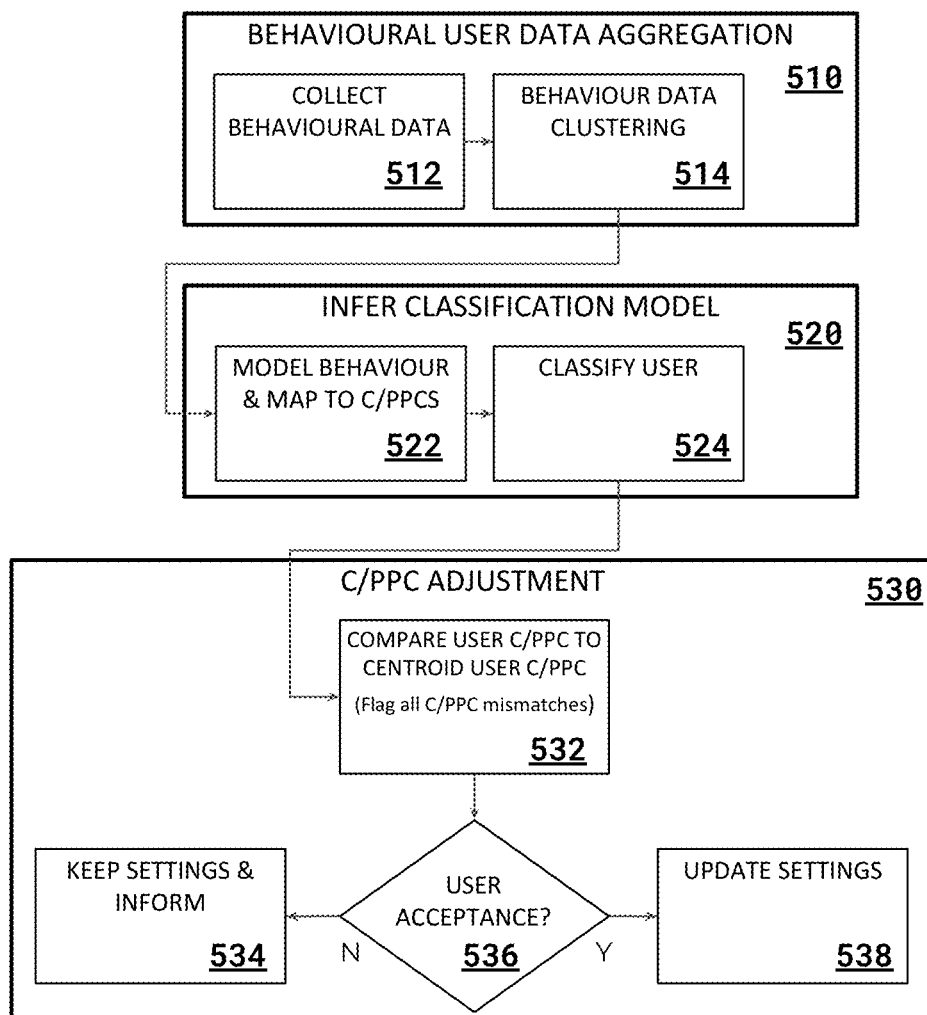
FIG. 5 illustrates the preferred components, relationships and operations of a self-adaptive privacy charter tool of the present disclosure.

FIG. 5 illustrates the preferred components, relationships and operations of a self-adaptive privacy charter tool 500 of the present disclosure, which is employed to ensure that the users' PPC 300 is kept up to date with preferences and settings adjusted to their behavior, interests, and changes in site privacy terms. As alluded to above, a major impediment to the utility and efficacy of privacy protection applications is the onerousness of establishing and maintaining the fine-grained settings that "tune" the application to be appropriate for each individual user. As seen in FIGS. 3B, 3C, based on a machine-learning-mediated topic modeling, a Corporate Privacy Charter (CPC) 341 and/or Personal Privacy Charter (PPC) 340, modeled after a matrix like structure 310 is preferably established for the user based on a simple matrix of choices, and depending on the context of their engagement (i.e., in their employee or personal capacity). It will be understood that other tools, such as intuitive sliders can be incorporated as well to adjust for different weightings of the different categories to improve ease of use. As noted above, 310 is the personalized set of user preferences—captured as part of the CPC 341 and refined as part of PPC 340—that determine the actions that the Privacy Agent takes on behalf of the user in the fashion of a personal agent.

To improve the utility of the PA, it is preferable to keep the CPC 341/PPC 340 current and "tuned" for the user's evolving and changing privacy preferences, based on observation of the user's online behavior and personal software/application settings viewed in the context of the broader online population's evolving behaviors and preferences. Moreover, it is understandably typical of most individuals to not care to spend a great deal of time and attention on so thankless and boring a task as setting one's privacy settings. It is completely unreasonable to expect that even dedicated individuals who set their privacy policy settings one time would ever revisit their policies again. Thus, the matrix 310—basis of CPC 341 and PPC 340—preferably should be self-adaptive to remove the onus and burden on users.

The sequence of steps 500 employed to achieve the desired results of the automated C/PPC adjustments are shown in FIG. 5 as follows:

1. User's behavioral data acquisition & clustering; identify centroid-users' C/PPCs at 510 (512, 514)
2. Train classification models of behavioral data to clusters of C/PPCs 520, 522
3. Classify user (using "best" model) and user's behavioral data 524
4. Compare current C/PPC to "representative" C/PPC (cluster centroid) 530, 532
5. If there is a mismatch, seek user approval to update C/PPC, else leave unchanged 534 536 538

1. User Behavioral Data Acquisition/Clustering 510

As noted above, over time, a corporate or personal privacy charter (C/PPC) is preferably checked to see if an adjustment is warranted. The recommended change could result from a life event (e.g. birth of a child, marriage or divorce, etc.), a gradual change of preferences, user behavior, or a user's reaction when notified by the application that a digital service provider's policies don't adhere with the settings of the privacy master panel (until its enforcement is effective, see discussion herein concerning the "Privacy Enforcement Agent" (DPA)). Changes might also result from exogenous forces, such as new regulatory frameworks and their requirement for privacy safeguards, new digital services that encourage consumers to behave differently and change attitudes towards privacy and marketing.

No matter the cause, a periodic check of the C/PPC settings is preferably implemented, and the first step 512 is assembling user behavioral data—provided the user has given consent to this function through the C/PPC. This feature data (with permission from the user) is preferably pulled from the user's interactions with various digital services, responses to cookie-placement requests, and social media privacy settings. User product and service reviews, posts, demographics, search, and ecommerce transaction patterns also are used as part of the User Behavioral Dataset.

Some data of this sort are publicly available, others can be licensed, and still others can be shared by strategic partners. All of these mechanisms may be employed to gather this data, which preferably include (but not be limited to):

Online privacy and data survey results
Twitter hashtag and tweet text data
Public Facebook profiles
Demographics
Psychographics
Academic datasets available to the public Other examples of sources of data will be apparent to those skilled in the art.

Once collected, users are preferably clustered at step 514 according to a selected set of features using the full array of unsupervised machine learning, clustering, and topic modeling techniques, including (but not limited to) K-means, DBScan, LDA, LSA, and the like. (See Section II for similar discussion of machine-learning-based clustering techniques.) This clustering is preferably performed on a regular basis (every 6-12 months), and clusters are used as a method for scrutinizing each individual's similarity of C/PPC settings to those of other users in the same cluster.

The C/PPCs of the "centroid-users" are also preferably flagged in the process as representative of users in each cluster. These settings are preferably used in 532 to check for settings that might need updating for all users.

2. Classification Model Fitting/Training 520

The next step of this process 522 is to preferably train and optimize a classification model so it can correctly categorize any user through their measured features into one of the clusters defined above. Stated another way, ML algorithms are preferably employed to infer the relationships among the variables in the dataset and the cluster to which they belong.

As the full set of users are already clustered, 70% of the users for the "training" set are then preferably used, with the remaining 30% to be held aside as a "test" set to verify that the fitted models are generalizable to unseen data. A variety of machine-learning based algorithms can be fit to the training dataset at 522, including (but not limited to):

logistic regression, Naive-Bayes, decision trees
ensemble methods (random forest, extra trees, etc.)
bagging or bootstrapped aggregation methods (e.g. sampling with replacement)
boosted algorithms (ADAboost, LogitBoost, xgboost, etc.)
support vector machines
deep neural networks and Feed-forward neural networks
convolutional and recursive neural networks (CNN, RNN, bi-RNN)

As each algorithm or technique is "fitted" to the training data, it is preferably evaluated for predictive performance and computational requirement. Predictive strength of a classification algorithm relies on metrics such as the F-statistic, "confusion matrix," and AUC/ROC curves. Each algorithm also has several performance outcomes based on input "hyperparameter" settings. A variety of hyperparameter variations for each modeling algorithm can also be evaluated. Ultimately a "best" ML algorithm (with attendant hyperparameters) is preferably selected.

The result of step 522 is a "fitted" model that is capable of classifying any user into one or more preexisting/predefined cluster(s) of similar users at 524. Other examples of sources of algorithms suitable for this classification will be apparent to those skilled in the art. To ensure continuous adaptation, the process of gathering data and running machine learning algorithms is preferably performed regularly and consistently, since technologies and services are always changing, as do the large body of user behaviors. People's attitudes are constantly changing and evolving based on the whims of fashion, news cycles, scandals, and changing legal landscape. Therefore, the machine learning based inferential models are preferably constantly refreshed to keep current and adapt to new information, behaviors, relationships, etc.

3. User Classification to Current Clusters 524

The benefit of having the capability of categorizing a user into one or more clusters (based on behavioral data features) at 524, is that is possible to see how closely that user's C/PPC matches a target "ideal" or "representative" member of the same cluster(s) (as given by the C/PPC of the centroid user) in step 532. It is possible therefore to see which settings of the C/PPC are candidates for reevaluation. Perhaps something has changed in the user's life circumstances, or perhaps the nature of digital services has drifted over time.

Periodically (e.g. every 30-90 days) the best-fitted model is preferably applied to classify every user into one or more cluster(s). It is likely that a change of attitudes about privacy, or a change in life circumstance (e.g. parenthood or change of marital status) will result in behavioral changes that are reflected in the behavioral dataset for that user. For example, a user's photo sharing permissions might be changed by him/her to "friends only" on Facebook. Re-applying the trained classification model on the user's behavioral dataset, in this example, would move the user to a different cluster. Comparing the user's C/PPC to the new centroid's PPC can also suggest some changes to the user's C/PPC settings.

This classification is also preferably performed on each new user at sign-up as noted above in Section II. Once this classification is performed the examination of each user's C/PPC settings is preferably performed to check for any that need updating. In addition the system can also track and identify major changes in the existing centroid-user C/PPC values (i.e., an aggregate behavior of a community) at 530 and based on some threshold change determine that some or all of an existing user class is preferably re-assessed.

4. Comparison of Current C/PPC to Assigned-Cluster Centroid 532

As mentioned in the example above, the individual settings of the user's C/PPC are preferably compared at 532 to each setting of the centroid-user's C/PPC, flagging all those that are different. A message is then preferably generated to the user that informs them about each setting that needs review, along with the change(s) that would bring the user into alignment with the centroid user of the same cluster. If many possible changes are identified (more than 3), then the user is also preferably given a nudge to start a chat with a customer service representative, to be certain that major changes to the C/PPC are truly called for. This is only likely to happen if there is a major change of circumstances in the user's life.

The important element of this step lies in the messaging to the user about why the recommendation arose (i.e. a divergence from settings of other similar users), and what the implications of accepting or rejecting the change would be. For instance, making the setting in question stricter might have the effect of blocking some services for the user, while keeping the setting unchanged might expose some aspect of the user's data to data brokers or others who seek to monetize such private data. The user is preferably armed with the information needed to make a good decision.

5. Update C/PPC or Leave Unchanged 536

The user is preferably asked at 536 to either accept each individual setting change, or to leave them as-is. Based on the user's response, the C/PPC is adjusted at 538 or left unchanged at 534. The user is marked with the date of review, and is preferably scheduled for the next periodic review according to the frequency set in the system (30 days, to begin with, but subject to change based on user feedback, and learnings about how often settings typically change in a live deployment).

Accordingly, as seen herein an adapted configuration of 310 as basis of CPC 341/PPC 340 could arise because of changes in the user's own behavior, or it could be the result of changes in broad-based population changes in attitudes, technologies and perceptions. Or it could be a combination thereof. Other motivations and rationale can be employed as well depending on system requirements. Knowing the drivers of the recommendation provides context to the user that allows for an informed decision as to whether the change is really in line with the user's current attitudes and circumstance. Whether the user wishes to see and approve every recommendation depends on the user preferences which he/she can set once initially, as some might appreciate the level of control while others regard it as unnecessary noise in their digital lives. Additionally, the corporation and end-user always has visibility into their own history of past 300 configurations as basis of CPC 341/PPC 340, with the option of going back to any previous configuration. To increase ease of use, all the 300 are preferably stored for users, and they can readily avail themselves of an "undo" option, to return their settings to any desired prior state.

V. Watermarking User Data

A supporting aspect of the present disclosure concerns preferably embedding tracking codes into user data to enhance protection of their privacy. This allows a user to monitor and grade a service provider's adherence to a target privacy model or behavior.

Steganography is a known technique for tracking the sharing of digital content. It generally entails modifying aspects of the digital content itself rather than depending on added metadata associated with a piece of information. Changing the data itself is usually harder for an unauthorized user to detect and remove, and it allows for, among other things, embedding a unique code to make it traceable. In the case of photos for example, metadata might include the photographic equipment and settings used to take the photo, as well as the time and geographic location. But metadata can be readily recognized and stripped and does not follow a photo through additional downstream operations, such as printing and rescanning. Traceable changes, such as watermarking a photo, are more desirable because they can survive such processes and are harder to detect and remove.

Figure 6A:
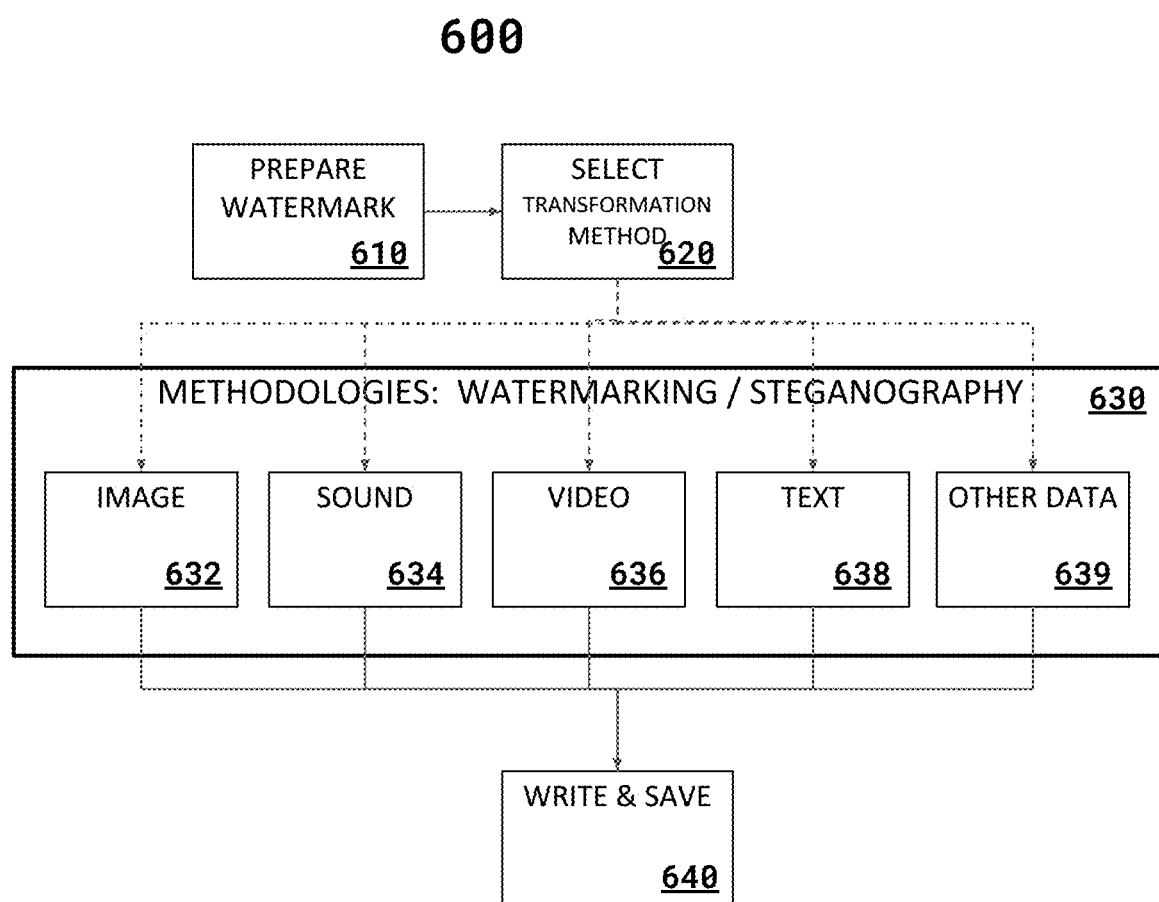
FIG. 6A depicts a preferred embodiment of a system and process for embedding tracking codes in user privacy data.
Figure 6B:
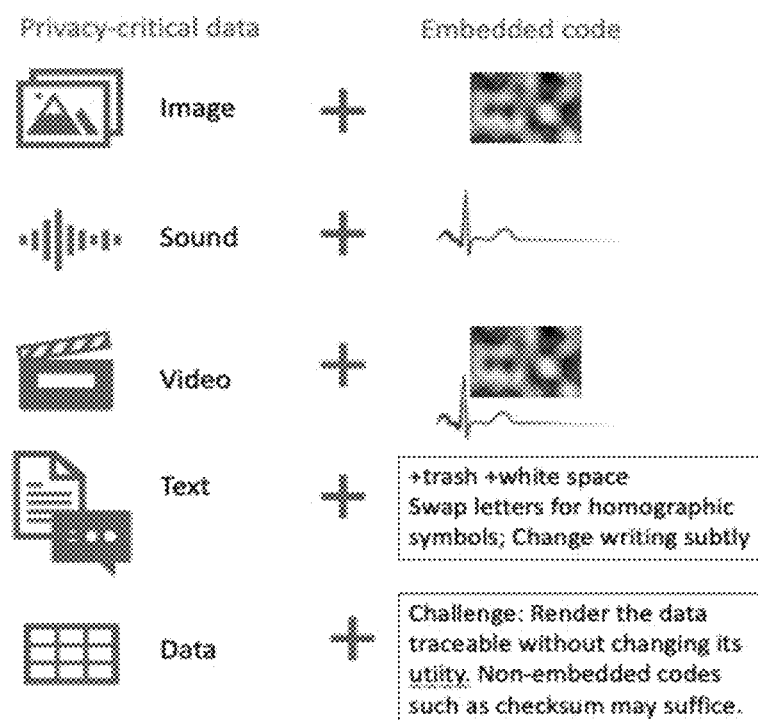
FIG. 6B depicts an example of a structure and process for embedding tracking codes in user privacy data.
Figure 6C:
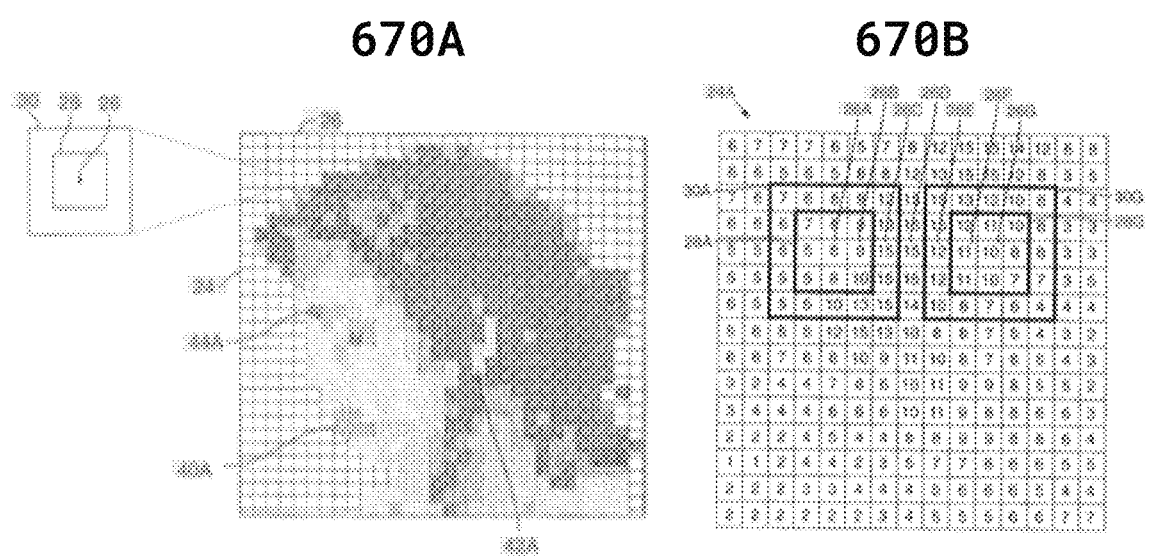
FIG. 6C shows an example of a prior art steganography technique for images.

An example of a prior art technique 670A for steganography is seen in FIG. 6C, which is taken from U.S. Pat. No. 6,628,801 by Robert Powell and Mark Nitzberg. This invention arose from work done by the inventors for a company then called Interactive Home Systems (IHS). Later renamed Corbis, IHS was created by Bill Gates to make digital art display systems for his large Medina, Wash., home, then under construction. In creating the digital art display, IHS found that collections like the National Gallery insisted on some kind of watermarking or other solution to assure their digitized collections 670B could be protected. The Louvre in France categorically refused to allow a U.S. firm to digitize their collection, no matter how good their protections. Corbis later assigned the patent portfolio to Digimarc, which, along with a few other companies, offered watermarking and online tracking services.

The present disclosure differentiates from these prior art offerings by focusing on the use of watermarks and steganography as a tool for discovering violations of privacy, rather than discovering copyright infringement. A central privacy-related tenet of the principles of beneficial technology is that any data created by or originating from a natural person is owned and under the control of that person. Embodiments of the present disclosure describe (a) preferred novel applications of prior art techniques to enable tracking of personally owned data; and (b) new kinds of steganography specifically designed and optimized for privacy objectives.

All prior art steganographic methods follow a basic principle, which is to make changes preferably to that portion of the data that "doesn't matter" in the specific context of use without affecting the quality or usability of the underlying content. For example, in a digital image, extreme points can be targeted—e.g. bright and dark spots in the image—and changed subtly so that the ordinarily capable naked human eye cannot discern the watermarked from the original. The same principle applies to sound and video— e.g. making loud parts louder and soft parts softer. In these instances, alterations to the underlying content data do not detract or cause any noticeable degradation in perception for their intended consumption by a human user as they are beyond any individual person's sensory discrimination or detection capability.

FIG. 6A depicts the sequence of steps 600 employed to watermark user data in embodiments of this disclosure. The high-level sequence of steps is as follows:

1. Prepare appropriate type of watermark for embedding in user data file 610
2. Select & apply medium-specific watermarking technique to data as per consent provided in C/PPC 620/630
3. Store metadata associated with embedded watermark identifier 640

1. Prepare Watermark 610

A. General Framework

The basic application of the present disclosure is in connection with data provided by a natural person to a digital service provider, or collected from a person by a provider. FIG. 6B shows that an original piece of data (e.g. a photo, video or sound file) that is uploaded or otherwise collected from a user's camera, microphone, keystrokes and/or other activities and devices is captured and stored in original form. It is then modified by a watermarking process 660, preferably by changing individual points within the datum (e.g. by increasing or decreasing luminance values for pixels or volume values for sound) in such a way that the quality and usability of the original is preserved, and such that an ordinary person could not tell the original from the modified version (e.g. in a "which one is original?" side-by-side comparison).

In one embodiment, the modifications are driven preferably by a feature detector, where "feature" depends on the type of data. This could include loud or soft moments in sound files, or frequencies above or below an audible range. For an image photo, the feature could be bright and dark spots that cannot be discerned by a human eye. For text, the feature could include white spaces or letters that can be represented by alternative codes but appear similar to a human observer. A watermark or embedded code then preferably takes the form of a change to the detected features.

This approach tailors the changes individually to each photo or email message generated by a user in an exchange with a DSP, making them nearly undetectable and hard to remove, unlike the [FOX] or [CNN] logo watermarks on video streams. Note that in this approach, each item of content (e.g. C1) receives a separate embedded code, even if the item is otherwise identical to some other item of content (e.g. C1') because in a privacy context the goal preferably is to uniquely identify an instantiation or source of an item, not just the content itself. It will be understood that the particular form of transformation will be application dependent.

B. Special Case for Short Text Fields

In the context of protecting user privacy, certain challenges arise when introducing a usable, traceable code into a short text field.

For example, in the case of a numeric field such as a phone number, the data is converted to a base format like +1-212-484-2423. Introducing spaces or other identifying characters for tracking purposes is mostly ineffective as it typically will be reversed by a parser algorithm/data scrubber responsible for capturing and storing the data.

A short text field such as "First Name" has similar challenges. There is little room to introduce changes that contain unique codes and that can survive parser algorithms.

Embodiments of the present disclosure attempt to address these scenarios as well to offer at least a basic level of protection. One preferred solution for short text fields is to substitute similar looking symbols from 16-bit ISO character sets for the ASCII characters of the field. So for example, the code for the Greek alphabet's letter Kappa is preferably used in place of the upper-case Latin letter K, the 11th letter in the Latin alphabet. This kind of one-for-one substitution using alternate character sets could be rejected by stricter parser algorithms, but could be useful in some applications. It is expected that later developed text tracking techniques can be employed with the present embodiments as well.

C. Advanced Applications Beyond Image, Sound, Video and Text: Complex Data Files Outside the domain of short text fields, there remains a wide range of data that can be tagged for tracing. One relevant contemporary example is the data captured in a neural network after training—each a vast (105 to 107) set of parameters, even into the millions of floating-point numbers. Other data types may include machine-coded design files, including CAD (computer-aided design) files for architectural drawings, renderings, or 3-D print files.

One preferred way to mark data files for tracing is to register them, together with a checksum, in a central repository or in a distributed ledger system such as a blockchain. At the same time, legal ownership is claimed either through the application of copyright, U.S. case law or database law. This approach therefore invokes using existing source code control repositories to store and memorialize authorship and modification history with a trusted central authority or verifiable decentralized equivalent.

Another way to mark privacy files for tracing is similar to the basic steganographic application—by changing the data, or at least most aspects of the data file that do not materially alter the behavior of the system. The technique for this varies based on the type and purpose of the data. For example, changing arbitrary contents in an array of millions of parameters for a deep neural network can cause behavior changes in the model, but very small changes have relatively little effect at the higher levels of a multi-level network, so one can simply increase or decrease the parameters at the top level or one level below that. CAD files are known, for example, to be resilient to changes in the order of objects and various generic parameter sets.

2. Apply Selected Watermark 620

As described above, the type of data to be transmitted to the DSP determines the type of watermark to be employed at 630. Image files preferably embed "watermarks" (i.e. a unique ID code) within the pixels of the image via luminescence alterations, while sound files can embed watermarks by using volume adjustments. Video files can employ a combination of the two methods.

Short text fields most likely are not amenable to techniques such as insertion of characters, but alterations can be made nevertheless, by using ASCII character substitution. For file types not amenable to watermarking, ownership is preferably asserted by storing the data and its associated metadata, using a trusted, immutable ledger system (see the blockchain discussion below). Other techniques will be apparent to those skilled in the art from the present teachings.

3. Store Metadata Associated with Watermark 640

The final element required is the storage of the relevant metadata, which includes all information that the end user and/or an enterprise IT department (in the case of a corporate installation of the data privacy management agent) finds pertinent to the user's data being requested or captured by a DSP:

user ID (author/owner or data)
    user title or organizational role/level
    date/time of data creation
    date/time of transmission to DSP
    destination DSP
    User credentials given to the DSP, such as email, username, physical address, etc.
    permissions granted for the viewing of the metadata itself
    permissions granted for the collection of the user data, as well as for its sale or re-transmission to third parties
    description of watermark
    method employed for watermarking Other elements/forms of metadata will be apparent to those skilled in the art from the present teachings.

The association of this metadata with the analogous watermark is preferable for the effective use of watermarking for data privacy protection. Three possibilities for metadata storage: 1) on user device; 2) cloud storage; or 3) on distributed ledger technologies (DLTs), also known as a "blockchain." Other storage options will be apparent to those skilled in the art from the present teachings Storage of metadata on end-user devices and on cloud storage accounts depends strictly on the storage space available, and can be enabled or disabled by the user as they choose. To the extent that such metadata files can be later altered or modified by the user, they may have limited value in a legal setting. Possible alternatives that offer the benefits of immutability, security and an historical record are distributed ledger technologies (also referred to as "blockchain"), which offer metadata storage alternatives that are superior to local or cloud file storage.

Of the three metadata storage methods mentioned here, the DLT methods (such as the Ethereum blockchain) are preferred because of their integrated cryptography (i.e. security), as well as their immutability, which rests upon the decentralized nature of file storage. Blockchain files (known as smart contracts) are stored on many computer nodes that are geographically distributed, and any addition to the chain of encrypted transactions on the chain should be agreed upon by many nodes running the encryption/decryption algorithms.

The Ethereum blockchain is implemented using open source software, and it uses the well established "Solidity" software language for writing smart contracts. There are several competing blockchain technologies available, and the metadata associated with watermarks may be stored on any platform that meets the requirements at the time of implementation.

VI. Alternative DSP Recommendations

This aspect of the disclosure focuses on the AI-based recommendation engines (a.k.a. "recommenders") that can offer users suggestions for alternative services (in major categories) that are superior, in terms of user data privacy protections, to a currently used service. That is to say, in addition to being informed of potentially dangerous sites, users need recommendations of alternative online services that are less harmful to their stated privacy policy objectives, as given in the settings of their privacy charter matrix 310, which is the basis for the CPC 341 and PPC 340.

Figure 7:
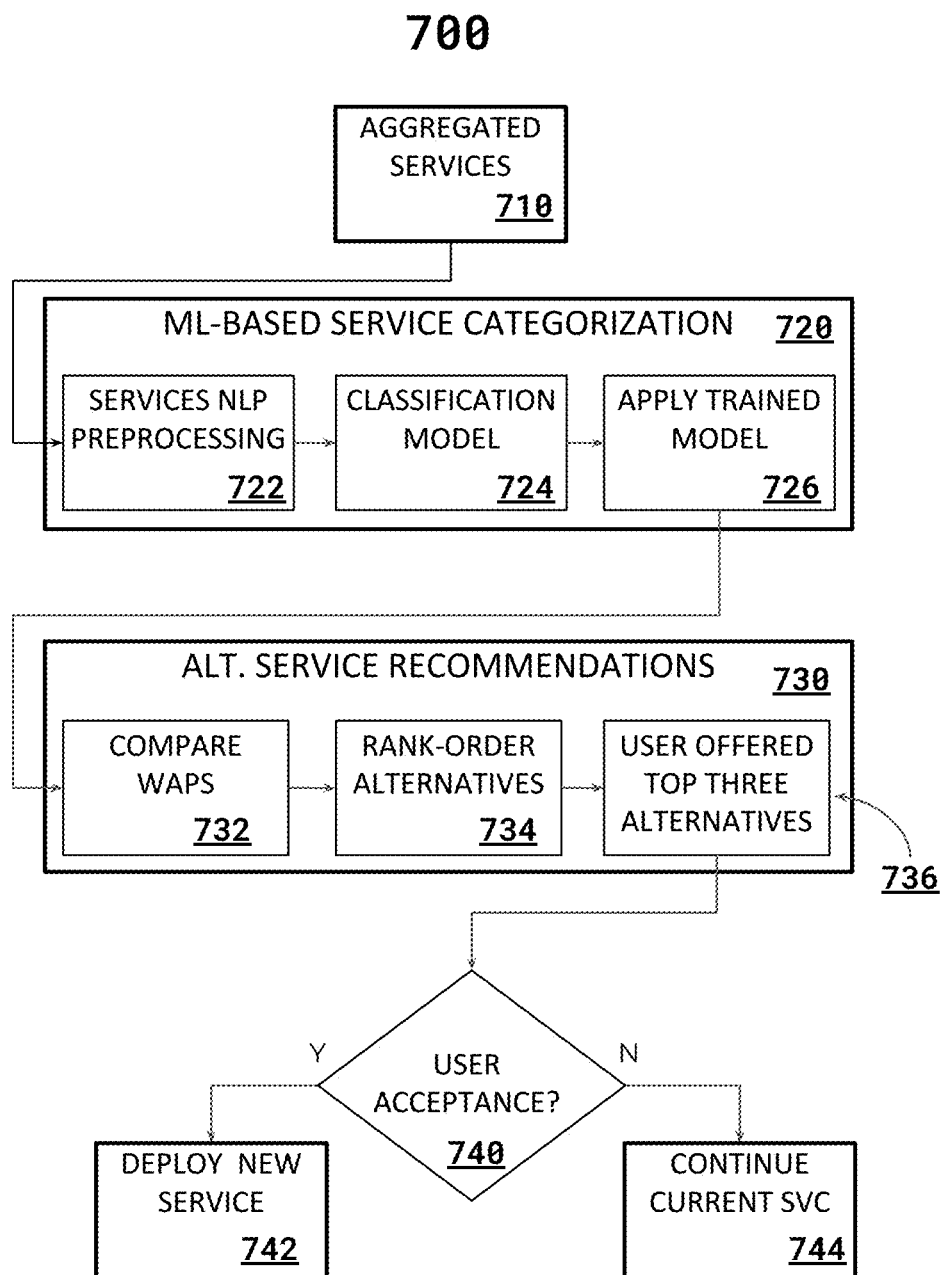
FIG. 7 describes a preferred system and process for recommending privacy protection settings and DSPs to users of an automated privacy protection agent.

FIG. 7 depicts the Privacy-benign Alternative recommendation operation 700 of embodiments of the disclosure. The high-level sequence of steps is as follows:

1. Establishing Digital Service Categories 710
    2. Tokenization of scraped privacy description text from DSP websites 720
    3. Identify All DSP Alternatives That Are More Privacy-benign 730
    4. Rank Order & Present Recommendations 734
    5. Implement User Choice (keep or change) 740

1. Establishing Service Categories

The first requirement for offering privacy-benign alternatives to the user's current services preferably is to establish a set of categories for each service at 710, containing alternatives that are one-for-one substitutions for each other. Many of the services to which users subscribe might not fit into such a categorization, but many of the most heavily-used services should fit into such categories. A manually-created service categorization preferably serves as a starting point, based on established popular services and their own SEO tags. A representative example of a manual categorization is:

Internet search engines
    Web browsers
    Social media platforms
    Blog posts and affinity/interest group/community message boards
    News publications
    Retailers and ecommerce sites
    Email services
    Financial
    Productivity applications
    Cloud file storage
    Weather conditions & forecasts
    Navigation and location-based searching
    Restaurant/entertainment/services ratings & recommendations sites
    Medical/health information & telemedicine
    Online education
    Remote work, collaboration, video conferencing These can then dynamically adjusted based on privacy-compliant insights on user preferences.

A natural language processing (NLP) based categorization is preferably employed at step 722 using clustering and classification algorithms, to establish service categories. (See Sections I and IV above for descriptions of NLP, clustering, and classification machine learning workflows.) The dataset contains service descriptions preferably scraped from service provider websites, as well as SEO (Search Engine Optimized) descriptive tags used by major search engines (e.g. Google) for commonly used services. For example, going to the website (https://hookagency.com/financial-seo-keywords/) reveals 42 keywords (tags) such as "mortgage," "investment," and "financial services" that tend to be in the descriptions for a Financial Services website.

A "bag of words" model is preferably employed to train a classification model at 724 to attempt to categorize as many of the most commonly used digital services as possible. Other clustering techniques appropriate for a dataset will be apparent to those skilled in the art from the present teachings.

The trained classification model is then applied at step 726 preferably to each service that is subscribed to by each user to identify possible alternatives.

2. Identify all DSP Alternatives that are More Privacy-Benign

Next, the set of all possible service alternatives that are "superior" to the current service in the area of privacy protection are preferably identified at 730. This is achieved preferably by applying: a) the raw privacy score calculated by the NLP engine described in Section I (privacy policy NLP); and b) the user's C/PPC described in Section II (corporate/personal privacy charter). A Weighted Average Privacy Score (WAPS) is calculated at 732 for each service that is categorizable (as described above) preferably by multiplying the weights from the user's privacy charter with the raw privacy scores (a 1 or a 0 for each legal provision of the privacy policy). Other techniques for computing a weighted average privacy score will be apparent from the present teachings.

The WAPS for the service in question is also preferably compared at 732 to the calculated WAPS for each of the services in its service category (as described in Section 1 above), with the goal of identifying service alternatives with lower (i.e. better) WAPS scores than that of the current service.

Note that a wide range of DSPs is preferably processed (i.e. calculate their weighted privacy scores), in order to generate as many alternative services as possible in each service category. For each service that the user adopts, a list of alternative services whose WAPS are lower (i.e. better) than the current service are recommended. These alternatives are preferably limited to the top three suggestions if more than three "better" alternatives are identifiable.

3. Rank Order & Present Recommendations

When more than one alternative service provides better data privacy characteristics than the current service (i.e. has a lower WAPS), the user is preferably offered a ranked choice. A recommendation engine (i.e. a machine-learning algorithm) is preferably employed to rank the available alternatives according to some set of characteristics at 734. The most intuitive basis for this ranking is the popularity of the service alternative among: a) other users of this privacy management application; and b) all users of the digital service in question.

Popularity can be one metric by which to rank-order service alternatives, but the system can also offer multiple rankings based on other characteristics of the services and the users. For example, the dataset of user behavior employed in Section IV (auto-adjustment of C/PPC) could also be utilized in the recommendation engine to rank-order service alternatives at 736 according to choices made by users who are most similar in terms of the other tracked variables in that dataset. These could include (but are not limited to):

- Facebook/Instagram/LinkedIn posts & photo sharing settings
- privacy survey responses
- number of online financial transactions
- eCommerce transaction frequency and/or purchases
- demographic/psychographic data
- physical location
- restaurant and/or product ratings & reviews 4. Implementing User Choice(s)

As with all aspects of this system for managing corporate and user data privacy, the final choices preferably reside with the user as presented at 740. When alternative services are available (whose privacy characteristics are superior to the user's current service), the system preferably does not make the service change unless the user actively chooses to switch at 742. The choice a user makes for or against an alternative is assessed and, at frequent intervals, fed into an automatic recommendation for revising the C/PPC in Section IV.

As noted at 740 the user is asked to either continue with the existing service and continue with step 744, or to select one of the offered alternatives in path 742. At any time in the future, the system preferably provides users the option to return to the alternative service selections and make a different choice, or to see their history of services and return (roll back) to a previous service selection.

The basic preferred message delivered to the user carries the structure 780 shown in the bottom right of FIG. 7. A set of predefined fields are preferably filled with information within a privacy message in field locations 782 and 784. These fields are preferably filled by a parser and present specific information to inform a user on the reasons or basis for the recommendation in question, including by identifying common characteristics of the user to other users at field 782 (e.g. users who are strict about their financial data), and explaining the identified deficiencies of the service provider A in field 784 (e.g. it resells user data to a variety of third party entities). Other examples of such message can be employed of course to inform users of the basis and methodology of a recommendation given at 770.

VII. Active Countermeasures for User Data Protection

Some embodiments of the disclosure also perform a function of masking a user's online data footprint as they navigate the internet and consume digital services. The system and method obfuscates and obscures the user's true information preferably by issuing decoy requests for every true use of an online application or service.

Conventional approaches to preventing loss of user privacy data are losing the war because they are fighting the wrong battle. The approach used herein does not require that there be perfect safeguards of personal data—only that the information in such data becomes degraded or useless because it is lost in an ocean of falsehood. In other words (from an information science perspective) to completely hide one's personal data in the course of using a network to accomplish a purpose is most likely impractical if not impossible. For instance, navigating from one location to another necessarily requires that a user disclose her location to the GPS network, so that her location can be updated on a map. However, there is nothing to stop that same device (via the privacy agent disclosed here) from submitting an arbitrary number of randomized requests to the same network, with potentially false input information, or, at least additional confounding information which obscures and/or degrades the value or informational content of such data.

Embodiments of the privacy agent described herein preferably deploy decoys and false requests to the universe of trackers and data aggregators/brokers, thus obscuring the user's online/electronic footprint. This is done preferably without any need for the user's intervention, and without any impact on the user's experience. In other words, the user's data vanishes in a fog of doppelgangers (artificial users) or artificial data about the user.

In submarine warfare and air-to-air combat, such efforts to fool targeting systems are known as countermeasures. For example, a fighter jet may release a cloud of radar-reflective particles (called chaff) to give an attacking missile the wrong target. In the same way, the software based privacy agent described herein throws out "virtual" chaff to fool trackers as to physical location, media consumption, search terms, browser history, and any other item of content or action a user might do online, via any connected device. The agent makes it difficult for third parties to find the real user in a virtual Hall of Mirrors. The infinitude of reflections effectively mask a user's true data (for example, a location). An approach for generating false social graph information is described in US Publication No. 2014/0280124 to Tikofsky et al., which is incorporated by reference herein. Aspects of that disclosure can be incorporated in the present embodiments as well.

Unlike air combat scenarios however, the privacy agent here does not intend or need to "defeat" a digital service provider, but rather preferably merely extracts more favorable engagement terms—additional, more equitable financial consideration for example. The leverage generated by user decoys is preferably used to offer true identification for one's data footprint, once acceptable terms have been reached. In doing so, the software privacy agent helps flip the power asymmetry and the roles of permission seeker and permission granter between the employee or customer of the enterprise that subscribes to privacy agent protection (preferably embodied as an SaaS solution), and a Digital Service Provider.

1. General Structure/Operation

Figure 8:
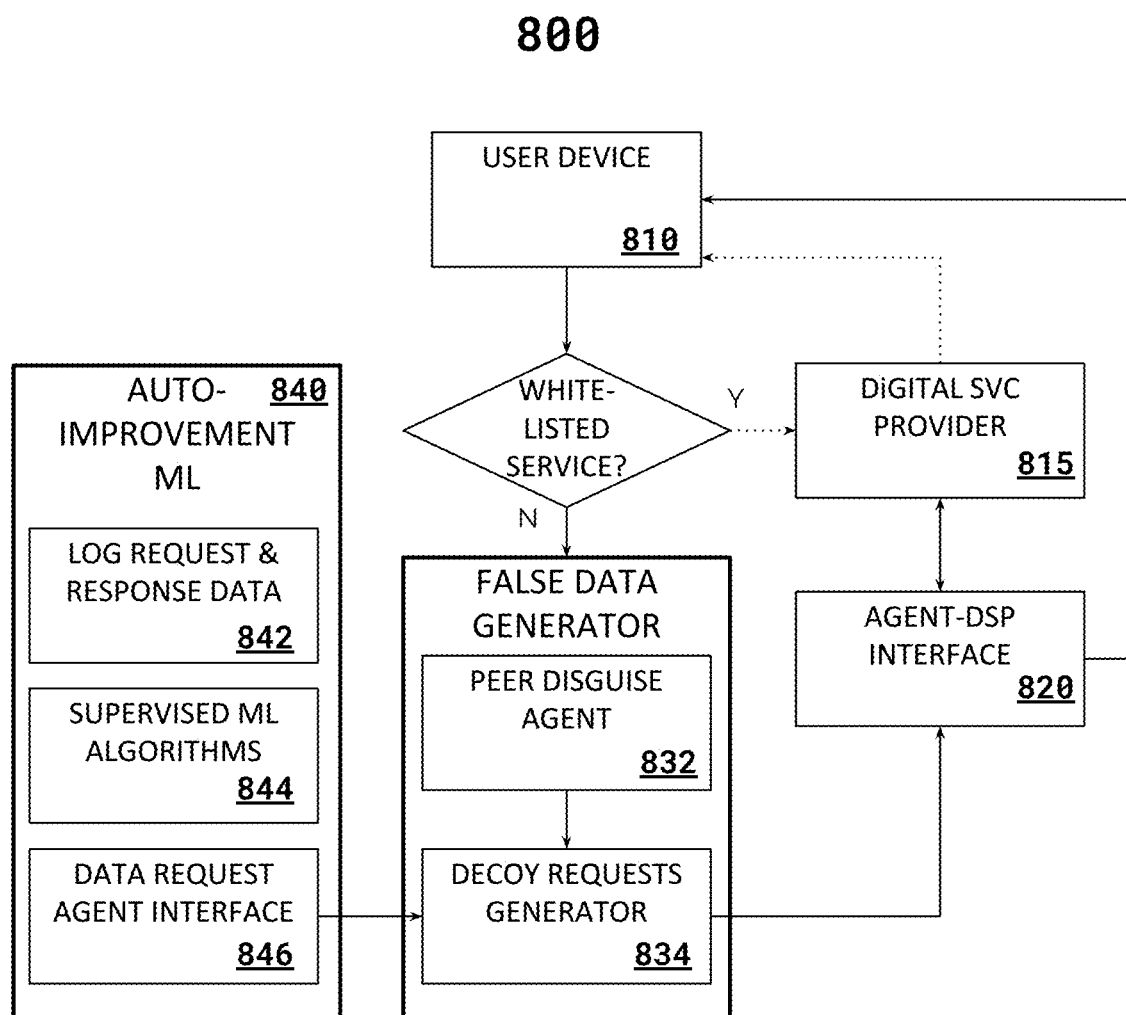
FIG. 8 shows a preferred embodiment of a user data privacy countermeasure system which employs a customizable automated privacy data agent that intervenes and degrades the value of user data to entities that do not cooperate and comply with a user personal privacy charter.

As can be seen in FIG. 8 system 800 uses a privacy agent (FIG. 1A) preferably configured through software coding to generate a multiplicity of false requests 834 (based on a set of artificial users) with a machine learning engine 840 whenever a user device 810 interfaces/engages with a digital service provider 815, and conversely only passes responses that correspond to the true request back to the device. The requests 834 are passed through a agent-DSP interface 820 which also processes appropriate responses to the correct (actual) user intended request. The disguised requests are made preferably only when a service or site 815 is determined by device 810 not to be already white-listed at step 825. A false data generator 830 includes a peer disguise agent 832 which masks the generally-tracked attributes of the user and a decoy request generator 834. The latter is informed by an auto-improvement machine learning engine 840, which studies DSPs on behalf of the user/system 800 to characterize their behavior. This is done by a data-request agent interface 846; a module for generating and logging requests is included in engine 840 as well. A machine learning algorithm 844 then studies and classifies the behaviors of the various DSPs to identify particular request types, formats, etc. that are optimized for each site.

User privacy is not completely protected in this scenario, because it is necessary to reveal at least some accurate information (e.g. one's location when navigating) in order to obtain the benefit of a networked service. However, the actual true request is lost in a myriad of randomly generated false requests from artificial entities, which negates the benefit of covertly tracking, fingerprinting, and spying on the user. Other implementations for other applications (i.e., apart from location tracking) will be apparent from the present teachings.

As for the improvement of the generation of false requests (machine learning agent 840), there are various different possibilities as to the number and type of false request generated. It could be as few as 1 or 2 false requests, or it could be hundreds. The determination of the number of false requests is customized based on the unfolding practices of the digital service providers (DSPs). If their detection of such active countermeasures results in automatic banning of the user from receiving services, then the user's interests are not best served by the countermeasure functionality. In such a future scenario, the number of false requests generated may be reduced so as to remain undetected by digital service providers.

The type of false request generated is also customized, and similarly depends on several factors, including user preference and real-world effectiveness with DSPs. The false requests preferably are very plausible—that is, only subtly different from a real request in ways that are not distinguishable. For example, there might be a false navigation request made to obfuscate the true location and or destination of the user. A plausible false request might be one that originates only a short distance from the user's true location, and ongoing GPS updates along the route might continue this plausible false location-destination scenario. Other examples will be apparent to those skilled in the art.

At the other end of the spectrum is a randomized false request. In our continuing navigation example, a randomized false request is preferably a route-destination-origin that could be anywhere on the globe. Machine learning on an ongoing basis, across all the major online service categories, can determine (without undue experimentation) the most successful mix of plausible-versus-randomized false requests, as well as the number of false requests generated for each real user request.

2. Active Countermeasure Attributes

There are a number of possible variants for active countermeasures that can be implemented with privacy protection. They all preferably share the following qualities:

Zero impact on the user's experience, and requiring no intervention on their part.

Cannot be easily "pierced" by privacy violators by cloaking the digital fingerprint of the device 810 and browser associated with any given instantiation of a customer's personal privacy agent 120 (FIG. 1A).

Stays clear of law enforcement rules that require a user to be particularly or specifically identifiable, and mitigates concerns that might jeopardize public safety.

Zero or minimal use of the device's computational power or bandwidth.

Does not result in punishment of the user in the form of service blocking.

Automatically adjusts as a user Corporate/Personal Privacy Charter (C/PPC) changes. The C/PPC is used to configure the privacy protection agent.

A variety of use cases and solutions are now described for the inventive embodiments.

A. Use Case 1: Geo-Location Decoys

Multiple independent or complementary models can be used to defeat undesired location tracking services, including:

Model A: the system 800 sends out a number of additional and extraneous fake locations and navigation requests 834; the exact number can be determined through routine trial and error to determine any effects on user privileges from a DSP 815;

Model B: a large number of true navigation requests that are happening globally at the same time are pooled with a cloud-based software privacy agent from a number of authorized users of an application, and provide false information on which route is mapped to which user. To that end, the system 800 aggregates or batches concurrent navigation requests from those users that concurrently access the navigation applications on their mobile phones.

Model C: the system 800 sends out a true route request. It then obscures the IP address or routing path.

Other examples will be apparent to those skilled in the art. In addition it should be understood that each of the different models are not mutually exclusive and could be used alone or in conjunction with another model. Finally, the user may specify that the decoys would only be used in particular sensitive areas that they can identify on a map, either by reference to a distance surrounding a particular address (or landmarks, such as doctor offices, a child's school, etc.), by selecting an area/region on a graphic display, and so on; temporal control can also be provided so that the decoys are only deployed at user selectable times that cover an activity or set of activities which the users know or speculate to take place at such times. In addition, the user can also set the system to decoy activity associated with certain contacts in a user's address book, or contacts linked through near-field communication protocols like Bluetooth and application features like Apple's AirDrop. Lastly, the user might specify decoying as part of parental controls on devices held and operated by minor's for which the user has legal guardianship for part or all of the time said minor uses the device.

B. Use Case 2: Media Consumption

In these cases the system 800 preferably sends out hundreds (or more) fake news link clicks/video clicks/podcast downloads, with plausible but false search terms, for every "true" request made by the user.

C. Use Case 3: Online Search

In these cases the system 800 preferably sends out hundreds (or more) fake searches, with plausible but false search terms, for every "true" search done by the user.

D. Use Case 4: Financial Transactions (Priority Industry)

In typical electronic financial interactions, a bank customer accesses an ecommerce or mobile banking, trading or payments platform, and/or looks up financial information on financial information services. In these cases the system initiates parallel logins or searches on other commerce or finance platforms to distract from the original transaction, thereby polluting the original transactional data trace and prohibiting the triangulation of intent, or inferences on financial performance or net worth.

3. Negotiating a Fair Share of Personal Data

As should be apparent, the intent of the disclosed embodiments employing obfuscation is not the disruption of networked economies, but rather a shift in power and/or accepted ownership of user data. With the establishment of true user control over his or her own data, the inducement to engage increases and online applications and services will flourish and grow more profitable than ever. As such, the active countermeasures described here are an inducement to service providers to negotiate in good faith with consumers as to the value of their data, and paying for that value fairly.

For every counterparty 815 that enters into an accepted contract with the user, the system 800 can readily transmit the agreed-upon user data to the approved party for browsing activity to date, and also disable a decoy function going forward with such entity. The service provider has no need to covertly fingerprint or spy on their customers any longer, or enlist the support of third parties doing such on their behalf.

As such, embodiments of the system can become the market-maker for personal and collective enterprise employee data. Instead of having to go through privacy brokerage platforms, such as Oasis, that provide selective deal interfaces, adding more inconvenience for the user and slowing down user transactions on the web, users automatically and seamlessly enjoy protection, leverage and income streams with a myriad of digital service providers that must opt into verified user identities.

4. Advantages to this Approach

In contrast to other digital rights management methods, such as digital watermarking, GPL protection of some user content, and notice of protest to exploitative privacy policies, the active countermeasures approach displays some significant advantages:

Immediacy. The system provides an immediate, perceived benefit to users by obscuring their digital footprints;

Direct user-controlled "enforcement" of agreements with service providers. Users don't need to trust that DSPs are living up to their contractual commitments, as they can rely on the system for such tasks. Users can be notified of cooperating DSPs and selectively enable/disable countermeasures.

VIII. Data MarketPlace

Other embodiments of the disclosure include a system and method to bundle user privacy data into sellable units, to alternatively derive commercializable insights from data analysis, and assess its value and enter into transactions. More specifically, certain embodiments help users engage with online providers, apps, social networks, etc. in ways that properly assess the value and restrictions attendant to their privacy data. Valuation first occurs based on a bidding process to settle on realistic price point ranges. Pursuant to this initial valuation and market education, actors in the privacy-assured data market will settle on more realistic price point ranges for a diverse range of packages made up of different types of data for a given user profile.

1. Prior Efforts

Several prior art attempts have been made to develop alternative data trading market models:

Personal.com and digi.me: Around 2012, the startup personal.com created personal data vaults for individuals to aggregate, manage and reuse their own data. Each vault potentially contains thousands of data points about its users. The idea was that businesses pay for this data, and the data owners are appropriately compensated. In 2017, the company merged with digi.me, a similar solution provider from Europe. Today, digi.me is a solution that allows users to "collect data from across their lives and reuse to power apps specially designed for private sharing technology." Digi.me seemingly did not manage to attract the demand-side to use the data that data creators upload. After an experiment that uploaded 540 Facebook, 1,088 Twitter and 91

Instagram posts, as well as 159 Spotify data points, Digi.me was not able to offer any app with which the data could be shared.

Handshake: Around 2014, this startup aimed at cutting out the market research middleman, while also circumventing the "data for free service" model of Facebook, Google+ and others. To do this, it built a platform where users can sign up to be approached by companies, negotiate a price for their data, and decide whom to sell it to (and whom not to). The startup, however, does not seem to exist anymore.

CitizenMe: This app develops a data "exchange" that enables individuals to pool their data for surveys and other uses in exchange for compensation, as well as receive an analysis of their data. It is, however, constrained to the UK market, as 99.6 percent of users are coming from there. The fixed prices are too low compared to the time it takes for a user to provide data and set up exchanges.

Kara: This application currently tested in the area of healthcare at Stanford University allows patients to upload a photo of their medical data. The platform offers this data to researchers, who pay for use of the data to train ML models. Throughout the process, the involved parties only have limited visibility of the untrained model or the data. The transaction is executed using smart contracts. The pricing is done based on the Shapley Value, a value in cooperative game theory. Kara is still in the prototyping stage, so it remains to be seen how successful this approach will be.

Ozone.AI: A startup founded by former Google employees Lyndon Oh and Ben Colman made its debut at Disrupt SF in 2019. Little is known about Ozone, only that the company aims to become the platform through which data creators can granularly set their privacy preferences and sell their data directly to advertisers. The Startup seems to pursue a B2C approach, not yet offering an explanation for how it aims to balance the bargaining power between data creators and data sellers to achieve meaningful value for both sides.

One of the latest yet still theoretical concepts are MIDS, as described by Weyl and Lanier, who propose a union-like model for market intermediaries. Such labor unions gather individual's ordinary data as well as more specific data. Each MID has its own entry requirements and payment regulations. Being a member of MIDs allows individuals to build up a stream of income from their data.

Undoubtedly, more platforms in the making aim to achieve the same outcome: Trading data for economic benefit. But most remain cloaked. To the best of Applicants' knowledge, none of the aforementioned examples have proven to be successful to this point, nor have any shifted the dynamic of the data economy toward a more balanced price-setting paradigm for fair equilibria between supply and demand at scale. Those initiatives have focused solely on building the data trading platform, when a fair and effective market actually requires more than a pure market intermediary—it also requires a mechanism that creates scarcity and demand for personal data, such as personalized privacy management tools and instruments. The trading platform of FIG. 9 can be included as part of a larger framework as seen in FIG. 10.

2. General Framework of an Online Data & Insights Marketplace

Current online data or data insight marketplaces are asymmetrical in terms of price-setting power between data creators 910—(suppliers and data/insights sellers) and buyers (e.g. data brokers or data analytics/marketing firms), a phenomenon that is further exacerbated by the monopolistic and oligopolistic tendencies in the digital platform economy. In the present disclosure pricing is used as an important instrument to balance the two-sided market of supply and demand and make the marketplace more efficient and equitable. Most of the current models assume certain market preconditions, such as an agent in the form of a "data owner union" (similar to a labor union) or a state that facilitates economic transactions. Those models, as well as other existing solutions, fail to address three important issues:

1. Establishing a pricing mechanism or a platform that matches supply and demand is not enough to change the dynamics of data valuation, because neither component alone can balance the bargaining power between the data creators (supply side and data buyers (demand side). Thus, it requires a more holistic, trusted and transparent institutional structure that is flexible enough to evolve as the market develops.
2. The value of data is influenced by a complex web of variables that existing models do not fully take into account, if they consider them at all. Current proposals define prices as fixed values or solely based on the value attributed to the "loss of privacy"—which does not reflect the demand side (e.g. data buyers). Others derive the price from macro-economic parameters, such as the profit margins of data driven companies, not allowing the pricing of individual datasets. An effective market needs a dynamic pricing model that evolves over time, taking into account variables set by the supply and demand side while providing transparency in the valuation.
3. Current approaches to data pricing do not take into account the necessary precondition of scarcity of individual privacy-assured data, which assures that a pricing impulse is provided to the market to generate demand. However, a truly symmetric market grants the selling party the right to limit the availability of a given asset, react to initial demand signals and achieve the appropriate price per unit reaching a market-clearing equilibrium between buyers and sellers. This is not currently the case in individual or enterprise owned data.

Figure 9:
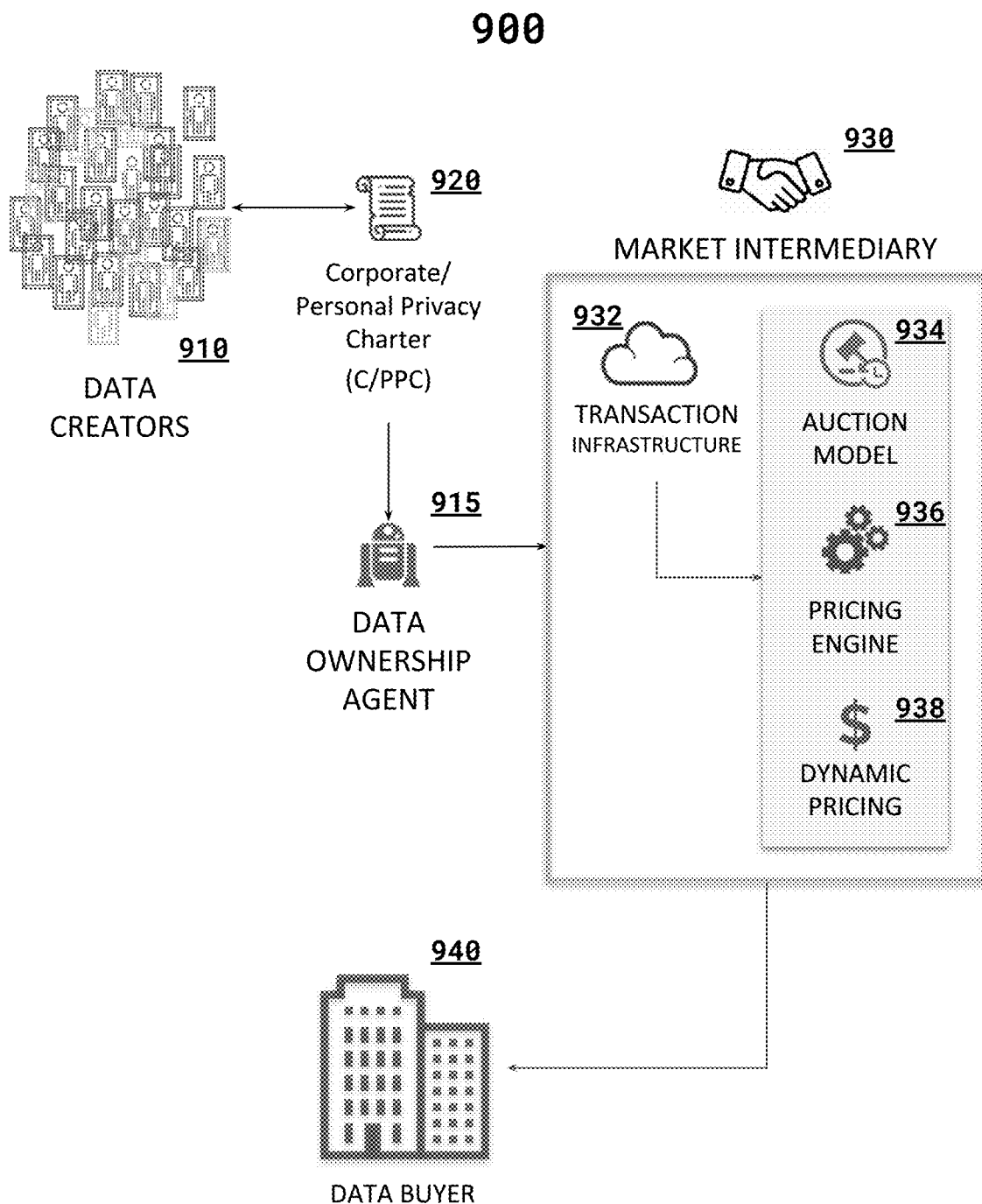
FIG. 9 shows a preferred embodiment of a user data valuation and transaction management system which employs a customizable automated privacy data negotiation agent.

Considering those issues, as seen in FIG. 9 the present approach for implementing an efficient and equitable data market system 900 (preferably implemented as part of a cloud computing system) addresses a data marketplace with a software controlled dynamic pricing mechanism 938 as its core component.

3. Data Market System 900

A. User-Centric Data and Data Privacy Management (920)

As seen in FIG. 9 balancing the power between buyers 940 and sellers of data 910 in the current marketplace and managing data and data privacy in digital interactions requires a fundamental shift in selecting which entity defines the terms and conditions for such interactions. Increasing the bargaining power of the data creators 910 means decreasing the non-transparent proliferation of data transactions. Some data can be cheap and ubiquitous; other data is more valuable and can be negotiated. Some buyers are interested in raw data, others in acquiring only analysed data, in short insights.

A proper marketing system 900 therefore preferably includes software tools that allow data creators to set up their own privacy terms and conditions (through the charters 920 described in Section II above) for engagement with DSPs, to dynamically manage data tracking, to negotiate terms regarding usage, and/or to control the flow of data collected and shared with companies outside these services' immediate ecosystems.

Current data management and privacy controls do not allow this. They tend to take the form of simple, isolated, piecemeal "user privacy settings" in operating systems, browsers, apps, websites and other digital services, with every digital services provider (DSP) defining the terms and conditions for data sharing according to their—and not their users'—needs. As a result, it now takes 900 pages and 34 hours to read the terms and conditions of the most popular apps on an average smart phone. As a result, 90% of users consent to online terms without reading them (97% in the case of 18- to 34-years-old users in 2017). Furthermore, existing services offer "one-size-fits-all" solutions to privacy management, even though privacy is a very subjective and individualized concept. Browser plugins such as uBlock Origin™ and Privacy Badger™ block tracking, but they don't provide transparency into what happens with content already collected. Cyber security firms, on the other hand, mainly target businesses with comprehensive data management solutions, but they offer little or no options for trading data.

Thus, in short, a new mechanism is needed to center data and privacy management around the user/human, rather than the data buyer (as is currently the case). The "Corporate/Personal Privacy Charter" (C/PPC) 920 is a preferred data and privacy management master control tool/panel that users can design and set up according to their own perceptions, preferences and privacy needs. As such, the C/PPC 920 establishes degrees of scarcity of different types of data in different combinations. More concretely, the C/PPC 920 stipulates the terms and conditions under which a user interacts within data marketing system 900, and it establishes a starting point for negotiations about the valuation of the user's data. The C/PPC 920 preferably includes a field where users can enter prices for "privacy loss" (comparable to Model 2) for various data types (on a data item/context basis)—a price point that then feeds into the broader pricing model described below, as well as price and other use restrictions for their marketable data.

B. Data Ownership 915

A prerequisite for trading within any market is that ownership of the trade item has been identified, and the seller has established their right to sell the trade item. The same applies to intangible assets such as data. One can't trade that which one doesn't own. But in the current digital economy, the average internet user rarely claims ownership rights, or they willingly or unknowingly transfer their rights to a third party without negotiating value. As noted above, there are at least three ways to secure ownership over data: 1) legal means (e.g. property rights such as patents, trademarks or copyrights in conjunction with verification or discovery mechanisms, such personal identifiers and watermarks, or through contract); 2) the prevention of access to said data (e.g. using tracking blockers, IP-address scramblers, or changing privacy settings to prevent data sharing); and 3) national or regional privacy or data transfer regulations, such as Europe's General Data Protection Regulation (GDPR), California's Consumer Protection Act (CCPA) or China's Internet or Cybersecurity Law (CSL). While regulatory solutions have been researched and established, they do not significantly change how data is managed by individuals.

Thus, it is worthwhile to consider the first two options as preferred digital implementations.

(i) Legal Data Property Protection:

A common and simple way to secure ownership of personal data is through copyright protection. Copyright provides its owner with a bundle of exclusive rights on an original work of authorship for the duration of the copyright (including copies, distribution, performances and displays and the preparation of derivatives of the work, etc.) immediately after the work is embodied in a tangible medium. While a Twitter post in most circumstances can fulfill the criterion of originality, the applicability of copyright is not always clear when it comes to dataset compilations or the analysis or interpretation of someone's creative expression. The U.S. Supreme Court's ruling in Feist Publications v. Rural Telephone Service established that content protected under copyright must possess at least a minimal amount of creativity. Straightforward facts, like a person's IP address or GPS location, are not protectable under copyright but their compilation can be in some instances where it entails some originality (e.g. a summary, labels, annotations, etc.). This is a big limitation of copyright as a protection mechanism and a scarcity tool, necessary for strengthening the bargaining power of the data creator.

Despite these limitations, some compilations have been found eligible for copyright protection:

A directory of Chinese-American businesses

A baseball pitching form with nine statistical columns

A compilation of wholesale prices of collectable coins

Similar examples, however, have been assessed as ineligible for copyright due to lack of originality:

A generic white pages directory

A comprehensive cable system factbook

A comprehensive "Code on Dental Procedures and Nomenclature"

In cases for which copyright does not apply because the minimum creativity is missing in a dataset compilation, AI companies in some jurisdictions (such as Europe and Russia) can make use of so-called "database rights" to establish IP rights in works created by their artificial intelligence solutions. A database right is comparable to but distinct from copyright. It exists to recognize the investment that is made in compiling a database, even when this does not involve the "creative" aspect protected by copyright. In the U.S. case law treats data like any other property, according to certain common law protections. Courts have extended traditional tort claims for interference with or misappropriation of another person's tangible personal property in the form of trespass to chattels. Courts have interpreted trespass to chattels to include the use of a computer system that is outside or in excess of authorization and that results in demonstrable damages. This may include website scraping or spam email. In a few states, courts have recognized the tort of conversion of intangible property. This may include the unauthorized taking of information on computers and websites.

In addition to legal ownership protection, data creators 910 can also specify preferred protections and values for their data under the terms of a user-centric/friendly data contract. In such instances the user can identify (unilaterally or with the assistance of the tools below), on an item by item basis, or on an exchange basis, the value/pricing of their data in different contexts. A data buyer 940 can then agree to the proposed terms of the data exchange, or engage in a negotiation for modified terms, including his/her individual price for the "loss of privacy" which occurs when data is shared or sold. This preferably becomes an input parameter in the pricing engine 938. The terms and data items is preferably recorded by a transaction infrastructure 932 on an electronic ledger to memorialize each unique exchange for record keeping purposes and compliance monitoring.

(ii) Prevent Data Sharing:

An alternative approach, somewhat contradictory as well as complementary to the legal approach, is to keep data from being shared in meaningful ways that are contrary to the data creators' wishes. For instance, navigating from one location to another using a navigation app necessarily requires that a user disclose her location to the GPS network, so that her location can be updated on a map. However, in instances where a data creator's data cannot be protected or licensed under controlled conditions acceptable to such an entity, other techniques can be employed to reduce the value to uncooperative data buyers 940. For example, in the case of a mobile app, there is nothing to stop a user device from submitting an arbitrary number of randomized requests to the same network, with potentially false input information. Without any need for the user's intervention, and without any impact on the user's experience, a masking or obfuscation application (as discussed above) could deploy decoys and false requests to the universe of trackers and finger-printers, thus obscuring the user's online footprint by making the user vanish in a fog of doppelgangers. In submarine warfare and air-to-air combat, such efforts to fool targeting systems are known as countermeasures. A fighter jet may release a cloud of radar-reflective particles (called chaff) to give an attacking missile the wrong target. In the same way, an obfuscation application can throw out virtual chaff to fool trackers as to physical location, media consumption, search terms, browser history and anything else a user might do online, via any connected device. An example of this type of intentional distortion of data exchange is described in US Patent Publication No. 20140280124 incorporated by reference herein. While this approach is highly effective, in some instances it may be deemed to violate a DSP's terms of service or property, i.e. bandwidth, memory, processing power, etc., and could result in inconspicuous users being classified as "bad actors" who incur legal action in turn. Thus, it could be employed on a DSP-by-DSP basis. As a further alternative, the transaction infrastructure 932 recommends digital services providers 940 that agree to negotiate the value of data, effectively diverting traffic away from the platforms that do not accept the ownership claims as stipulated in the C/PPC.

C. Transaction Infrastructure 950

In order to effectively facilitate transactions and exchange data for compensation, infrastructure facilities 950 preferably include a number of software (preferably cloud-based) modules operating on one or more server systems and programmed to fulfill several critical functions:

1. Duplicating and bundling creator data into sellable units (optionally: analysing those units to derive commercializable insights)
2. Tagging creator data with traceable identifiers (e.g. watermarks, etc.)
3. Describing creator data contents, including content type, content restrictions, user profile (demographics), privacy sensitivity characterizations that enable or disable tradability (meta labels) and so on;
4. Issue licenses that regulate the use of creator data by stating usage and accompanying remuneration principles
5. Match supply and demand The implementation of the transaction infrastructure modules will be apparent to those ordinarily skilled in the art from FIG. 9 and the following description:

Duplicate and bundle data: Due to the non-rivalrous nature of individual creator data, it can be duplicated without a negative impact on its quality or availability. Data about shopping patterns of a certain person can be of interest to a range of data buyers, even though the value of such data might be different depending on how it is bundled and processed. The value of the data can also depend on the size of the dataset. The value of the dataset can also depend on the size of the dataset. The value of the data can also depend on the size of the data bath. While a single person's medical record may already have some value, motion data is probably more valuable if the dataset includes motion data from more than one person, e.g. the motion data of several people in the same geography. In other cases, it is not the raw data, but the insights gained from the data that are ultimately valuable to data buyers.

Therefore, one function preferably effectuated by the transaction infrastructure is that it enables and facilitates duplications, assessments and structuring of datasets to allow multiple usages, valuations and income generation opportunities. This organizes data on behalf of creators/owners to achieve the best possible return.

Tag data: Discovering data ownership or data usage license infractions requires the ability to trace how data, originating from a certain data creator, as it is shared throughout the digital economy. While tagging images, video or audio with a personal identifier is possible, technical solutions to tag so-called "coarse data" (e.g. a social security number, an address, or a two line email consisting only of a couple of characters) requires different solutions, including for example simple recordations of the individual aspects of an exchange as noted above.

Data usage licenses: The Transaction Infrastructure 932 also preferably issues and negotiates data usage licenses. Once data is protected through a legal means, enforcement of those rights requires two things:
1. a way to tag and trace the protected data to make them discoverable and to exercise leverage over the data-tracking entity so it engages with users
2. license agreements (either contractual or tokenized) that stipulate terms and conditions of data usage between the data owner and any third party, so as to legally limit the non-rivalrous character of data. While similar in some respects to other types of IP licenses, data licenses present several unique issues:

Data ownership and use: Transaction Infrastructure 932 preferably ensures that the party licensing out the data, whether a vendor or creator, obtains a use agreement accurately addresses its ownership of (or other rights to) the data, as well as the treatment of original, derived and used data Scope of license: Scope considers the terms of exclusivity, options for sub-licenses, the purpose for which data might be used, options to aggregate and/or modify the data, options to create or use derivative data or works, geographic or territorial restrictions, and authorized users or devices.

Commercial terms outlining the price as established by the pricing engine 936 (in conjunction with the auction model 934)

Matching supply and demand: Through the C/PPC, data owners can place their data on the data marketplace. Along the terms and conditions set forth in the C/PPC and the predicted demand, the transaction infrastructure automatically duplicates, bundles, tags data and claims legal ownership and issues data licenses before offering it to data buyers. Once a data buyer is found, the transaction infrastructure facilitates the payment and monitor the compliance of the data buyer with the terms and conditions set forth in the data usage licenses.

D. Trusted Institutional Context/Market Intermediaries 930

As described herein a data market usually features three entities: 1) Supply side, or data generating enterprises or individuals (data creator/supplier) 910; 2) Demand side, or data buyers (e.g. advertisement companies) 940; and 3) Market intermediaries, or entities 930 that collect data from owners and sell it to buyers (e.g. Facebook and Google). Considering the difference between the actual and perceived value of data, it is clear that current market mechanisms do not allow a balance of pricing power between data owners 910 and data buyers 930, because there is currently no market intermediary 930 that regulates and integrates privacy concerns in price-setting mechanisms. As noted above, current data markets are asymmetrical in terms of price-setting power, a phenomenon that is further exacerbated by the monopolistic and oligopolistic tendencies in the digital platform economy. Arguably, this is because the current market makers—digital platforms that trade so-called "free" services for data, which they monetize through advertising and data resale—have focused more on the buyers than the suppliers of data, optimizing the monetization of their business models in only one direction.

To enable a successful transaction infrastructure, it is preferably facilitated by a trusted market intermediary 930 with suitable automated software mechanisms 950 to enforce the terms and conditions outlined in the creator data usage licenses. Without a large user base to generate collective leverage data creators cannot acquire sufficient market power to negotiate the value of their data. To establish a large user base in the new marketplace, the market intermediary 930 partners with companies (e.g. enterprises that seek a privacy-protective positioning, such as certain telecommunication and internet providers, financial service institutions, healthcare providers, etc.) as well as individual creators 910. By aggregating sufficient data—which can only be achieved through inducements and demonstrations of enforcement of usage licenses—the intermediary 930 effectively creates a new market for data that becomes attractive to data buyers 940. The latter are incentivized to negotiate terms with intermediary 930 because they have access to a larger, aggregated pool of data across disparate platforms, and with pricing, usage rights, etc. well-defined through contract.

E. Dynamic Pricing Mechanism Tool 938

There is a considerable gap in current data markets for the value of an individual data item assigned by data buyers 940 and creators 910. For example, a typical data buyer 940 ascribes approximately $0.0005 for a dataset about a person (e.g. such as their age, gender and location) but the value individual data creators attribute to their "loss of privacy" is about $36 for personal data such as age and address. To resolve this imbalance, an auction and pricing tool is preferably used to establish a mutually agreed upon price for selected data items, or collections of data items on particular subjects, and with a selectable set of use options. To operate efficiently and attract interest from both data creators and buyers, pricing mechanisms preferably should be dynamic, take into account a range of different variables, and be organized in as frictionless a manner as possible.

In conjunction with the bundling and duplication of datasets as described above, value of data also depends on a number of variables that are preferably taken into account by a dynamic pricing scheme and transaction infrastructure:

1. Data features: Passive (e.g. data footprints) or active data (e.g. photos shared online); personally identifiable data (including degree of sensitivity) versus general data; quality (e.g. labeled or not labeled, completeness or consistency of collection methodology); frequency of updates; precision of data; time (in terms of time series); and geography (e.g. shopping data from users in New York is arguably more worth than shopping data from users in Bangui)
2. Non-rivalrous: Data as a non-rivalrous asset can be limitlessly duplicated without an impact on its quality, but with some degradation or variation of its economic value. However, legal instruments, such as data usage licenses, can make the same asset exclusive. Hence, the degree to which data is duplicated versus made exclusive is preferably a variable.
3. Temporal features: Trends within industries that indicate demand for certain kinds of datasets (e.g. shopping data for Christmas, health data after an outbreak, etc.)
4. Unit size and volume: Different data types are valuable in different units. For instance, health records might have a value as an individual unit, but GPS mobility data might need to be aggregated or bundled to have value
5. Supply and demand: Availability of similar datasets and historical data on demand;
6. Individualized valuation: The price users attribute to their "loss of privacy" when sharing/selling data. Companies might attribute different values to the perceived loss of competitive advantage or intellectual property when sharing data As no historical data on equitable data pricing exists, embodiments of the disclosure also preferably employ an auction model 934 which allows data buyers 940 to identify their bids/limits on what they are willing to pay for various data items and related use parameters. Once a sufficiently developed market is established, buyers are likely to want more reliable prices than they get from auctions, so they can better accommodate data purchases into their business models. A prediction model is then preferably used to come up with pricing engines that take into account the probability of matching supply and demand, plus the variables mentioned above, as well as the privacy settings of the data creator 910. Hence, the pricing model preferably includes two main components which may be deployed at different stages of developing a transaction platform:

(i): Stage 1—Auction Model 934

Auctions take many forms, but each type is characterized by incomplete information about the value of the auctioned item amongst bidders. As such, they serve as a useful instrument for generating a price indication from the market about an item, such as a dataset, that has not been priced before. While in standard auctions the winner of the auction is the participant with the highest bid, there are other types of auctions which may be deployed for determining a value of individual data items. In digital advertising, for example, two different types are usually applied: First-Price and Second-Price bidding. Google Ad Manager, as of July 2019, uses First-Price bidding, which means the winning bidder pays exactly what she bid. This maximizes revenue potential for the seller. Other advertising offerings use Second-Price models, in which the winning bidder pays $0.01 above the second highest bid in the auction. This type of auction incentivizes bidders to bid the highest amount they are willing to pay, knowing that often one ends up paying less than that amount. While Second-Price bidding is not in the greatest interest of the seller, it can provide superior insights into the value of certain items. In the case of data creators and buyers, this type of auction is preferably employed as it provides superior insights into the actual value of data, as bidders indicate the highest amount they are willing to pay. This contributes a key input data point for the second stage of the dynamic pricing, which produces more reliable price points than any of the auction models.

(ii): Stage 2—Pricing Prediction Model 938

Although data pricing is a complex problem involving a lot of different variables, it is not unique in that regard. AirBnB faces a similarly complex problem in developing price recommendations for hosts to list their properties. According to their literature, this company uses a customized regression model for dynamic pricing to develop price tips and smart pricing recommendations, which hosts can use to set customized daily prices, weekend prices and long term discounts. For this pricing model, AirBnB takes into account a wide range of variables.

In embodiments of the present disclosure, a dynamic pricing model similarly is transferable and preferably used to develop price recommendations in a data marketplace for different datasets created by Internet users. Just as no two AirBnB listings are the same, no two personal datasets or browsing datasets are the same. The key parameters of a bookable AirBnB listing are similarly mappable/transferable to data pricing in a data market:

|  | AirBnB | Dataset pricing |
| --- | --- | --- |
| Listing-varying/ Dataset-varying | AirBnB offers tree houses, boats, apartments and houses with different sizes, in different locations, furnishing and quality (as expressed in ratings by guests). No two listings are the same. | As the aforementioned variables show, datasets vary greatly as they can consist of different data types (e.g. images or text), passively or actively created data (e.g. browsing history or a Twitter post), or quality (e.g. labeled or unlabelled data). |
| Time-varying | AirBnB experiences a higher demand in certain seasonalities, like summer, which however vary across the globe. | A data market might experience its own "seasonality", as, for example, the demand for shopping pattern data might increase over the Christmas seasons or the demand for health data might change when lawmakers introduce reforms of health insurance regulations. |

Having established that the nature of key variables and parameters in an AirBnB type pricing model are transferable to a data pricing model, embodiments of the disclosure preferably apply a similar dynamic mechanism for data-pricing recommendations. This includes:

A probability model estimates the probability of a dataset being sold within a given timeframe. This model takes into account the variables that influence and shape the value of data, including the historical data generated through the auction model in Stage One.

A pricing strategy model, which uses the results of the probability model as input to predict or estimate the optimal price recommendation for a given dataset.

Personalization: This third layer adjusts price to incorporate "loss of privacy" price set by the data creator, to generate the final price suggestion.

F. Digital Marketplace Benefits

Today's digital economy and the rash of scandals at large digital service providers has fueled heightened privacy concerns. Those worries have prompted urgent discussions about the future of the digital economy and raised new questions about the impact of technology on the labor market, privacy, productivity and income distribution. A number of concrete proposals have emerged in this uncertain environment, each seeking new ways to redistribute bargaining power around data.

Embodiments of the present disclosure incorporate a holistic initiative to establish an entirely new data market. The inventive marketplace integrates legal, technological and business innovation in a model that is preferably built around these fundamental pillars:

A personalized privacy charter (PPC) 920 that allows data creators to set the terms and conditions for engagement with data buyers in the market to offer and sell data.

An option to protect data ownership and define prices through an evolving and dynamic pricing model and privacy agent 915;

A dynamic pricing model 938 which in the first stage 934 operates as an auction and in the second stage 936 predicts prices (probability model) based on historical auction data and other variables. This provides data buyers a higher degree of reliability in planning (strategy and privacy models) and accounting costs from data transactions.

A transaction infrastructure 950 that is preferably managed by a neutral market maker or market intermediary 930. This structure allows individuals or businesses to place and bundle data in the market for an identified price and underpin those transactions with data usage licenses that are in line with the C/PPC of data creators.

It will be understood by those skilled in the art that the above descriptions are merely examples and that countless variations of the same can be implemented in accordance with the present teachings. A number of other conventional steps that would be included in a commercial application have been omitted, as well, to better emphasize the present teachings.

It will also be apparent to those skilled in the art that the modules of the present disclosure, including those illustrated in the figures can be implemented using any one of many known programming languages suitable for creating applications that can run on large scale computing systems, including servers connected to a network (such as the Internet) as part of a cloud computing system. The details of the specific implementation of the present disclosure will vary depending on the programming language(s) used to embody the above principles, and are not material to an understanding of the present disclosure. Furthermore it will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present disclosure, and may be implemented in any number of ways known to those skilled in the art. Such code, routines, etc. may be stored in any number of forms of machine readable media. It is understood that the protection afforded the present disclosure also comprehends and extends to embodiments different from those above, but which fall within the scope of the claims presented below.

What is claimed is:

1. A method of generating an adaptable customized privacy protection charter (PPC) for a user computing device and for controlling online interactions with a digital services provider (DSP) comprising:
   a. defining an initial PPC based on a set of user data categories, a set of user data sensitivity ratings, and privacy ratings for a category-sensitivity rating pair within a privacy rating protection field;
      wherein said initial PPC is adapted to be used by a software agent configured for privacy management executing on a computing device configured to engage with the DSP on behalf of the user;
   b. monitoring the user's interactions with the software agent during data sessions with the DSP to identify dynamic user privacy preferences for modifying the initial PPC that are based on:
      i. identifying interactions occurring subsequent to step (a) that are associated by the software agent with user behavior deviating from said initial PPC; and
      ii. identifying life events for the user occurring subsequent to step (a) that are associated by the software agent with potential changes in user privacy preferences;
   c. identifying proposed changes to said initial PPC based on said dynamic user privacy preferences;
   d. presenting said proposed changes to the user;
   e. creating an adapted PPC based on modifying said initial PPC in accordance with user feedback to said proposed changes.

2. The method of claim 1 further including a step: monitoring other users' interactions with DSPs to identify potential privacy changes to said initial PPC.

3. The method of claim 2, further including a step: creating users clusters based on clustering behavior of other users to identify relationships between behavioral variables.

4. The method of claim 3 further including a step: developing a plurality of models based on said clusters.

5. The method of claim 4, further including a step: assigning the user to one of said plurality of models.

6. The method of claim 1 wherein step (e) is performed before step (d) and such that said proposed changes are automatically implemented into said adapted PPC without further user approval.

7. The method of claim 1 wherein the user is enabled to accept or reject said proposed changes.

8. The method of claim 1 wherein said user's interactions are journaled and selectively replayed during step (d) to explain said proposed changes.

9. The method of claim 1 wherein the user is initially assigned a first behavioral model which is overwritten by said adapted PPC.

10. The method of claim 1 wherein said initial PPC is adapted to be used by a software agent configured for privacy management within a web browser executing on a first computing device and/or an application interface executing on a second phone based computing device.

11. The method of claim 1 wherein during step (b) the dynamic user privacy preferences are further based on identifying changes in privacy policy parameters of a DSP as part of a new data session with such DSP.

12. A system for generating an adaptable customized privacy protection charter (PPC) for a user computing device and for controlling online interactions with a digital services provider (DSP) comprising:
   hardware computing components capable of executing one or more executable software routines adapted to:
   a. define an initial PPC based on a set of user data categories, a set of user data sensitivity ratings, and privacy ratings for a category-sensitivity rating pair within a privacy rating protection field;
      wherein said initial PPC is adapted to be used by a software agent configured for privacy management executing on a computing device configured to engage with a DSP on behalf of the user;
   b. monitor the user's interactions with the software agent during data sessions with the DSP to identify dynamic user privacy preferences that differ from said initial PPC; the software agent further being configured to:
      i. identify subsequent interactions that are associated by the software agent with user behavior deviating from said initial PPC; and
      ii. identify subsequent life events for the user that are associated by the software agent with potential changes in user privacy preferences;
   c. identify proposed changes to said initial PPC based on said dynamic user privacy preferences;
   d. present said proposed changes to the user;
   e. create an adapted PPC based on modifying said initial PPC in accordance with user feedback to said proposed changes.

13. The system of claim 12 wherein the dynamic user privacy preferences are further based on identifying changes in privacy policy parameters of a DSP as part of a new data session with such DSP.

14. A method of generating an adaptable customized privacy protection charter (PPC) for a user computing device and for controlling online interactions with a digital services provider (DSP) comprising:
   a. defining an initial PPC based on a set of user data categories, a set of user data sensitivity ratings, and privacy ratings for a category-sensitivity rating pair within a privacy rating protection field;
      wherein said initial PPC is adapted to be used by a software agent configured for privacy management executing on a computing device configured to engage with the DSP on behalf of the user;
   b. monitoring the user's interactions with the software agent during data sessions with the DSP to identify a first set of dynamic user privacy preferences for modifying the initial PPC that are based on:
      i. identifying interactions occurring subsequent to step (a) that are associated by the software agent with user behavior deviating from said initial PPC; and
      ii. identifying life events for the user occurring subsequent to step (a) that are associated by the software agent with potential changes in user privacy preferences;
   c. monitoring a data market value assigned by the DSP to selected user privacy data that is not currently authorized for access by the DSP to identify a second set of dynamic user privacy preferences for the user;
   d. identifying proposed changes to said initial PPC based on said first and second dynamic user privacy preferences;
   e. presenting said proposed changes to the user;
   f. creating an adapted PPC based on modifying said initial PPC in accordance with user feedback to said proposed changes;

g. providing a credit to the user when they adopt said second set of dynamic user privacy preferences for said selected user privacy data.

15. The method of claim 14 wherein during step (b) the dynamic user privacy preferences are further based on identifying changes in privacy policy parameters of a DSP as part of a new data session with such DSP.

16. The method of claim 14 wherein said data market value is assigned by a separate market intermediary computing system.

17. The method of claim 16 wherein said data market value is derived by the market intermediary computing system based on an auction price determined for said selected user privacy data.

18. The method of claim 16 wherein said data market value is derived by the market intermediary computing system based on features of said selected user privacy data including location information.

19. The method of claim 16 wherein said data market value is derived by the market intermediary computing system based on temporal features of said selected user privacy data.

20. The method of claim 16 wherein said data market value is derived by the market intermediary computing system based on supply and demand of said selected user privacy data.

* * * * *